United States Patent
Gadini et al.

(10) Patent No.: US 10,620,070 B2
(45) Date of Patent: Apr. 14, 2020

(54) PRESSURE SENSOR INCLUDING OVERMOLDED ELEMENT(S) FOR SECURING POSITIONING

(71) Applicant: ELTEK S.p.A., Casale Monferrato (Alessandria) (IT)

(72) Inventors: Costanzo Gadini, Casale Monferrato (IT); Marco Bigliati, Casale Monferrato (IT)

(73) Assignee: ELTEK S.p.A., Casale Monferrato (Alessandria) (IT)

( * ) Notice: Subject to any disclaimer, the term of this patent is extended or adjusted under 35 U.S.C. 154(b) by 49 days.

(21) Appl. No.: 15/539,262

(22) PCT Filed: Dec. 22, 2015

(86) PCT No.: PCT/IB2015/059869
§ 371 (c)(1),
(2) Date: Jun. 23, 2017

(87) PCT Pub. No.: WO2016/103171
PCT Pub. Date: Jun. 30, 2016

(65) Prior Publication Data
US 2017/0350778 A1    Dec. 7, 2017

(30) Foreign Application Priority Data
Dec. 23, 2014 (IT) .............................. TO2014A1091

(51) Int. Cl.
*G01L 7/08* (2006.01)
*G01L 19/06* (2006.01)
(Continued)

(52) U.S. Cl.
CPC .............. *G01L 7/082* (2013.01); *G01L 7/088* (2013.01); *G01L 19/0038* (2013.01); *G01L 19/0672* (2013.01); *G01L 19/143* (2013.01)

(58) Field of Classification Search
CPC ............. G01L 19/0038; G01L 19/0672; G01L 19/143; G01L 19/04; G01L 13/025;
(Continued)

(56) References Cited

U.S. PATENT DOCUMENTS 5,792,958 A * 8/1998 Speldrich ................ G01L 19/06
338/42
8,453,513 B2 * 6/2013 Bigliati ................. G01L 9/0052
73/756

(Continued)

FOREIGN PATENT DOCUMENTS

DE    10 2008 026611    12/2009
EP    2 136 193    12/2009
(Continued)

OTHER PUBLICATIONS

International Search Report for PCT/IB2015/059869, dated Apr. 4, 2016, 6 pages.
(Continued)

*Primary Examiner* — Harshad R Patel
*Assistant Examiner* — Nigel H Plumb
(74) *Attorney, Agent, or Firm* — Nixon & Vanderhye P.C.

(57) ABSTRACT

A pressure-sensor device has
a component sensitive to pressure,
a structure for housing or supporting the pressure-sensitive component, and
at least one elastically deformable body that is overmoulded to the housing or supporting structure.

15 Claims, 32 Drawing Sheets

(51) Int. Cl.
*G01L 19/00* (2006.01)
*G01L 19/14* (2006.01)

(58) Field of Classification Search
CPC . G01L 9/06; G01L 7/082; G01L 7/088; G01L 7/00; G01N 33/5097
See application file for complete search history.

(56) References Cited

U.S. PATENT DOCUMENTS

| | | | |
|---|---|---|---|
| 8,468,895 B2* | 6/2013 | Colombo | G01L 19/0038 73/715 |
| 9,739,767 B2* | 8/2017 | Kuchitsu | C12Q 1/6895 |
| 2009/0314096 A1* | 12/2009 | Colombo | G01L 19/0084 73/754 |
| 2014/0013853 A1* | 1/2014 | Wohlgemuth | G01L 19/06 73/716 |

FOREIGN PATENT DOCUMENTS

| | | |
|---|---|---|
| JP | 2009 103602 | 5/2009 |
| WO | WO 98/31997 | 7/1998 |
| WO | WO 2008/078184 | 7/2008 |
| WO | WO 2009/153741 | 12/2009 |
| WO | WO 2012/089626 | 7/2012 |

OTHER PUBLICATIONS

Written Opinion of the ISA for PCT/IB2015/059869, dated Apr. 4, 2016, 16 pages.

* cited by examiner

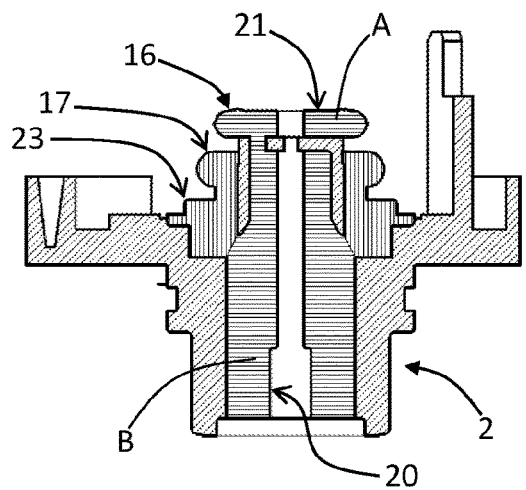
Fig. 34
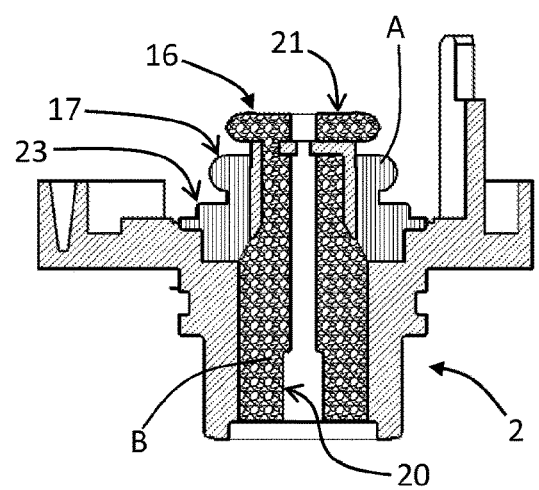
Fig. 35
Fig. 36
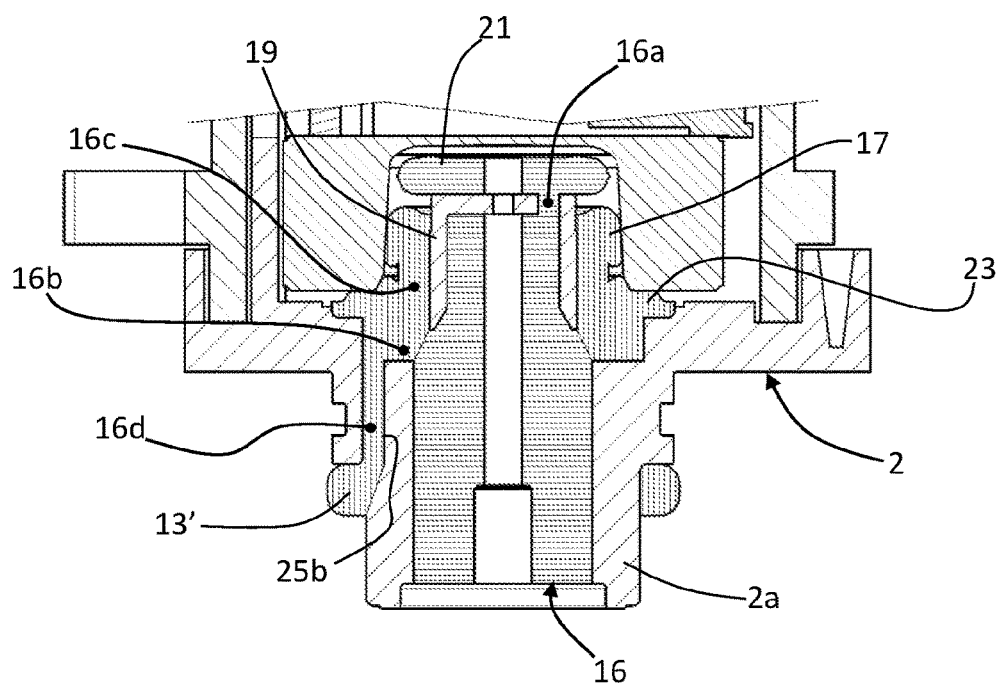

PRESSURE SENSOR INCLUDING OVERMOLDED ELEMENT(S) FOR SECURING POSITIONING

This application is the U.S. national phase of International Application No. PCT/IB2015/059869 filed Dec. 22, 2015 which designated the U.S. and claims priority to IT Patent Application No. TO2014A001091 filed Dec. 23, 2014, the entire contents of each of which are hereby incorporated by reference.

FIELD OF THE INVENTION

The present invention relates to sensor devices and has been developed with particular reference to sensor devices having a body comprising an elastically deformable membrane, associated to which is an element sensitive to deformation of the membrane. The invention finds preferred application in the sector of pressure-sensor devices.

PRIOR ART

A sensor device is known from the document No. WO2008/078184 A2 filed in the name of the present applicant.

The above document describes a pressure-sensor device the sensitive component of which has a sensor body with a blind cavity, the bottom of which is formed by a membrane part. The membrane part is elastically deformable, and associated thereto is a sensing element, such as a bridge of resistive or piezoresistive elements. The device has a casing made up of a number of parts, amongst which a body for supporting the sensor body. The supporting body is traversed axially by a duct, the inlet end of which is at a hydraulic-attachment portion of the casing; the outlet end of the duct instead faces the cavity of the sensor body.

In certain applications, the devices of the type referred to operate in conditions of very low temperature, and it may occasionally happen that the fluid being measured freezes, thus increasing in volume. Given that the membrane part of the sensor body is usually relatively thin and delicate, it is important to adopt solutions that prevent its failure and/or damage of the corresponding sensing element following upon the increase in volume of the fluid due to freezing.

The prior document referred to consequently proposes association to the supporting body of one or more compressible compensation bodies, i.e., elements suitable for compensating possible increases in volume of the fluid following upon its freezing.

The solution envisages the use of "external" compensation elements, i.e., ones mounted on the outside of the supporting body substantially at the cavity of the sensor body, or else "internal" compensation elements, i.e., ones directly inserted in the axial duct of the supporting body, at a certain distance from the membrane of the sensor body. The document referred to also suggests the possibility of forming an internal compensation element and an external compensation element in a single compressible body. This single body is by its nature yielding, and this enables installation thereof on the supporting body, with a corresponding part inside the axial duct and another part outside the aforesaid duct in order to project into the cavity of the sensor body.

The pressure-sensor devices proposed in the prior document referred to are on average efficient from the functional standpoint, but still present some drawbacks in terms of reliability and/or production times and costs, which it would be desirable to reduce.

SUMMARY OF THE INVENTION

In its general terms, the aim of the present invention is consequently to provide an improved pressure-sensor device that is simpler and more economically advantageous to produce as compared to the devices according to the prior art and presents a further increased reliability.

One or more of the above aim is achieved, according to the present invention, by a pressure-sensor device and by a corresponding process of production having the inventive characteristics referred to in the description.

BRIEF DESCRIPTION OF THE DRAWINGS

Further objects, characteristics, and advantages of the invention will emerge clearly from the ensuing detailed description, with reference to the annexed plates of drawings, wherein:

FIGS. 30 to 36 are schematic sectional views of a supporting body of a device according to the invention, with associated a corresponding elastically deformable body, in as many different embodiments of the invention;

DESCRIPTION OF EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various points of this description do not necessarily refer to one and the same embodiment, but may, instead, refer to different embodiments. Furthermore, particular conformations, structures, or characteristics defined in this description may be combined in any adequate way in one or more embodiments, even different from the ones represented. The reference numbers and spatial references (such as "upper", "lower", etc.) are used herein only for convenience and hence do not limit the scope of protection or the scope of the embodiments. In the figures, the same reference numbers are used to designate elements that are similar or technically equivalent to one another.

Figure 1:
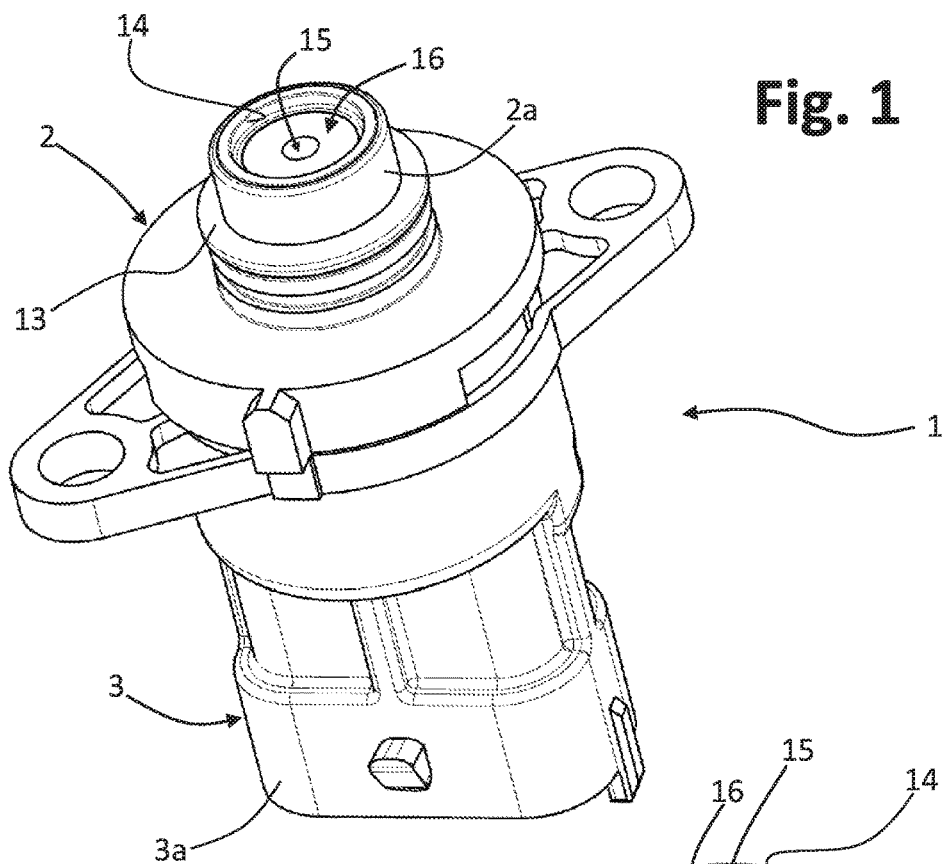
FIG. 1 is a schematic perspective view of a pressure-sensor device according to an embodiment of the invention.
Figure 2:
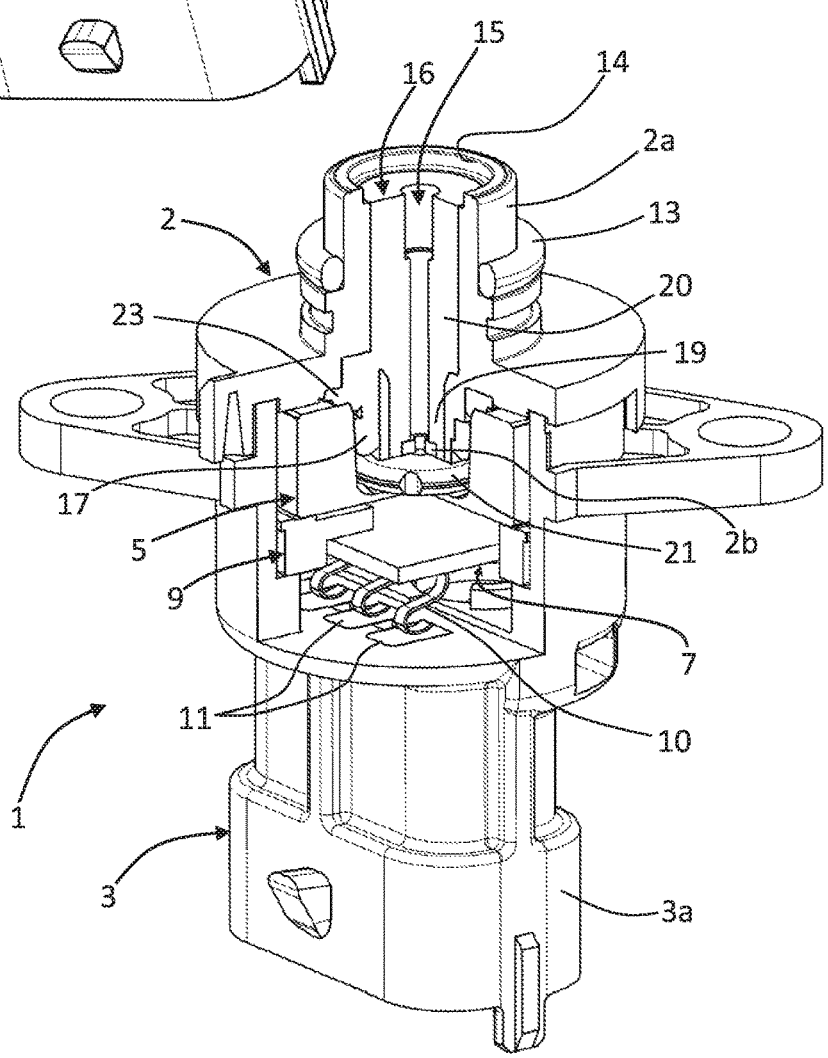
FIG. 2 is a partially sectioned perspective view of the device of FIG. 1.

In FIGS. 1 and 2, designated as a whole by 1 is a sensor device according to one embodiment of the invention, in particular a pressure-sensor device. The device 1 has a housing or supporting structure that comprises a body, designed to house and/or support a component sensitive to a quantity to be detected, here a pressure. The aforementioned body is preferably configured like a casing, as in the example illustrated, having an electrical-connection portion and a hydraulic-connection portion.

In the case exemplified, the housing or supporting structure, also defined hereinafter for simplicity as "casing", is made up of at least two main parts, amongst which a first body 2, hereinafter defined also as "supporting body" 2, which preferably performs also functions of hydraulic connection, and a second body 3, hereinafter defined also as "closing body" 3, which preferably performs functions of housing and electrical connection. Preferably, the casing is configured for protecting the sensitive component, in particular from the external environment. In various embodiments, the parts 2 and 3 contribute to defining a casing that encloses, at least in part, and/or protects the sensitive component in regard to the external environment, albeit envisaging appropriate passages for at least one quantity to be detected, such as a passage for a fluid the pressure of which is to be detected, and possibly one or more further passages towards the external environment, for example to have available a reference pressure.

Figure 3:
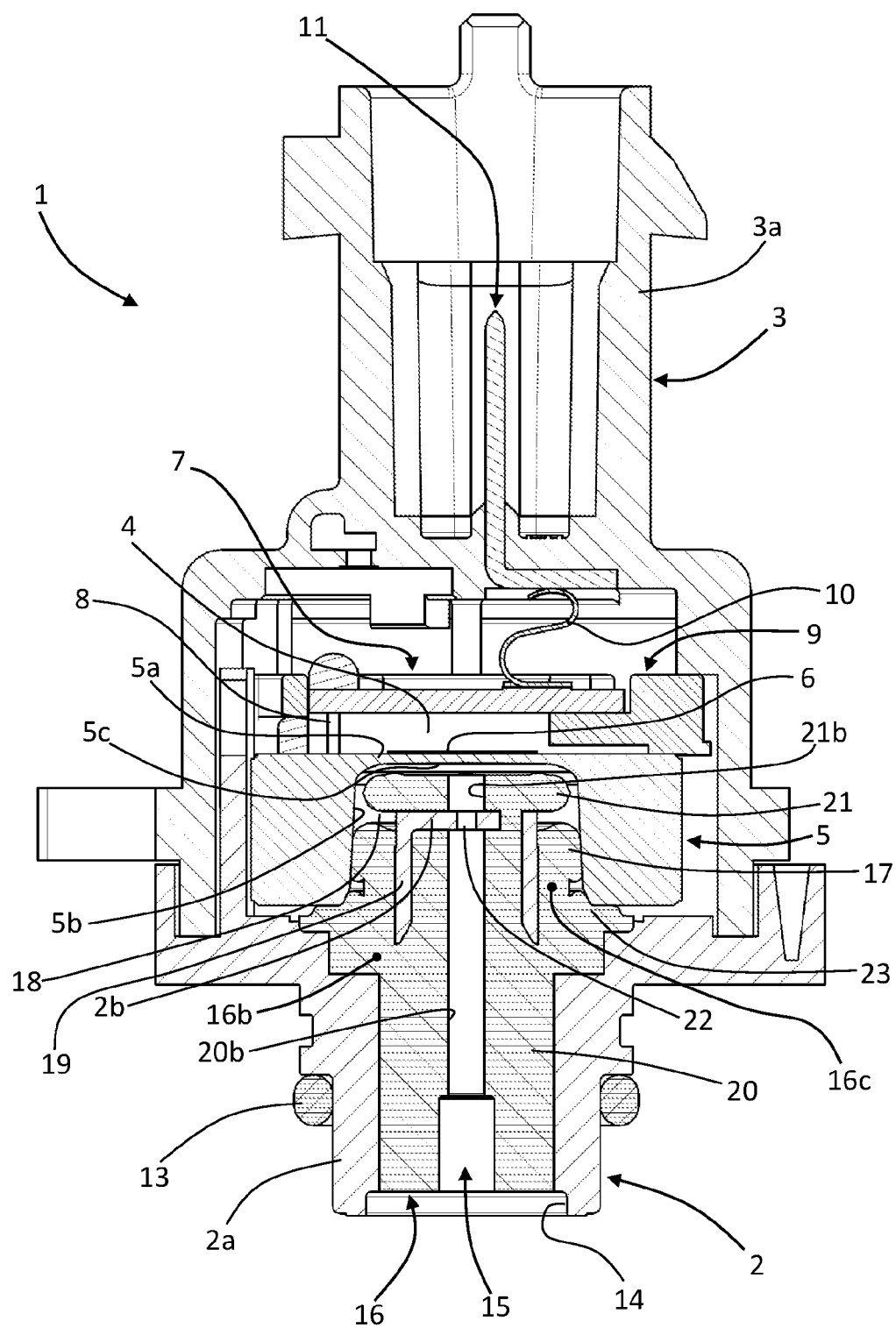
FIGS. 3 and 4 are longitudinal sections of the device of FIG. 1, according to mutually orthogonal planes of section.
Figure 4:
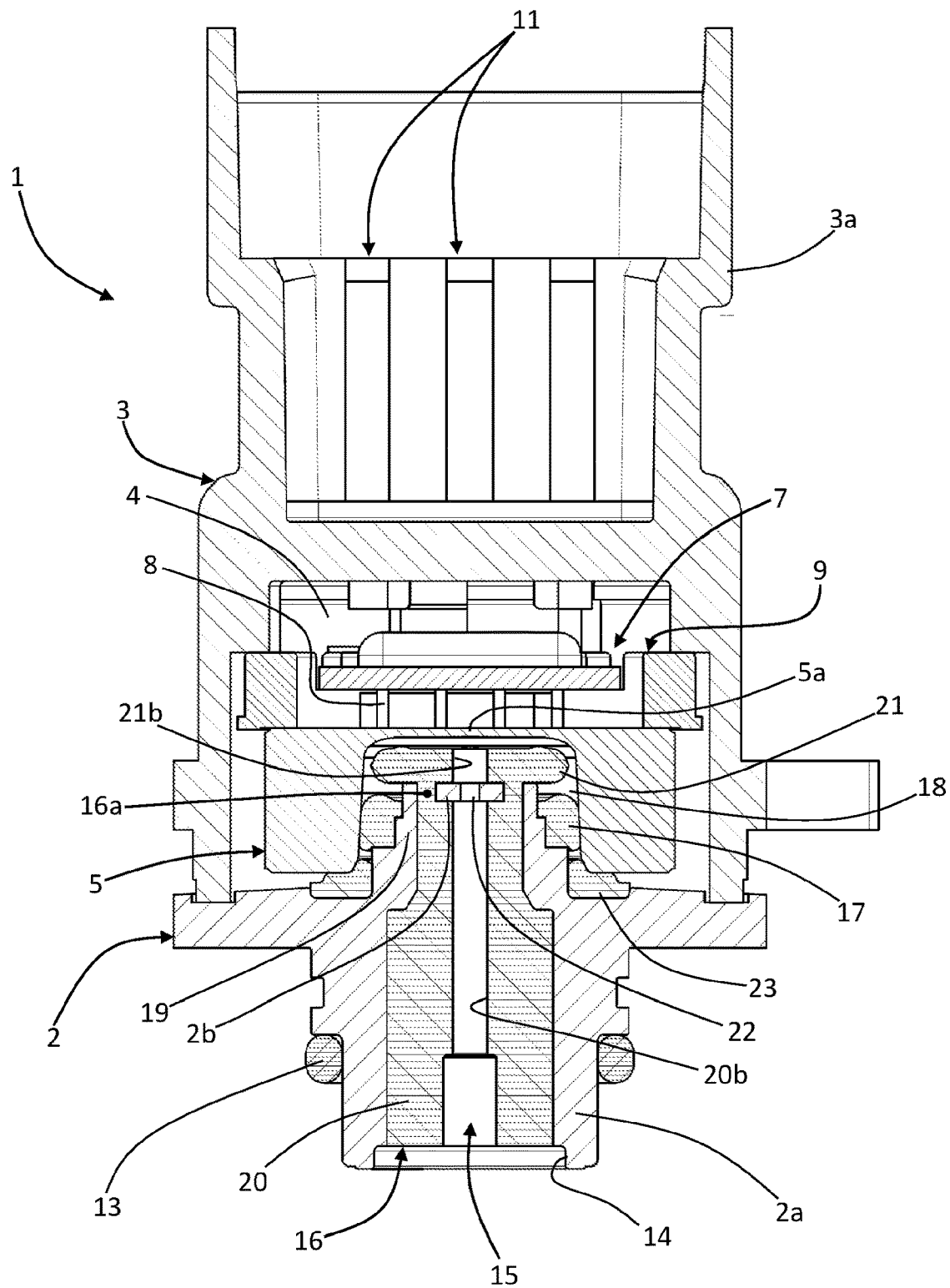

As emerges also from FIGS. 3 and 4, the bodies 2 and 3 are coupled together, preferably in a fluid-tight way, so as to define a space 4 within which a component sensitive to the quantity to be detected is housed. In the example illustrated, the sensitive component has a sensor body 5 with a membrane part 5a that is elastically deformable as a function of the pressure of the fluid being measured. The sensor body 5 is housed at least partially in at least a part of the casing. In what follows, for simplicity, the part 5a will be defined also simply as "membrane". The membrane 5a may be made integrally in the sensor body 5 or else be configured as a separate part associated to the sensor body 5, for example via welding or gluing.

As per a known technique, the sensitive component has associated to it at least one element designed to detect the deformation of the membrane part 5a. This detection or sensing element, designated by 6 only in FIG. 3, may comprise a plurality of resistors or piezoresistive elements, for example in bridge configuration, preferably obtained on the side of the membrane 5a not exposed to the fluid the pressure of which is to be measured. In other embodiments (for example, as in the case of FIG. 24) the detection element 6 may comprise electrodes and/or capacitive elements, such as for example two facing electrodes, preferably obtained at least in part on a side of the membrane 5a not exposed to the fluid.

In one embodiment, such as the one exemplified, the sensor body 5 is monolithic, made preferentially of a ceramic material (for example, alumina), so as to define a blind cavity (not indicated) having a peripheral surface and a bottom surface, with the latter that belongs to the membrane 5a (in particular, to the inner side thereof). The aforesaid peripheral and bottom surfaces are designated by 5b and 5c, respectively, only in FIG. 3.

In one embodiment, present within the space 4 defined by the casing 2-3 is a circuit 7 that includes a respective support, mounted on which are electrical components and/or electronic components for control and/or treatment and/or processing of a signal generated by the detection element 6. The detection element 6 is in signal communication with the circuit 7 via conductors 8 that rise from the face of the sensor body 5 that includes the membrane 5a, here defined for simplicity as "upper face" or "upper surface". The conductors 8 are connected to respective conductive pads or paths provided on the support of the circuit 7. Provided between the upper face of the sensor body 5 and the support of the circuit 7 is a spacer element 9, which co-operates with at least a part of the casing (for example, the part 3) and has also functions of positioning of the support of the circuit 7 with respect to the sensor body 5 and to the casing itself. Associated to the support of the circuit 7 are elastic contacts, one of which is designated by 10 in FIG. 3 (see also FIG. 2), that set in contact electrically conductive pads or paths of the support of the circuit 7 to respective terminals 11 associated to the casing part 3. As emerges, in particular, from FIGS. 3 and 4, in one embodiment, the terminals 11 have a substantially L-shaped configuration, or in any case have a portion outside the space 4 and a portion inside the space 4. The casing part 3 then defines a tubular portion 3a—which here extends in a generally axial direction—extending within which are the external portions of the terminals 11, to provide an electrical connector. The parts of the contacts 10 opposite to the support of the circuit 7 are held elastically against the internal portion of corresponding terminals 11. In one embodiment, the elastic contacts 10 are obtained according to the specific teachings contained in WO 2009/153737, filed in the name of the present applicant, the contents of which are considered as being incorporated herein.

In one embodiment, the circuit is obtained directly on the sensor body 5, mounted on which are the aforesaid electrical components: the conductors 8 may hence even be absent. In this case, associated to the circuit obtained on the sensor body 5 are elastic contacts 10 that set in contact electrically conductive pads or paths of the circuit itself to respective terminals 11 associated to the casing part 3 of the device 1. The terminals 11 have a configuration designed to couple electrically and mechanically with at least a part or end of the elastic contacts 10.

The supporting body 2 has a hydraulic-connection portion 2a, preferably having a cylindrical shape, provided on the outside of which is an external sealing element 13, here of an annular shape, for example an O-ring. The portion 2a of the body 2 is designed for connection to a line flowing in which is the fluid the pressure of which is to be detected. The opposite part of the supporting body 2, i.e., its upper face or surface, is configured peripherally—in a way in itself known—for coupling with the casing part 3. Branching off from the hydraulic-connection portion 2a is a duct, designated by 14, which extends through the body 2, preferably in an axial direction, as far as its upper face. In one or more embodiments, the duct 14 defines, at least in part, a passageway 15 for the fluid the pressure of which is to be detected. In one embodiment, as will be seen, a part of the passageway 15 may be defined by a body that is at least in part elastically deformable, associated to the supporting body 2, formed with one or more elastically compressible and/or yielding materials, and configured for compensating any possible variations in volume of the fluid.

The deformable body is preferably shaped so as to define one or more elastically compressible compensation elements. In addition or as an alternative, the deformable body may define one or more functional elements that perform, for example, sealing and/or supporting functions for the sensitive element and/or the casing.

A non-limiting example of such an elastically deformable body is designated as a whole by 16 in FIGS. 2-4.

In an example of embodiment, as will be seen, the body 16 defines two elements for compensation of any possible variations in volume of the fluid, which define respective portions of the passageway 15, but not excluded from the scope of the invention is the case of a deformable body that defines a single compensation element, or else again the case where the passageway 15 is entirely defined or practically entirely defined by a deformable body associated to the duct 14.

The sensor body 5 is mounted on the supporting body 2 in such a way that its membrane 5a is exposed to the fluid coming out of the passageway 15, in particular facing the outlet of the latter. In the preferred embodiment, the device 1 further comprises an internal sealing element, designated by 17, which is set between the supporting body 2 and the sensor body 5, to define with them a chamber for collecting the fluid, designated by 18. The passageway 15 gives out into the aforesaid chamber 18 so that the pressure of the fluid can be exerted on the membrane 5a.

Figure 5:
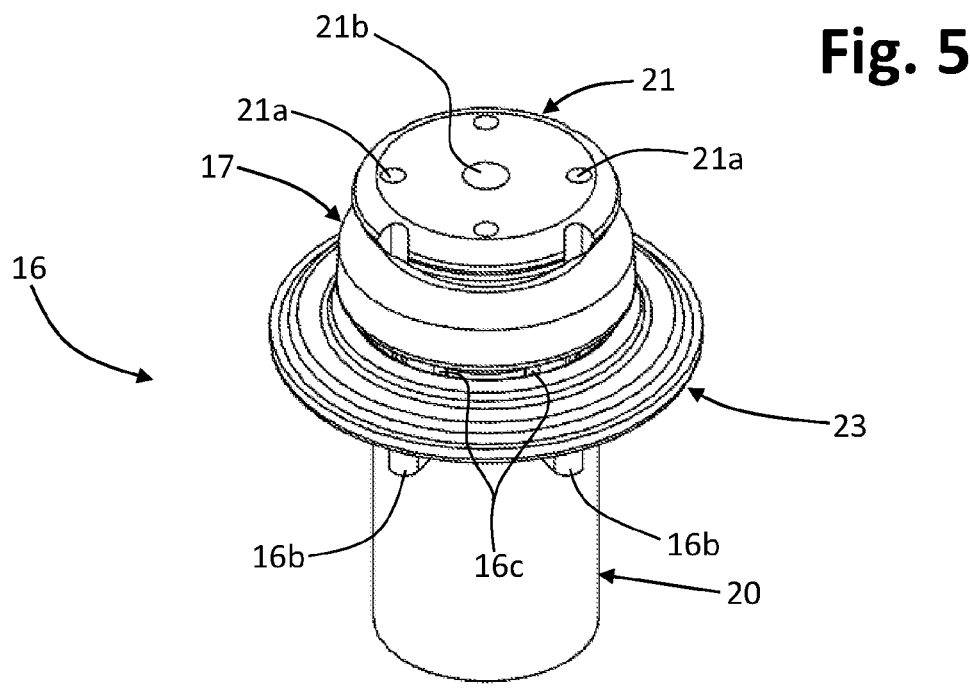
FIG. 5 is a perspective view of a supporting body of the device of FIG. 1 and of a corresponding elastically deformable body.
Figure 5:
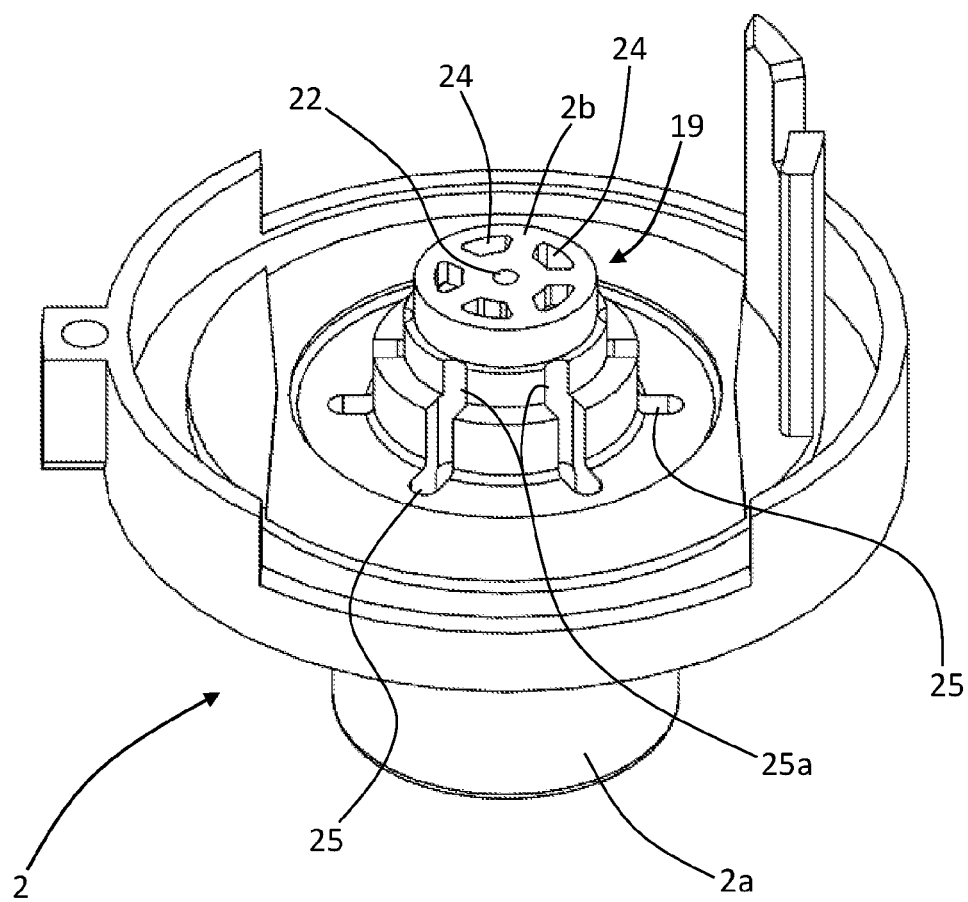

In one embodiment, such as the one exemplified, the supporting body 2 has, at its upper face, a projecting central portion, visible in particular in FIG. 5 where it is designated as a whole by 19. The internal sealing element 17 extends around the aforesaid portion 19 so as to provide a radial seal between the portion 19 and the sensor body 5, in particular the peripheral surface 5b of its blind cavity.

In a preferred embodiment, for example the one illustrated, the deformable body 16 defines two different compensation elements 20 and 21, here defined as "internal" and "external", respectively.

The internal compensation element 20, which extends at least in part into the duct 14, delimits a respective part of the passageway 15 and has a generally cylindrical and/or frustoconical shape, or in any case a tubular shape in so far as it is provided with an axial through hole. The external compensation element 21 is, instead, set in a position generally facing the membrane 5a of the sensor body 5 and extends at least in part on the outside of the duct 14, in particular at the top of the projecting portion 19 of the supporting body 2, in a position relatively close to the membrane itself. Also the external compensation element 21 is provided with an axial through hole and, preferably, has a generally flattened shape, for example the shape of a disk or a cap.

As may be noted in FIG. 3, the external compensation element 21 is located preferentially within the blind cavity of the sensor body 5, with its peripheral and upper surfaces relatively close to the peripheral surface 5b and bottom surface 5c, respectively, of the aforesaid cavity. In a preferred embodiment, the compensation element 21 has one or more through openings in peripheral positions, some of which are designated by 21a in FIG. 5. These openings 21a traverse the element 21 between its two opposite major faces and basically have the function of connecting together different regions of the collection chamber 18 in order to keep them in fluid communication and balance them in pressure, for the purposes and with the modalities described in WO 2010/013216 filed in the name of the present applicant, the specific teachings of which are considered as being incorporated herein. In possible variant embodiments, the openings 21a are replaced by a lobed shape of the element 20, or by axial grooves or slits provided in a region corresponding to the outer profile or a central passage of the element 20, or once again provided in the projecting portion 19 of the body 2, according to the teachings of WO 2010/013216 referred to previously.

In one embodiment, the compensation elements 20 and 21 are joined together, i.e., are made of a single piece—here the deformable body 16—formed with one or more elastically compressible and/or yielding materials, for example a silicone.

In one embodiment, such as the one represented, the supporting body 2 defines a transverse wall 2b of the duct 14. Preferentially, the wall 2b has a relatively small thickness, for example smaller than the thickness of the element 21 or the thickness of the wall defining the connection portion 2a of the body 2. In the case of the device 1 of FIGS. 3 and 4, the aforesaid transverse wall 2b is located at end of the duct 14 opposite to the hydraulic-connection portion 2a, i.e., with the outer side of the wall 2b that belongs to the upper face of the body 2. As may also be appreciated from FIG. 5, the transverse wall 2b is provided with at least one first through opening 22, which delimits a respective part of the passageway 15, as emerges clearly from FIGS. 3 and 4. In a preferred embodiment, the opening 22 is in a central position of the wall 2b and axially aligned to a through hole of a compensation element 20 and/or 21. In the embodiment of FIGS. 3-4, the duct 14 hence extends in part through the projecting portion 19, provided at the top of which is the wall 2b having the opening 22 at the centre.

In one embodiment, moreover associated to the body 2 is a supporting element 23, which is located on the outside of the collection chamber 18 and is configured for elastically supporting the sensor body 5 in an axial direction. The supporting element 23 is preferably set between the upper face of the body 2, in a position that generally surrounds its projecting portion 19, and the lower face of the sensor body 5, in a peripheral area of the aforesaid face that surrounds the opening of the corresponding blind cavity. The element 23 can perform also hydraulic sealing functions in so far as it is elastically deformable.

The presence of the elastic supporting element 23 is particularly important in those embodiments of the device 1 in which the sensor body 5 is constantly urged in an elastic way towards the supporting body 2, in particular, via the action of the elastic contact elements 10. The aforesaid requirement is not, for example, present in the devices according to the prior art, such as the ones described in WO 2008/07814, in which the sensor body is not subject to elastic loads towards the corresponding supporting body.

According to an independently inventive aspect, at least one from among the internal sealing element 17, the supporting element 23 and the external sealing element 13 is configured as a part that is at least partially overmoulded on the supporting body 2 or co-moulded therewith.

It is pointed out that, in the sequel of the present description and where not otherwise specified, the generic term "overmoulding" and its derivatives are understood as designating at least two different moulding techniques, and specifically the overmoulding technique in a strict sense and the co-moulding technique. In the overmoulding technique in a strict sense, a first component previously obtained (here the supporting body 2) is inserted in a mould, into which there is then injected, in the molten state, at least one material that is to form a second component (here the compressible body 16) on the first component. Instead, in the co-moulding technique, in a particular mould there is first injected, in the molten state, at least one material designed to form the first component, after which a part of the mould is replaced—frequently in an automatic way—with a different part, and in the new mould thus formed, which still houses the first component, there is injected, in the molten state, at least one material to obtain the second component on the first component (alternatively, the aforesaid part of the mould can be rotated, instead of replaced, in such a way that a different portion thereof comes to form part of the moulding impression). In practice, then, in the first case, the first component is obtained apart, is introduced into the mould, and the second component is moulded thereon, possibly with the use of a promoter of adhesion (primer) distributed over at least part of the first component, whereas in the second case both of the components are obtained, one after another, in at least part of the same moulding apparatus, preferably overmoulding the second component almost immediately, in particular after a few seconds or a few tens of seconds, when the first component is still hot or has not yet reached room temperature. In both cases, however, one component is moulded on the other.

According to an aspect that is in itself independently inventive, at least one from among the internal sealing element 17, the supporting element 23, and the external sealing element 13, possibly together with at least one compensation element, is overmoulded at least in part on the casing body, immediately after moulding of the latter, preferably when the casing body is still hot or has not reached room temperature. This approach proves useful in order to determine a better structural fixing and/or chemical bonding between the material of the body 2 and the material of the overmoulded element or elements.

According to an aspect that is in itself independently inventive, at least one from among the internal sealing element 17, the supporting element 23 and the external sealing element 13, possibly together with at least one compensation element, is overmoulded at least in part on the casing or on the supporting body 2 after a promoter of adhesion or primer has been deposited on at least part of the latter, in particular in order to determine a better structural fixing and/or chemical bonding between the material of the casing or of the supporting body 2 and the material of the overmoulded element or elements.

Preferably, the material of the overmoulded element or elements has characteristics such as to adhere or adapt to the supporting body, in particular binding structurally and/or penetrating into the possible surface micro-roughnesses or porosities during moulding, improving the corresponding seal, for example as compared to a seal obtained merely by compression of a sealing element formed separately and pressed elastically against the supporting body.

The fact that one or more from among the internal sealing element 17, the supporting element 23 and the external sealing element 13 are overmoulded on or co-moulded with the supporting body 2, possibly but not necessarily together with at least one compensation element, facilitates considerably production of the device 1 as a whole, reducing the operations and apparatuses necessary for its assembly and the corresponding times, likewise ensuring a high precision of positioning between the parts in question. The aforesaid solution moreover enables the overmoulded element or elements to be held in a well-defined position, thereby preventing any undesirable displacement or erroneous assemblage thereof that might arise in the production stage or during use of the device.

In one or more embodiments, just one of the aforesaid elements is overmoulded or co-moulded, whereas in other embodiments two or more of the aforesaid elements are overmoulded on or co-moulded with the supporting body. Two or more of the aforesaid elements may also be made of a single piece, i.e., be joined together and/or be obtained during one and the same step of injection or moulding.

In various embodiments, the material used for overmoulding is a full material, i.e., not an expanded or cell-foam material.

In a preferred embodiment, the elastically deformable body provides at least one compensation element, i.e., a compressible element that performs functions of compensation for any possible variations in volume of the fluid, which is configured as part overmoulded on the supporting body. According to an aspect in itself independently inventive, one or more from among the internal sealing element, the supporting element, and the external sealing element can be overmoulded together with the aforesaid compressible compensation element.

According to an aspect in itself independently inventive, the deformable body that defines at least one compensation element also defines at least one from among the internal sealing element, the supporting element and the external sealing element. One or more of the aforesaid elements may thus be formed in a single body with a compensation element, preferably a compensation element housed in the duct 16 of the supporting body 2, even though not excluded from the scope of the invention is formation of one or more of the aforesaid components in a single body with a compensation element external to the duct 14.

According to another aspect in itself independently inventive, at least one from among the internal sealing element 17, the supporting element 23 and the external sealing element 13 can be overmoulded as a single component in order to provide a respective elastically deformable body, or else two or more of the aforesaid elements can be made of a single piece. In various embodiments, a single elastically deformable component or a plurality of elastically deformable components are overmoulded on at least a part of the casing 2, 3 and/or on the sensitive element.

According to various embodiments, it is possible to overmould a compensation element, such as the element 20 or the element 21, with a first elastomeric material, such as a silicone, and then carry out a second overmoulding with a second elastomeric material in order to obtain one or more of the elements 13, 17, and 23. Consequently, according to a further aspect in itself independently inventive, at least one from among the deformable body 16, the internal sealing element 17, the supporting element 23 and the external sealing element 13 may be formed or moulded in different steps and/or with different materials. For this purpose, it may be envisaged to use respective moulds for each step and/or to replace at least part of the mould for each step. Preferably, at least one deformable body 16 or a compensation element 20 and/or 21 is made of a first material and at least one from among the internal sealing element 17, the supporting element 23 and the external sealing element 13 is made of a second material or elastomer. Preferentially, the first material has a lower hardness or requires a lower force to obtain a compression or elastic deformation as compared to the second material.

In one embodiment, the deformable body defines the internal compensation element, the external compensation element, and at least one from among the internal sealing element, the supporting element and the external sealing element: such a case is, for example, the one represented in FIGS. 1-5, where the body 16 defines, not only the elements 20 and 21, but also the elements 17 and 23.

In a preferred embodiment, in particular when the body 16 defines in a single piece the compensation elements 20 and 21, the transverse wall 2b of the body 2 is provided with one or more second through openings, some of which are designated by 24 in FIG. 5, preferably in a position that is peripheral or eccentric with respect to the opening 22.

Preferentially, a plurality of the aforesaid openings 24 are provided, arranged around the opening 22 that delimits part of the passageway 15. In one embodiment, the openings 24 are arranged according to a circumference or arc of circumference. Preferably, the openings 24 have a cross section or profile that is at least in part curved. The openings 24 may also comprise a number of stretches (not represented) that extend in different directions, such as stretches that extend in at least one from among a radial direction, a transverse direction, an angled direction, a parallel direction, or an orthogonal direction with respect to the direction of extension or axis of the duct 14. The openings 24 are occupied by respective portions of the deformable body 16, one of which is designated by 16a in FIG. 4, which connect together the compensation elements 20 and 21.

Preferably, the compensation elements 20 and 21 are joined via respective portions 16a of the deformable body 16 arranged at least part of the passageway 15, in particular arranged according to a circumference or arc of circumference. Preferably, the portions 16a of the body 16 have a cross section or outer profile that is at least in part curved. As has been said in relation to the openings 24, also the portions 16a may comprise a number of stretches (not represented) that extend in different directions, such as stretches that extend in at least one from among a radial direction, a transverse direction, an angled direction, a parallel direction, or an orthogonal direction with respect to the direction of extension or axis of the duct 14.

In a preferred embodiment, the supporting body 2 has one or more passages that branch off from or extend each from the duct 14, in particular in at least one direction that is at least in part generally radial or transverse or angled or orthogonal to the direction of extension or axis of the duct 14.

Some of the aforesaid passages are exemplified in FIG. 5, where they are designated by 25. In various preferred embodiments, such as the one illustrated, the passages 25 also have at least one respective stretch that extends in a direction at least approximately axial or parallel to the axis of the duct 14.

The passages 25 may possibly comprise surface grooves or recesses of the supporting body. In the case of FIG. 5, for example, at least one portion 25a of the axial stretches of the passages 25 is obtained in the form of surface grooves or recesses of the projecting portion 19. In general, the passages 25 may be formed in the body 2 in a region corresponding to the projecting portion 19, or have respective stretches—in particular stretches that are radial or transverse with respect to the duct 14—underneath the projecting portion 19—or once again radial or transverse stretches in the form of grooves or recesses in the top face of the body 2.

Irrespective of the specific embodiment, the passage 25, or each passage 25, is occupied by a respective portion of the deformable body, for example a portion that connects a compensation element—such as the internal element or the external element—to at least one from among the internal sealing element, the supporting element and the external sealing element. The presence of these connection portions of the deformable body, housed in respective passages 25, guarantees precise positioning and/or fixing of the elements 13 and/or 17 and/or 23 with respect to the body 2 and prevents any undesirable displacement thereof.

In a preferred embodiment, at least one portion of the deformable body 16, i.e., of at least one compensation element 20, 21 and/or of the internal sealing element 17 and/or of the supporting element 23 and/or of the external sealing element 13, extends in one or more passages 25 that each branch off or extend from the duct 14, in particular one or more portions that have a circular or curved arrangement and/or extend in at least one first direction, which is at least in part generally radial or transverse or angled with respect to the direction of extension or axis of the duct 14, 22, preferably extending also in a second axial or parallel or angled direction with respect to the axis of the duct 14, 22. For example, one or more portions comprise a first stretch and a second stretch that are orthogonal or angled with respect to one another, such as a first stretch that is radial and a second stretch that is substantially parallel to the axis of the duct 14, 22.

In the case of the embodiment here considered, the passages 25 contain portions of the deformable body that connect the internal compensation element 20 to the supporting element 23 and/or to the internal sealing element 17. For instance, at least a part of the passages 25 in the form of axial holes or openings of the body 2 may house portions for connection to the supporting element 23, whereas a further part of the passages 25 shaped like a groove house portions for connection to the internal sealing element 17. Preferably, the internal sealing element 17 is joined to the supporting element 23, and the latter is in turn joined to another deformable body, here in a position corresponding to the internal compensation element 20. On the other hand, in possible variant embodiments, the body 2 may include different series of passages 25 at different heights, for example three series of passages, where the upper series houses connection portions for the internal sealing element 17, the intermediate series houses connection portions for the supporting element 23 and the lower series houses connection portions for the external sealing element 13. Obviously possible are various combinations of even just two of the series referred to here by way of example, and/or for each passage or series of passages different combinations of stretches of passage are possible, such as stretches that are at least in part radial and/or axial and/or orthogonal and/or angled with respect to one another and/or with respect to the axis of the body 2 or of a duct 14, 22.

Also visible in isolation in FIG. 5 is an example of deformable body 16, here consisting of a single body formed with one or more materials, which defines the internal compensation element 20, the external compensation element 21, the internal sealing element 17 and the supporting element 23. The elements 20 and 21 are here prevalently tubular and disk-shaped, respectively, even though this does not constitute an essential feature of the solution. The two elements 20 and 21 each have a respective axial hole or passage, designated by 20b and 21b, for example in FIGS. 3 and 4, these being axially aligned with respect to one another and, together with the through opening 22 of the wall 2b, defining the passageway 15. As may be noted in particular from FIGS. 3 and 4, the holes 20b and 21b that traverse the elements 20 and 21 are substantially aligned axially to the through opening 22 of the wall 2b.

Preferably, at least part of the body 2 and/or at least part of the overmoulded deformable body 16 defines ducts or holes 20b, 21b of small or substantially capillary section, for example with a cross section of between 0.03 mm$^2$ and 1 mm$^2$, in particular in order to predetermine an area of start of freezing of the fluid so as to induce a sort of ice plug designed to counter any high and hence harmful thrusts from outside in conditions of freezing of the fluid being detected.

To return to FIG. 5, the internal sealing element 17 has an as a whole annular shape, with an approximately semicircular cross section (see also FIGS. 3 and 4) so as to be set up against the peripheral surface 5b of the cavity of the sensor body 5 and provide therewith a radial seal with respect to the aforesaid surface. On its opposite side, the sealing element 17 is set precisely up against the surface of the body 2, in particular up against the surface of the top projecting portion 19.

Once again visible in FIG. 5 is the supporting element 23, which is to support in an elastic way the sensor body 4 on the body 2. In the example of embodiment illustrated, the element 23 has an approximately disk-like or annular shape. Moreover partially visible in FIG. 5 are some of the connection portions of the deformable body 16, which join the compensation element 20 to the elements 17 and 23, the aforesaid portions being designated by 16b and 16c (see also FIG. 4).

Once again from FIG. 4 it may be noted how, in a preferred embodiment, the duct 14 that traverses the supporting body 2 presents an intermediate narrowed portion (not indicated), in such a way that also the internal compensation element 20 has two stretches of different diameter or in any case with different cross-sectional dimensions. This solution, together with the fact that the element 21 is positioned beyond the transverse wall 2b but connected or fixed with respect to the element 20, guarantees positioning and/or fixing of the deformable body 16 as a whole, both in the case of high pressures of the fluid and in the case of violent negative pressures of the fluid or of possible weakening of the material or materials constituting the deformable body 16. The aforesaid fixing is further guaranteed by the preferential structure that envisages a plurality of stretches 16a that extend in respective openings 24, which in effect prevents the deformable body 16 from possibly sliding out of the body 2.

Figure 6:
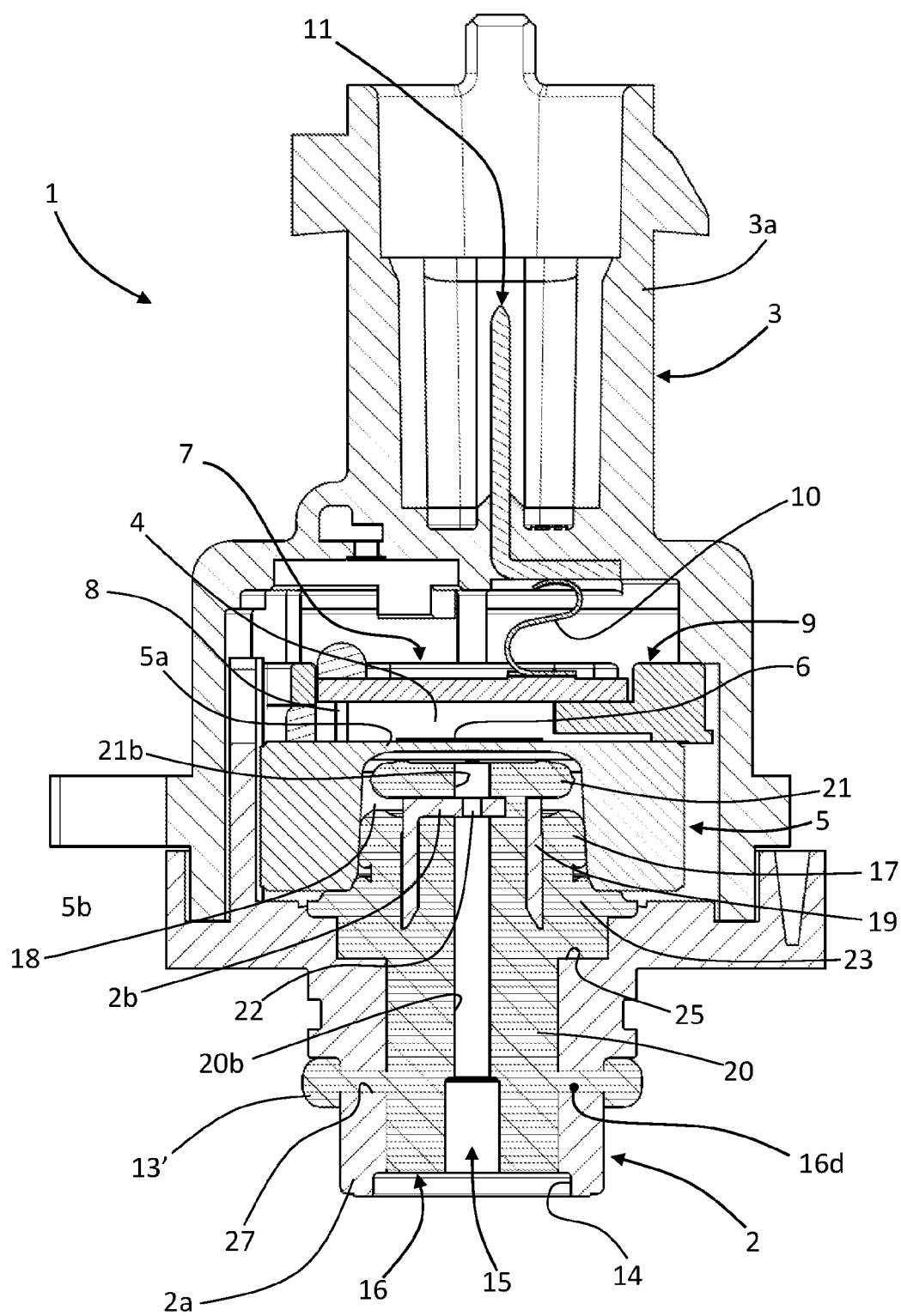
FIG. 6 is a view similar to that of FIG. 3, regarding a different embodiment of a device according to the invention.

Represented in FIG. 6 is a different embodiment of the invention, whereby also passages 27 are provided, which are preferably radial or transverse, that branch off from the duct 14 substantially at the hydraulic-attachment portion 2a. Housed in these transverse passages 27 are respective portions 16d of the deformable body 16, which connect the latter, and in particular the internal compensation element 20, to the external sealing element, here designated by 13'. In this case, then, the external sealing element 13' is overmoulded on the body 2 and is in particular defined by the deformable body 16. If need be, the sealing element 13' can be co-moulded with or overmoulded on the body 2 in a way independent of the deformable body 16 and/or using a different material. The passages 27 could have at least some of the characteristics described previously with reference to the openings 24 and/or to the passages 25, possibly also comprising a number of stretches that extend in different directions.

Figure 7:
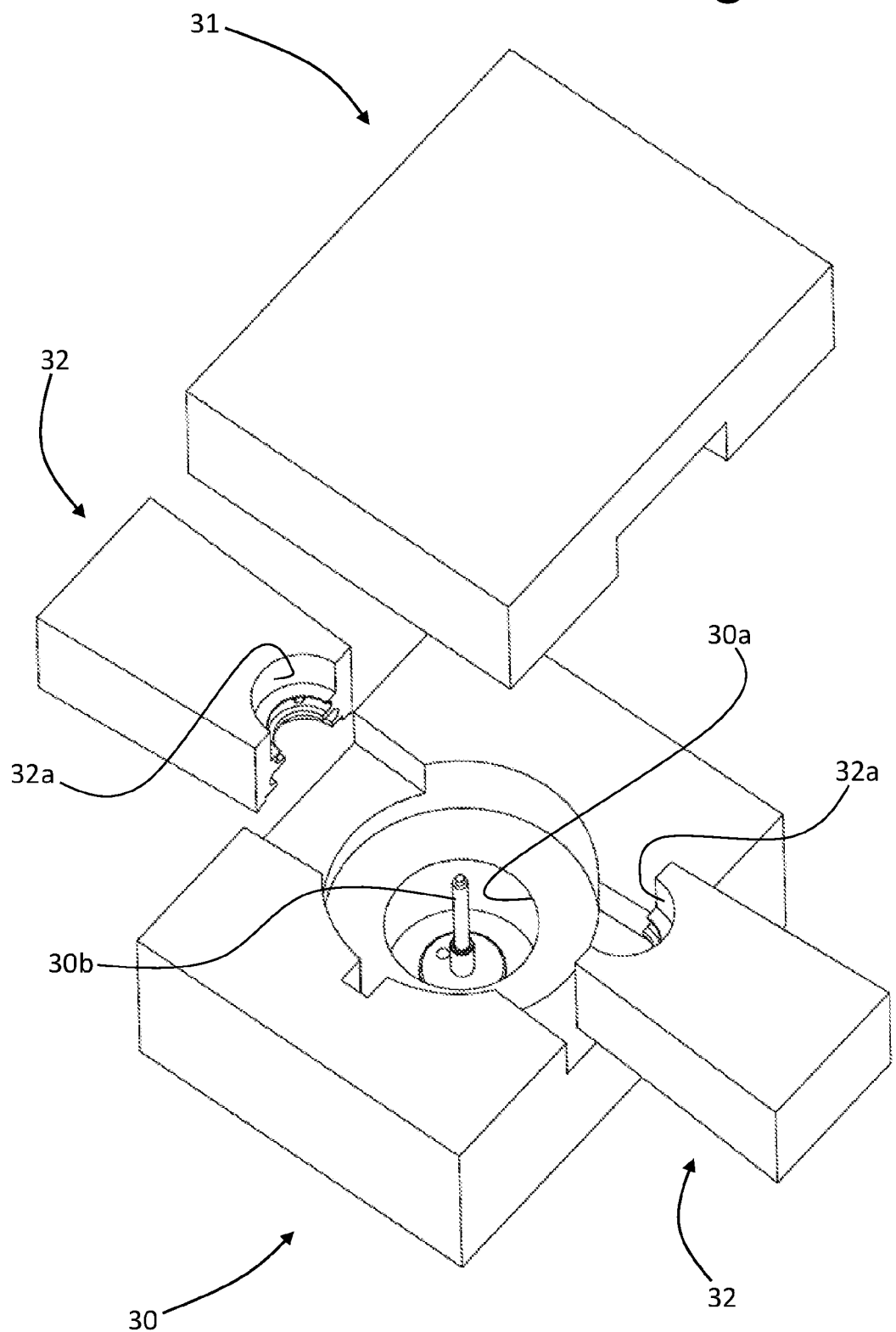
FIGS. 7, 8, and 9 are exploded and/or partially sectioned schematic perspective views of a moulding apparatus that can be used in a process for the production of a device according to the invention, in various operating steps.
Figure 8:
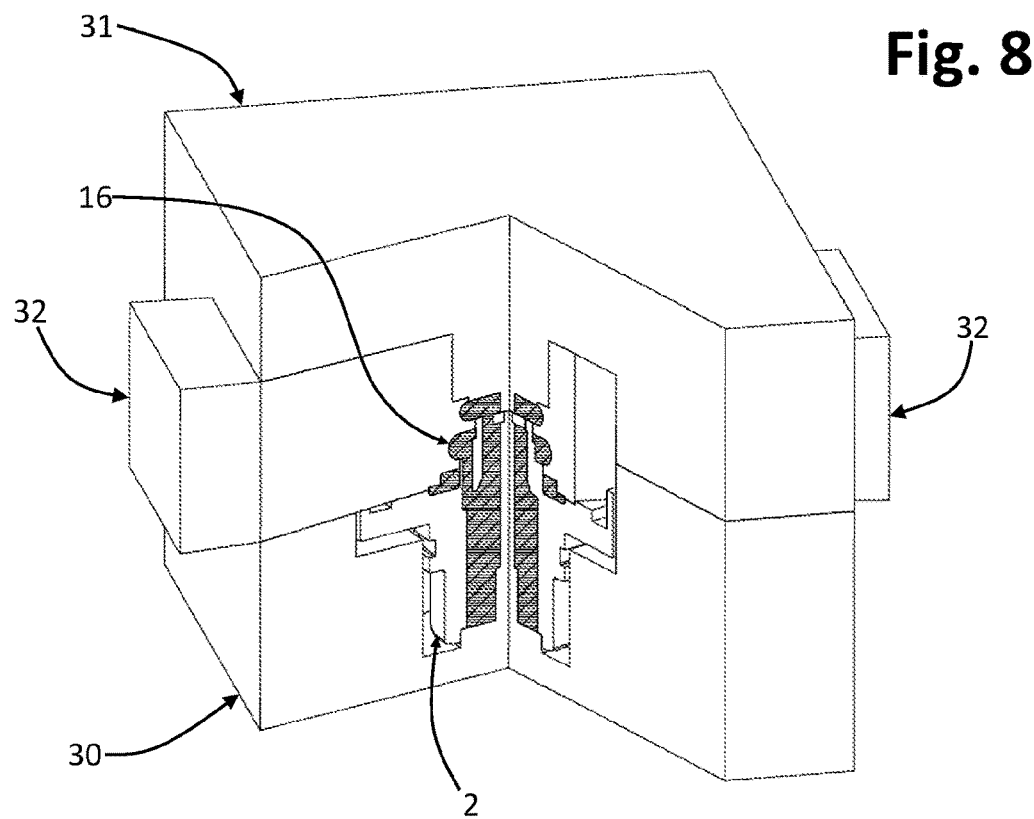
Figure 9:
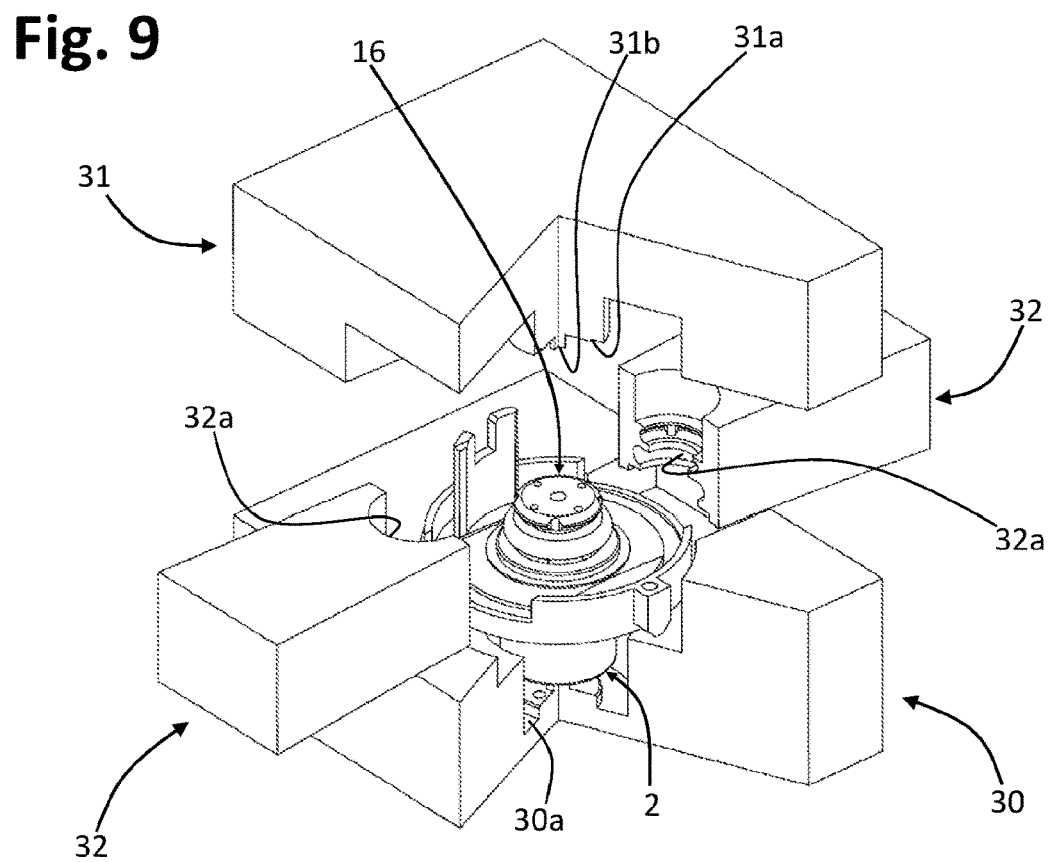

Represented schematically in FIGS. 7-9 is a possible moulding apparatus that can be used for overmoulding of a deformable body 16 on a supporting body 2. With initial reference to FIG. 7, in the example the apparatus comprises two parts of mould 30 and 31. In this example, the part of mould 30 defines an impression 30a for positioning the supporting body 2, obtained previously, whereas the part of mould 31 defines an impression (31a, in FIG. 9) necessary for formation of the deformable body 16.

The apparatus further comprises two sliding blocks or sliders 32, opposite to one another, which may be translated in respective guide passages defined between the parts of mould 30 and 31. The sliders 32 define at the front respective impressions 32a, which bestow thereon—together with the impression 31a—the outer profile or shape of the deformable body 16. The sliders 32 define in particular at least the parts in relief or the recessed parts of the body 16.

According to a variant (not represented), for co-moulding a deformable body 16 with a supporting body 2, the apparatus comprises a first part of mould 30 defining an impression 30a that, associated to a second part of mould alternative to the part 31, enables definition of an impression corresponding to the supporting body 2, which is obtained by injecting a first material. Subsequently, the aforesaid second part of mould is removed and is replaced by the part of mould 31 and by the sliding blocks 32 that define the impression 31a, 32a of the deformable body 16, obtained by injecting at least one second compressible and/or compliant material on the supporting body 2.

The overmoulding or co-moulding apparatus envisages at least a part of mould 30, 31 provided with an element 30b, 31b, substantially of a cylindrical shape, possibly with different sections or diameters, designed to form at least part of the axial hole or passage 20b, 21b of the deformable body 16, i.e., of the compensation elements 20, 21.

In FIG. 8 the apparatus is represented in a condition where the mould is closed after the material necessary for formation of the deformable body 16 has been injected therein. At the moment of injection of the material, in the molten state, into the mould, the material occupies the free spaces defined between the parts 30, 31, 32 and the body 2, as well as the passages (25 and/or 27) of the body itself, thus forming the body 16. It will be appreciated then that, in an application of this type, the supporting body 2 itself comes to constitute a sort of "mould part" necessary for definition of the final shape of the deformable body 16. After the necessary period of cooling and solidification of the overmoulded material, the parts of mould 30 and 31 and the sliders 32 can be re-opened, as illustrated schematically in FIG. 9, with the body 16 by now formed on the body 2.

Figure 10:
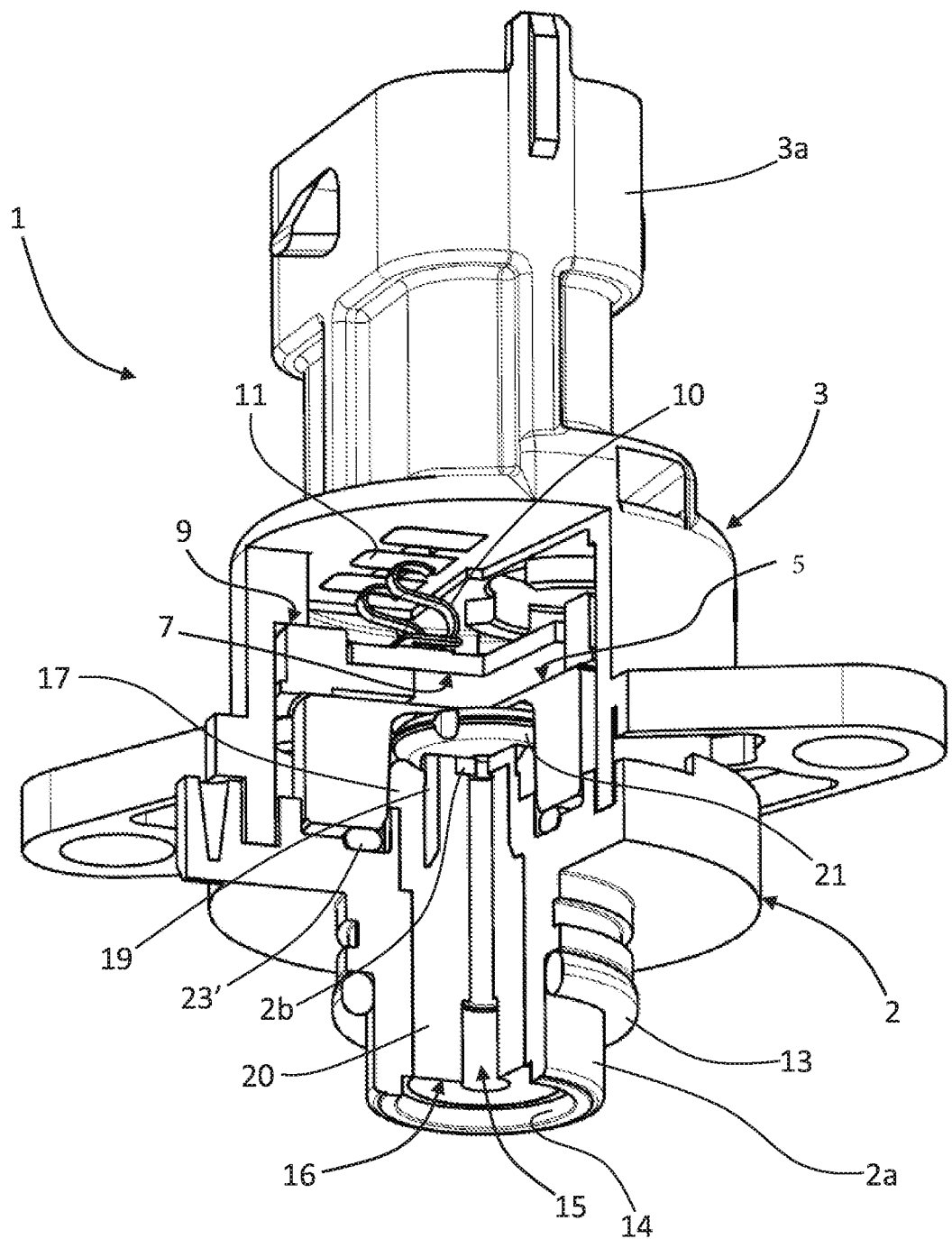
FIGS. 10, 11, and 12 are views similar to those of FIGS. 2, 3, and 4, respectively, regarding a device according to a further embodiment of the invention.
Figure 11:
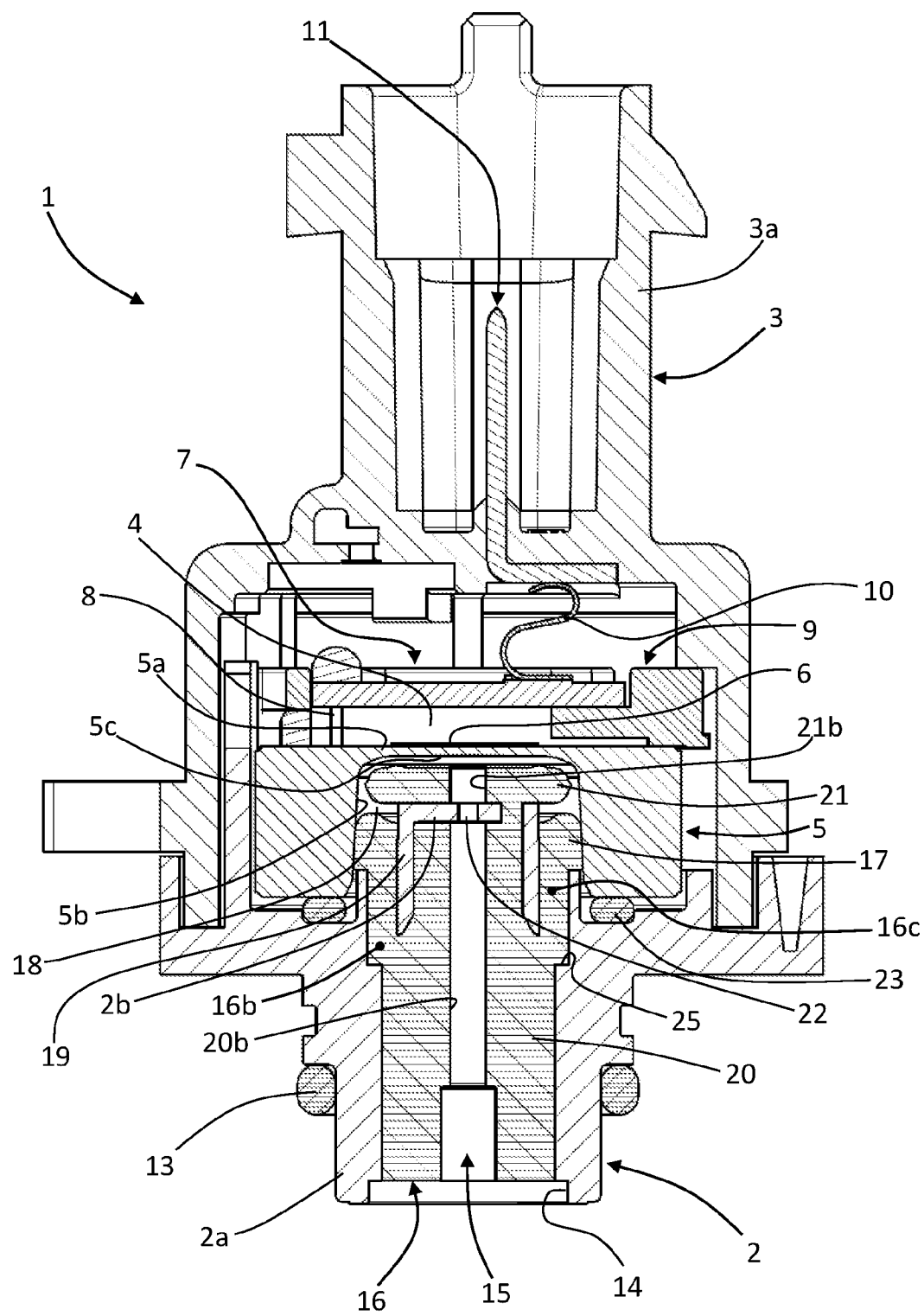
Figure 12:
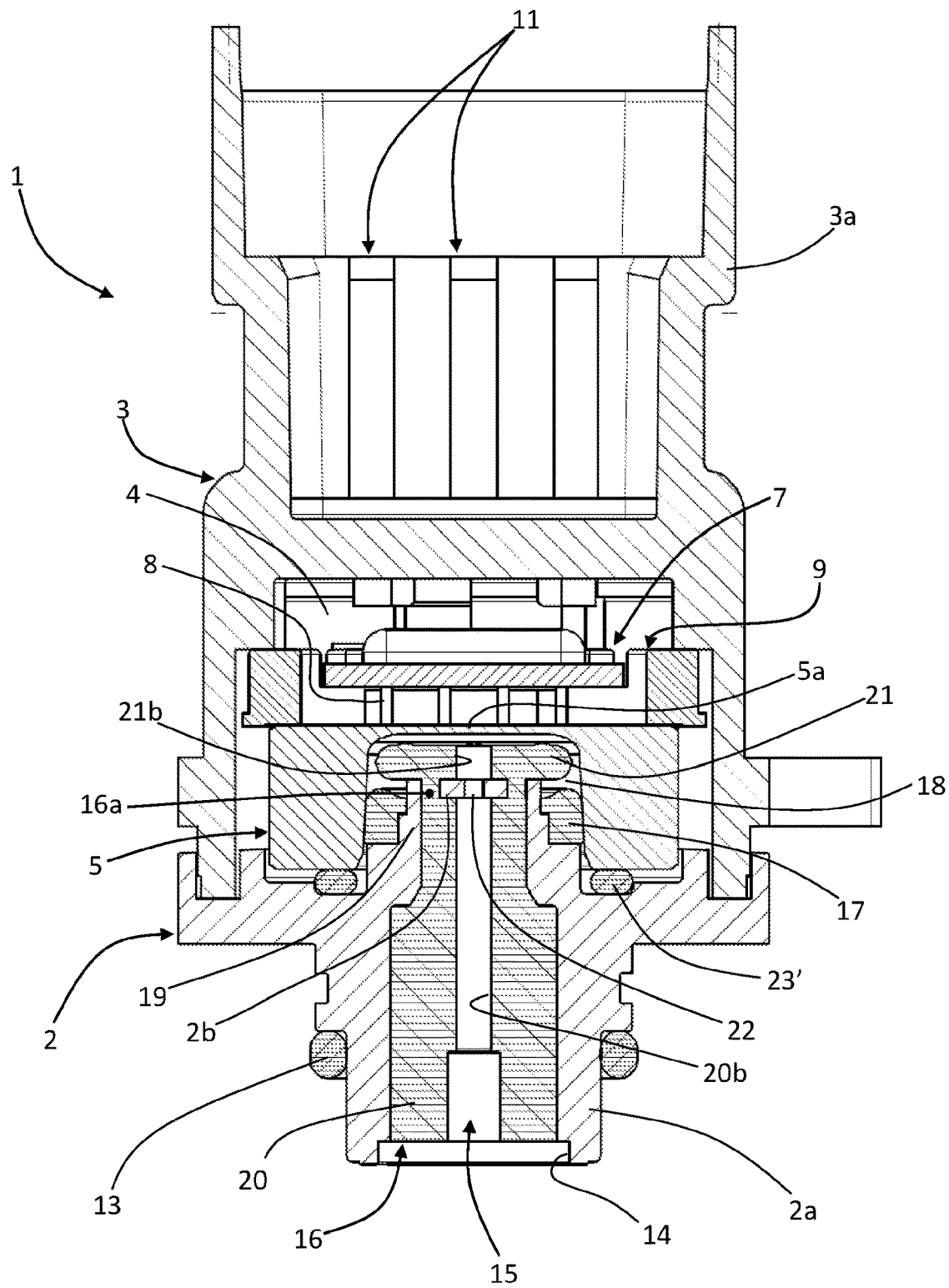

FIGS. 10-12 illustrate, with views similar to those of FIGS. 2-4, a further embodiment of the invention, whereby just the internal sealing element 17 is overmoulded on the supporting body 2 in a single piece with the compensation elements, i.e., the internal element 20 and the external element 21. Consequently, in this solution, the supporting element and the external sealing element are not formed together with other overmoulded parts. In the example, the supporting element is constituted by an annular element 23' made of yielding material, for example a silicone, which is mounted between the upper face of the body 2, to circumscribe the projecting portion 19, and the lower face of the sensor body 4, in particular in the area of the aforesaid face that circumscribes the opening of the blind cavity. Various characteristics described with reference to FIGS. 1-6 may be applied to the embodiment of FIGS. 10-12.

Figure 13:
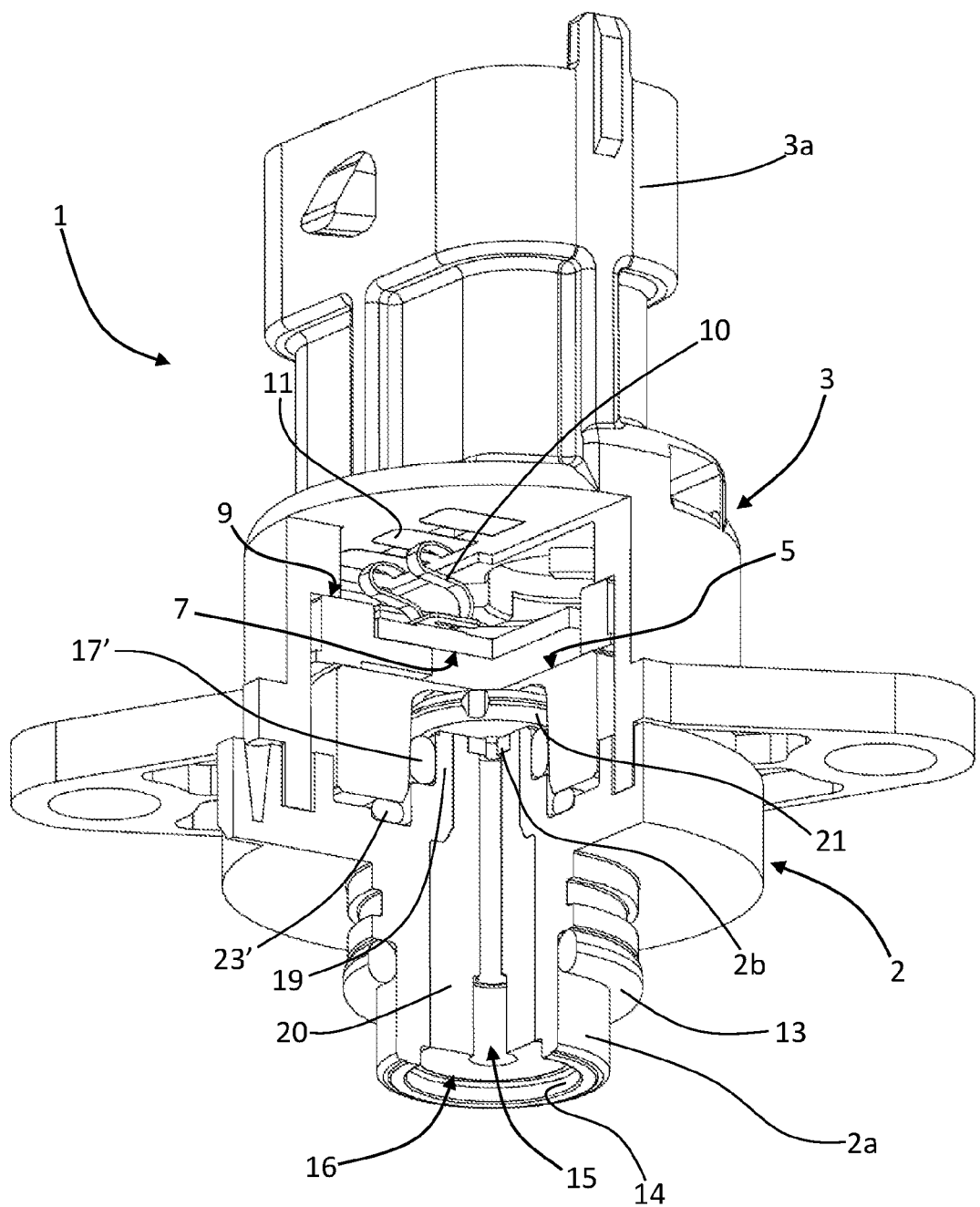
FIGS. 13, 14, and 15 are views similar to those of FIGS. 2, 3, and 4, respectively, regarding a device according to a further embodiment of the invention.
Figure 14:
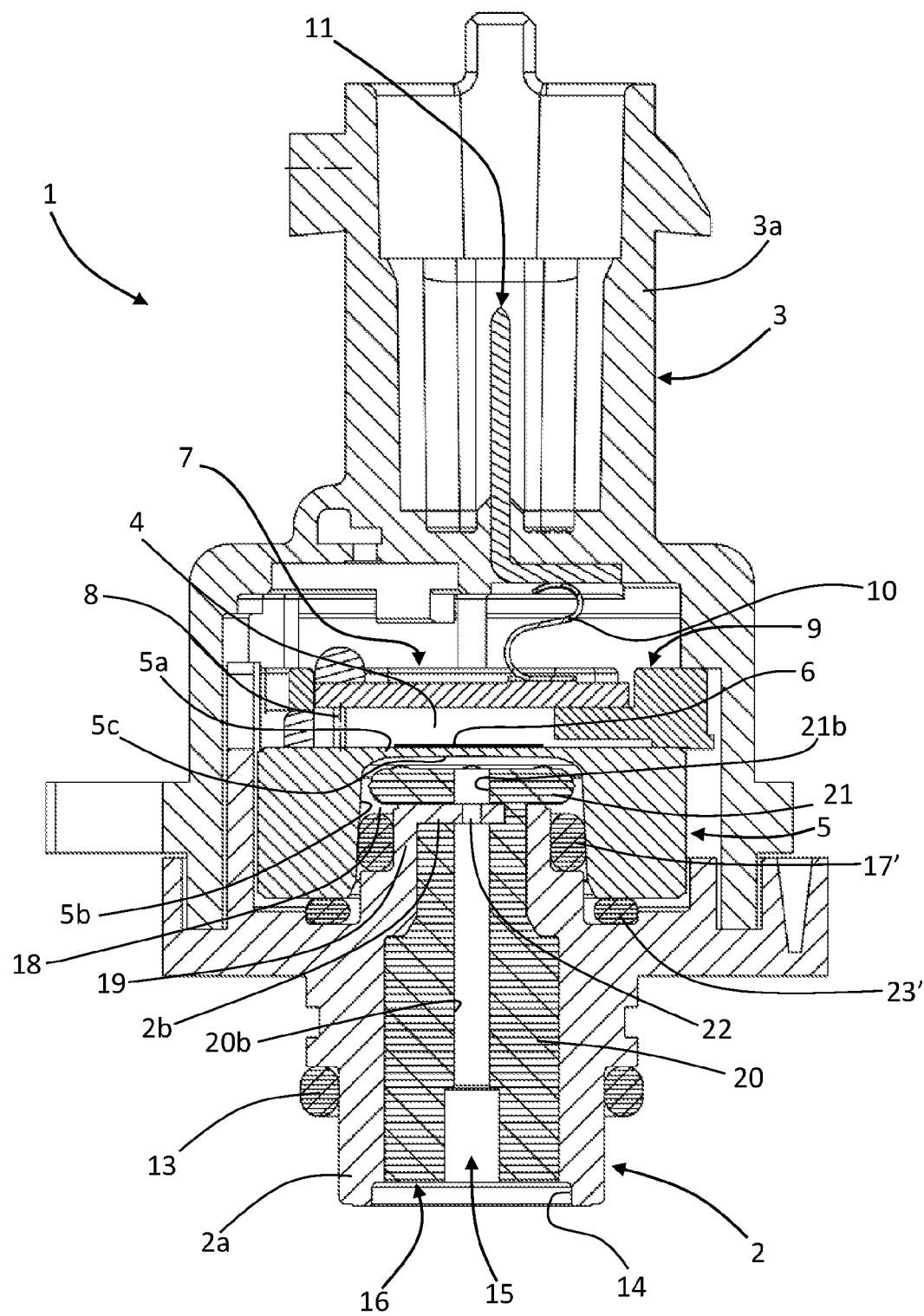
Figure 15:
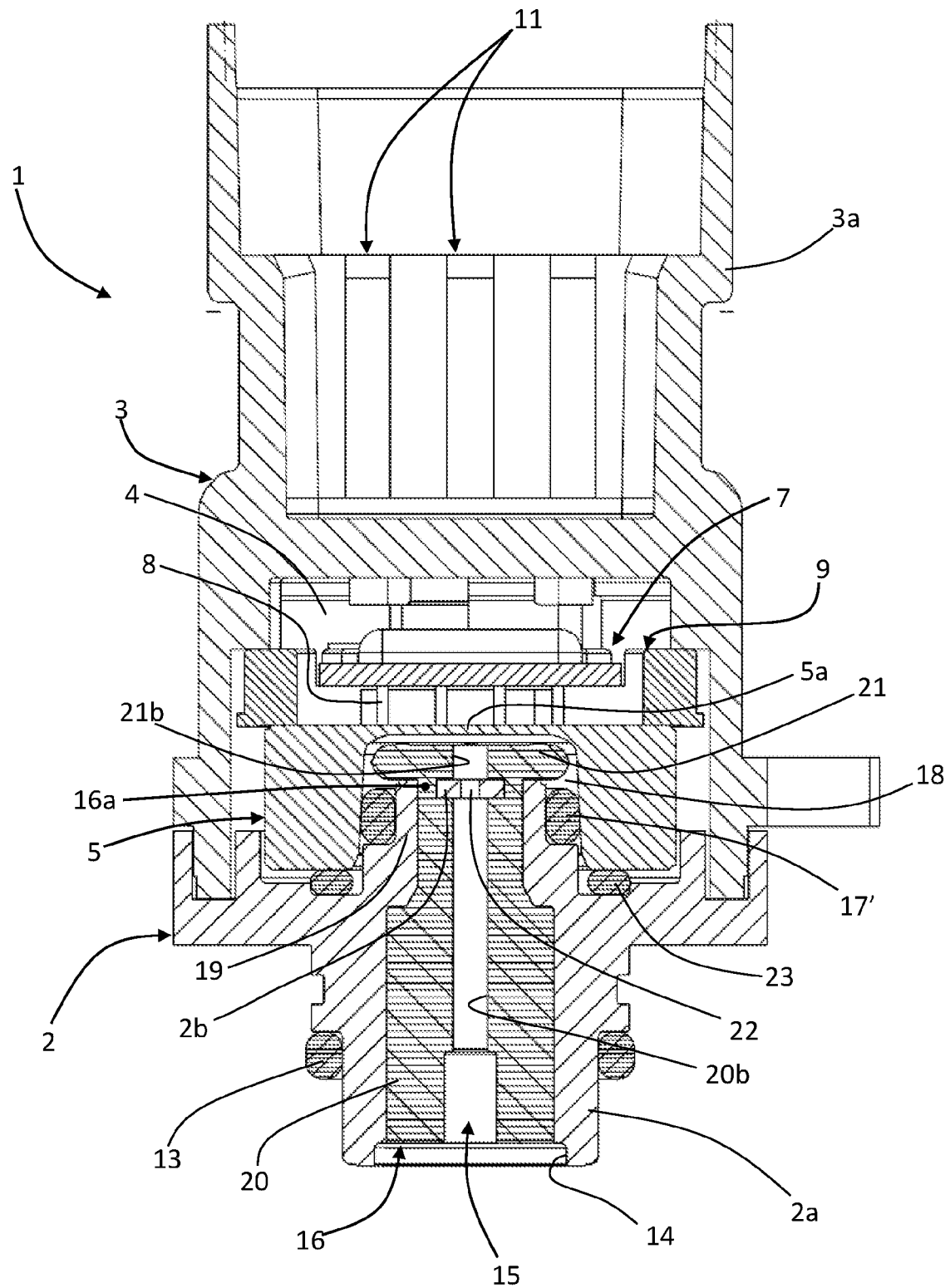

FIGS. 13-15 illustrate, with views similar to those FIGS. 2-4, an embodiment of the invention whereby overmoulded on the body 2 is a deformable body 16 defining just the compensation elements 20 and 21, joined together by way of the connection portions 16a that extend through the corresponding through openings formed in the transverse wall 2b of the duct 14. Also to the embodiment of FIGS. 13-15 various characteristics described with reference to FIGS. 1-6 may be applied.

According to an aspect that is in itself inventive, there will be additionally present both the internal sealing element and the supporting element, or at least one of them. The internal sealing element is constituted by an annular sealing element 17' made of elastically deformable material, fitted on the projecting portion of the body 2 at a corresponding narrowed portion thereof so as to provide a radial seal with respect to the peripheral surface 5b of the cavity of the body 2, and the supporting element is obtained from another annular element 23' similar to the one described with reference to FIGS. 10-12.

The presence of an internal sealing element 17 or 17' ensures a constant seal with respect to the sensor body 5, which substantially is not affected by the axial position of the sensor body 5 with respect to the supporting body 2, considering the fact that the radial compression does not substantially vary if the portion 19 of the supporting body 2 and the cavity of the sensor 5 are both substantially cylindrical and coaxial, or varies only slightly even in the case of frustoconical cavities with slightly inclined walls, thus preventing any infiltration or leakage of the fluid to be detected.

The presence of the supporting element 23 or 23' enables of the sensor body 5 to be elastically urged and/or supported in the casing 2, 3 of the device 1, in particular enabling an assembly in which the sensor body 5 can be pushed, without any damage, by the closing body 3 and/or by a spacer or positioning element 9 towards the supporting body 2. Advantageously, the supporting element 23 or 23' enables the sensor body 5 and/or the elastic contacts 10 of the circuit 7 integrated in or associated to the aforesaid body 5 to be elastically urged and/or pushed towards the terminals 11.

In this regard, it is to be considered that, in particular in the case of bodies or elements 2, 3, 9 made of thermoplastic material, the different distribution of the high dimensional tolerances could lead to combinations in which the sensor body 5 is positioned loose or else, instead, the sensor body 5 is excessively compressed in the casing 2, 3. There follow possible faults in the device 1, which range from excessive compression and failure during assembly to possible faulty electrical contacts and/or excessive fluctuations of the sensor body 5 at the risk of damage, in particular in the presence of high vibrations or stresses in a vehicle.

The supporting element 23 or 23' moreover enables provision of an at least in part axial seal between the sensor body 5 and at least the supporting body 2, which may be a seal additional to the seal obtained via the internal element 17 or 17', when the latter is envisaged.

The supporting element 23 or 23' may be shaped so as to be resilient or exert a thrust with respect to the sensor body 5 according to vectors or forces oriented in different directions, such as an element 23 or 23' that provides a support and/or a seal both in an axial direction and in a radial direction or in any case a direction inclined with respect to the axis of the sensor body 5 or of the duct 14.

Preferably, the combination of the internal sealing element 17 or 17' and of the supporting element 23 or 23' enables the aforesaid internal seal to be obtained, albeit allowing an "elastic assembly", i.e., an assembly that renders possible slight variations or compensations of the axial positioning of the sensor body 5, in particular for compensating the aforesaid dimensional variations of the various elements or parts of the device 1.

FIGS. 16-20 illustrate a further embodiment of a pressure-sensor device according to the invention.

Figure 16:
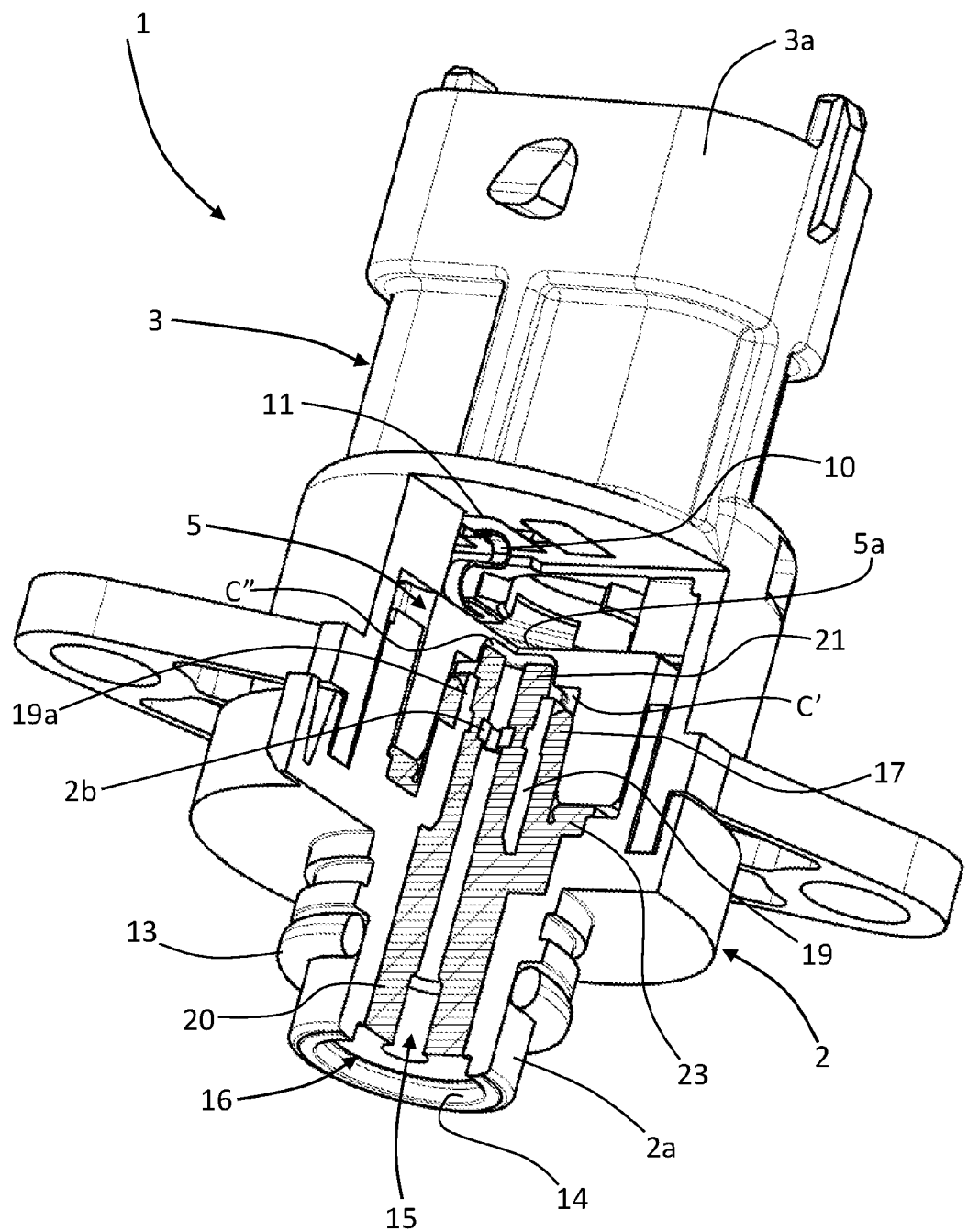
FIGS. 16, 17, and 18 are views similar to those of FIGS. 2, 3, and 4, respectively, regarding a device according to a further embodiment of the invention.
Figure 17:
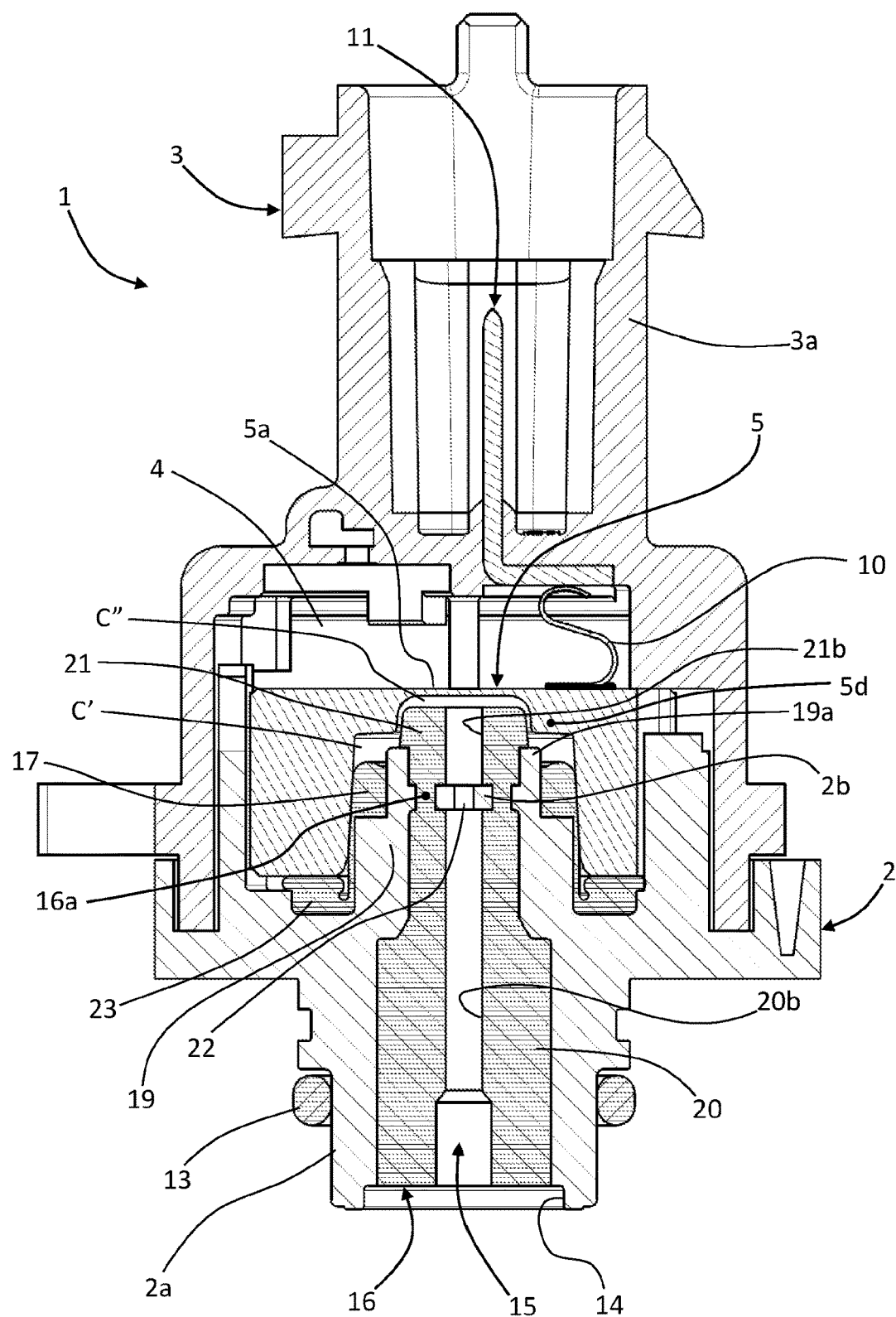
Figure 18:
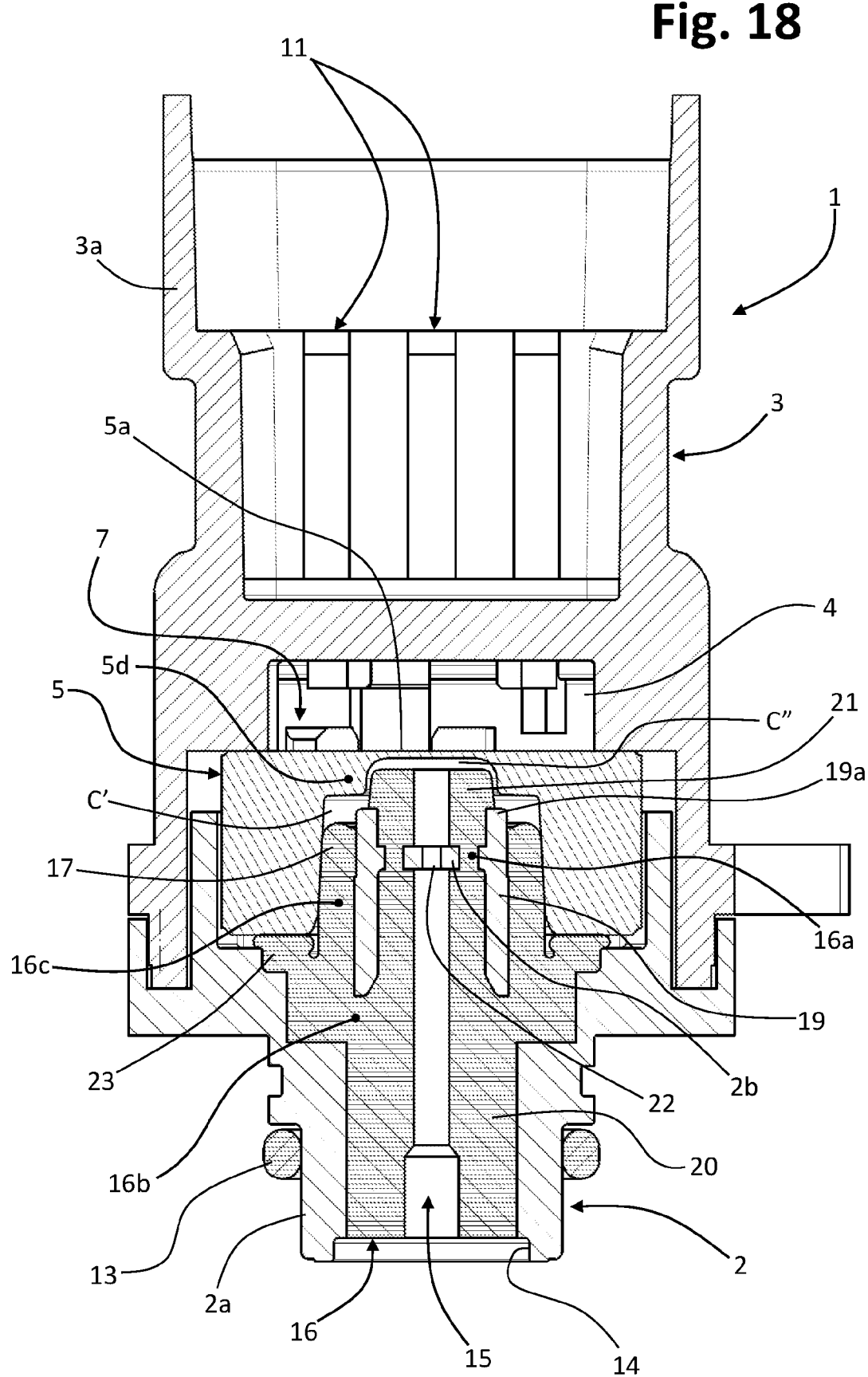

In one such embodiment, and as may be noted, in particular, from FIGS. 16-18, the blind cavity of the sensor body 5 has an intermediate narrowed portion or variation of cross section so as to define a lower cavity portion C', which is wider, and an upper cavity portion C'', which is narrower. An embodiment of this sort proves particularly advantageous in so far as it enables a reduction in the dimensions of the membrane 5a, which in this case forms the bottom of the narrower cavity portion C'' and to which there is in any case associated a corresponding deformation-detection element, here not indicated.

The use of a sensor body 5 with two cavity portions C' and C'' having different cross sections enables provision of a lower, wider, cavity portion C', where it is possible to provide more easily the internal radial seal, i.e., to provide a perimetral seal inside the cavity of the sensor body 5 via the internal sealing element 17 (or 17'), and an upper, narrower, cavity portion C'', which may contain a smaller amount of fluid and is thus subject to lower mechanical stresses in the event of freezing and/or expansion of the fluid. Freezing of the smaller amount of fluid that may be contained in the cavity portion C'' can moreover be more easily compensated by the compressible element 21.

The area of the upper face of the sensor body 5 that surrounds the membrane 5a is hence wider, and corresponding to this area is a portion 5d of the body 5 at least partially thicker than in the previous embodiments. In this way, in the above area of the upper face of the body 5 there can be directly associated electrical/electronic components for signal control, and/or treatment, and/or processing. The device 1 may hence be obtained without the need to provide a support for the circuit 7 as in the case of the previous embodiments, or the corresponding spacer and positioning element 9. The concept may be particularly appreciated from FIG. 17, from which it emerges how the elastic contacts 10 extend in this case directly between the portion of the terminals 11 inside the space 4 and electrically conductive pads or paths (not indicated) provided directly on the upper face of the sensor body 5, in a position that is peripheral with respect to the membrane 5a, even in a position at least in part corresponding to the portion 5d.

In a solution of this sort, it is preferable for the external compensation element 21 to extend at least in part into the upper portion C" of the blind cavity of the body 5. Also in an embodiment of this type, such as the one represented, the element 21 may be made of a single piece with the internal compensation element 20, in particular via overmoulding, as already described with reference to the previous embodiments, the characteristics of which may at least in part also refer to the present example of embodiment. Also in this case, the internal sealing element 17 and/or the lower supporting element 23 may be overmoulded on the body 2, together with or separately from at least one compressible compensation element. In the case exemplified, the elastically deformable body 16 comprises, in addition to the compressible elements 20 and 21, also the internal sealing element 17 and the lower supporting element 23. Obviously, also in an embodiment of this type, in addition or as an alternative, there may be envisaged an overmoulding of the external sealing element 13, as described with reference to the embodiment of FIG. 6, or else the sealing elements 17 and/or the supporting element 23 can be moulded apart or overmoulded on the body 2 with another material.

In one embodiment, the transverse wall 2b of the body 2 is an intermediate wall of the duct 14; i.e., it occupies an intermediate position between the two ends of the duct 14. One such case is also exemplified in FIGS. 16-18. In this embodiment, the duct 14 comprises, downstream of the transverse wall 2b, a portion for housing the element 21, clearly visible for example in FIG. 19, where it is designated by 19a, in particular a hollow portion. With reference also to FIGS. 17 and 18, it may be clearly noted how a first part of the external compensation element 21 is located within the aforesaid portion 19a, here having a basically tubular shape, whereas a second part of the external compensation element 21 is located on the outside of the aforesaid portion 19a.

Preferably, during operation in the case of freezing of the fluid contained at least in the upper cavity portion C", the aforesaid first part of the external compensation element 21 is constrained peripherally by the portion 19a, in particular in order to prevent any radial deformation and/or for supporting more effectively the second part of the element 21, which is preferably compressed or undergoes deformation only in an axial direction with respect to the axis of the duct 14. The second part of the compensation element 21 is, instead, liable to compression or deformation in an axial and/or radial direction and/or according to different angles, in particular in order to compensate freezing and/or expansion of the fluid contained at least in part in the upper cavity portion C".

Preferably, the aforesaid second part of the external compensation element 21 extends at least in part also into the lower cavity portion C' in order to compensate also freezing or expansion of the fluid contained in a part of the aforesaid lower portion C', in the area delimited also by the sealing element 17, where the fluid brings about compression and/or deformation of part of the compensation element 21 in a substantially radial direction.

The configuration of the device visible in FIGS. 16-18, which in particular envisages a sensor body 5 with an intermediate wall 5d of larger thickness as compared to the membrane 5a, also enables use of a sealing element 17 that operates at least in part also as compressible element or elastic compensation element. In this configuration, the axial expansion of the frozen fluid can be countered in one direction, upwards as viewed in FIGS. 17-18, by the aforesaid intermediate wall 5d of larger thickness, while it can be compensated in the opposite direction, downwards as viewed in FIGS. 17-18, by the sealing element 17.

Figure 19:
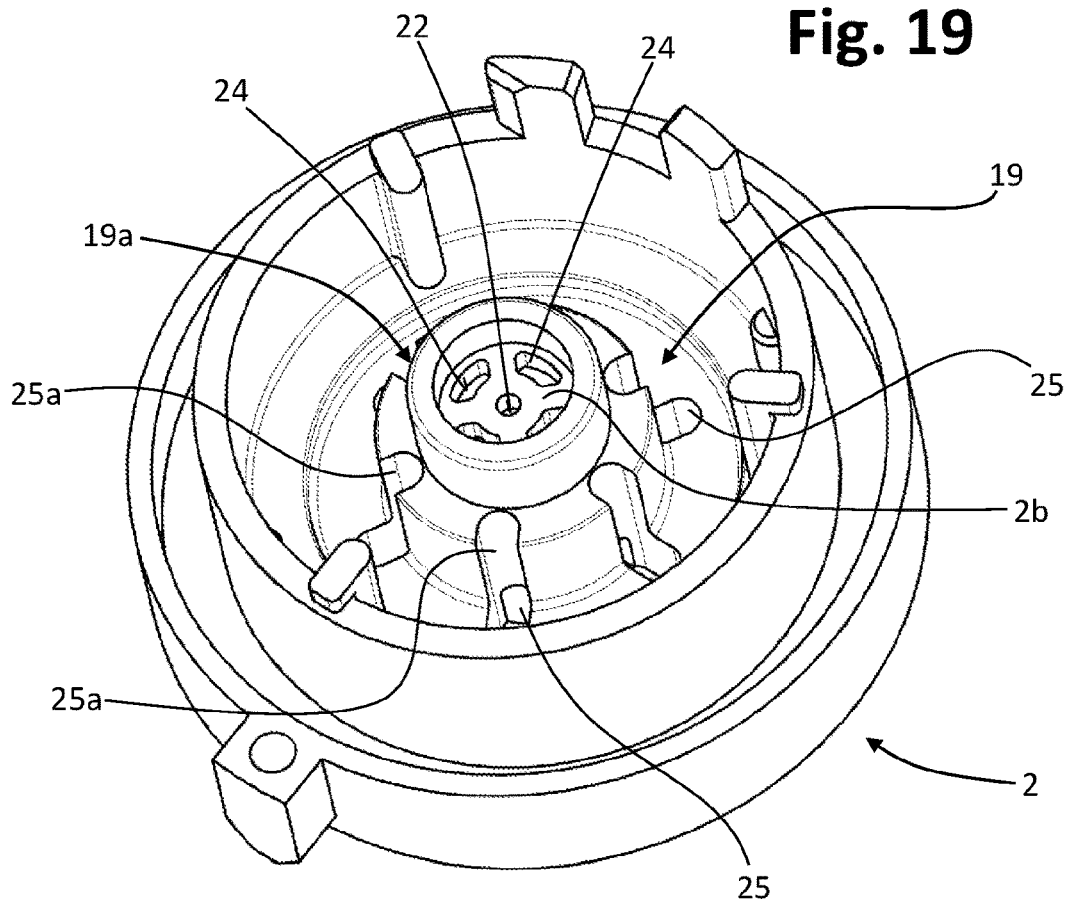
FIGS. 19 and 20 are schematic perspective views of a supporting body and of an elastically deformable body, respectively, of the device of FIGS. 16-18.

From FIG. 19 it may be noted how the housing portion 19a is located basically at the top of the projecting portion 19. Once again from the aforesaid figure it may be noted how the transverse wall 2b preferentially presents a central passage 22 for the fluid and a plurality of peripheral passages 24, which are to house respective connection portions 16a between the compensation elements 20 and 21.

Advantageously, the sealing element 17 can be located at or in the proximity of the transverse wall 2b of the body 2 and/or of the connection portions 16a between the compensation elements 20 and 21. Preferably, the sealing element 17 is located in the proximity of the area of variation of cross section between the lower cavity portion C' and the upper cavity portion C" and/or in the proximity of the housing portion 19a. Preferentially, and as may be noted in FIGS. 17 and 18, starting from the central passage 22 and proceeding outwards, there are encountered, in order, a portion of the transverse wall 2b, a portion 16a of the deformable element 16, a portion of the housing 19a, a portion of the sealing element 17, and the sensor body 5.

Figure 20:
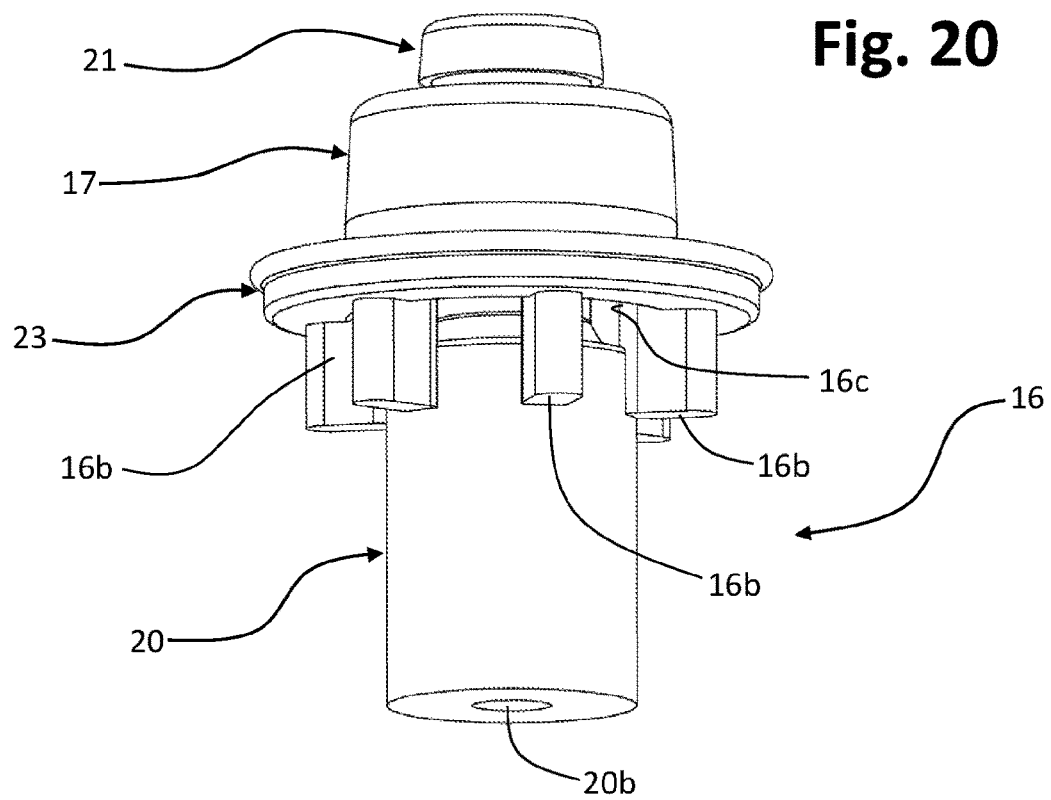

Visible in isolation in FIG. 20 is an elastically deformable body 16 that can be used in a device according to the example of FIGS. 16-19. There may be identified the compensation elements 20 and 21, the internal sealing element 17, preferably having a substantially tubular or annular configuration, and the supporting element 23, substantially like an annular cap. Preferably, the sealing element 17 is substantially frustoconical or cylindrical, with a shape and dimensions designed to fit in a sealed way and/or with elastic interference with the cavity portion C' of the sensor body 5.

Also visible are some of the portions 16b, 16c that connect the element 20 to the supporting element 23 and/or to the sealing element 17 and that extend orthogonal or angled with respect to one another, in particular in part radially and in part axially with respect to the compensation element 20 (the portions 16b and/or 16c could possibly have a shape that is at least in part curved). These portions are within the passages 25, 25a of FIG. 19, thus guaranteeing, together with the portions 16a (FIG. 18), precise positioning and/or fixing of the various portions of the deformable body 16.

Consequently, according to an aspect that is in itself independently inventive, a deformable body 16 or at least one compensation element 20, 21 is provided with positioning and/or fixing portions 16a, 16b, 16c, 16d. Preferably, there are provided at least one of the following: positioning and/or fixing elements 16a located in a first end area of the deformable body 16; positioning and/or fixing elements 16b, 16c located in an intermediate area of the deformable body 16; and positioning and/or fixing elements 16d (FIG. 6), located in a second end area of the deformable body 16. In particular, at least some positioning and/or fixing elements 16a, 16b, 16c, 16d are connected together and to at least one further positioning and/or fixing element, preferably of an annular or at least in part circular or curved shape, obtained on an outer profile and/or a seat of at least a part of the casing 2, 3 of the device 1. In the examples illustrated, the aforesaid at least one further positioning and/or fixing element comprises at least one of the elements 13, 17 and 23. Considering a structure similar to the one represented, the portions 16b, 16c could also converge in an external ring that does not operate as a seal, obtained with the sole purpose of connecting together the portions 16b, 16c, to get the moulding material to flow more effectively and/or to improve fixing.

Figure 21:
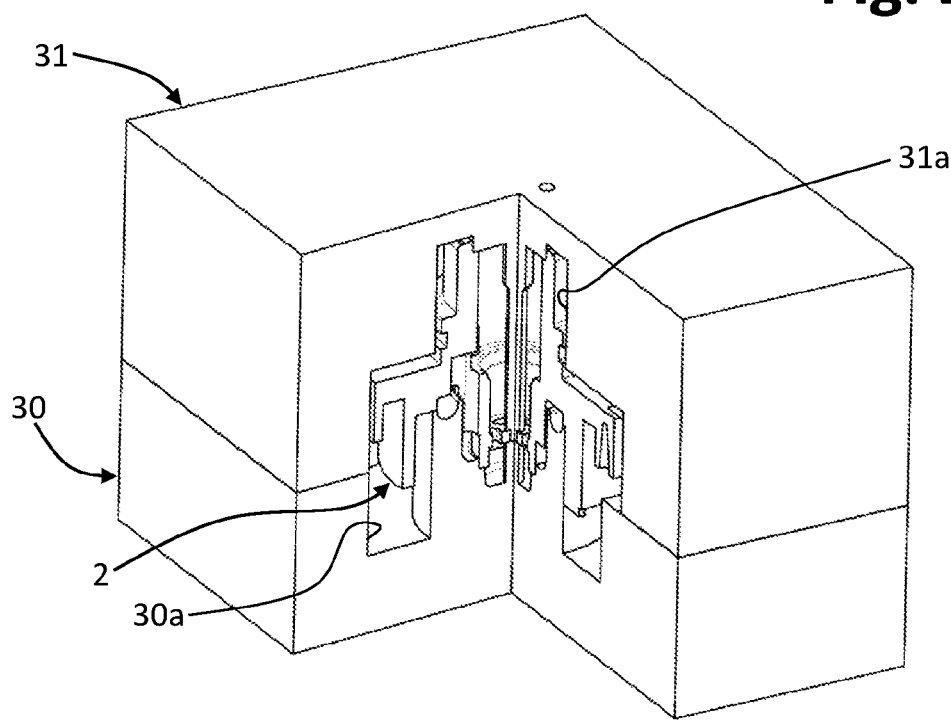
FIGS. 21 and 22 are partially sectioned schematic perspective views of a moulding apparatus that can be used for producing a device according to the invention, in various operating steps.
Figure 22:
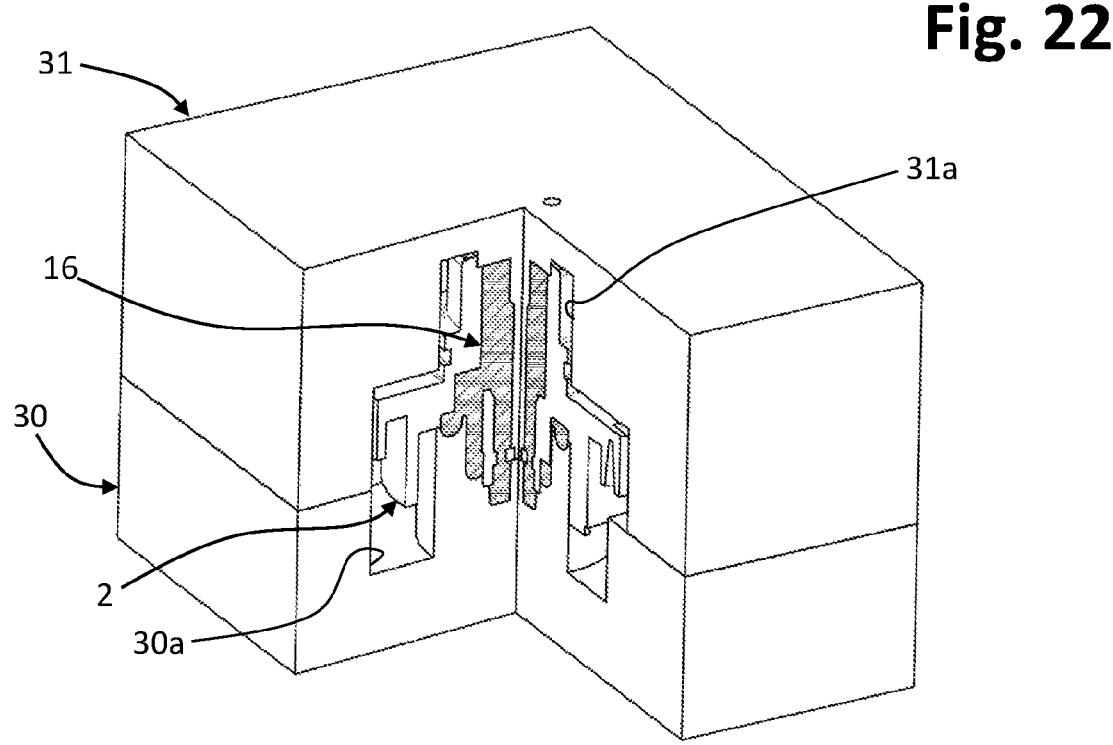

FIGS. 21 and 22 illustrate a possible moulding apparatus that can be used for producing the deformable body 16 of FIGS. 16-20. In this case, the moulding apparatus does not envisages movable sliders, but simply two parts of mould 30 and 31, which define the respective impressions 30a and 31a for positioning the supporting body 2 and for definition of the outer profile of the deformable body 16.

The aforesaid simplified structure of the mould 30, 31, without sliders, can be obtained by providing an element 17 that has a shape without any recess, such as a substantially frustoconical or cylindrical shape.

In FIG. 21, the mould is closed, with the body 2 inside, whereas in FIG. 22 also the body 16 moulded on the body 2 is visible. A similar mould could be envisaged for overmoulding of just some elements or parts of the body 16, such as the parts 17, 20, 21, 23, 16a, 16b, 16c.

FIGS. 23-28 regard a further embodiment of the invention, basically distinguished by the use of a sensitive element with a sensor body that has a shape different from the embodiments described previously, such as a sensitive element that is substantially plane or is provided with a substantially plane membrane or lower surface, in particular a surface that is at least in part plane facing at least one of the ducts or passages 14, 15, 21b, 22 for inlet and/or detection of the fluid. Preferentially, the sensitive element defines both a flexible portion or membrane and a portion that is substantially rigid or rigidly fixed. In the example illustrated, a sensor body is provided made up of two parts 5', 5", which defines a cavity C delimited both peripherally and at the two axial ends. Preferably, the part 5' of the body of the sensor is monolithic and/or substantially rigid, and the part 5" is at least in part flexible in order to provide the deformable membrane 5a, where the part 5" defines the aforesaid lower surface that is at least partially plane.

The cavity C may be closed, as in the example illustrated, and sensitive elements having this configuration are used for producing pressure sensors of an absolute type, in which case in the closed cavity C there is present a known positive or negative pressure, or else a vacuum. In other embodiments, the cavity C may be in fluid communication with the environment via a small hole defined in the body part 5'.

In these configurations, the sensor body thus includes at least two body parts 5', 5" glued or welded together or rendered fixed with respect to one another, between which the cavity C is obtained. In one embodiment, such as the one illustrated in FIGS. 23-25, a part 5', which is preferably monolithic, defines the cavity C, and another part 5" defines the deformable membrane 5a at the centre. In other embodiments, the cavity C is delimited and/or defined in height by the thickness of the material that glues and/or renders fixed the two parts 5', 5".

The part 5" is here substantially in the form of lamina and is rendered fixed (for example glued) with respect to the lower face of the body part 5', preferably to a face on which a blind cavity opens or is provided.

In sensitive elements of this type, the depth of the cavity C (whether it is defined by the body 5' or determined by the thickness of the annular gluing layer of the part 5") is generally modest, so that the thickness of the body part 5' on the side opposite to the membrane 5a can be such as to render rigid the body 5' and/or such as to enable direct installation of electrical components and/or electronic components for control and/or calibration and/or processing. The deformation-detection element 6 may be at least in part associated to the inner side of the body part 5" that forms the membrane 5a, and hence in a position protected from the fluid.

For instance, a sensitive element of this type, which can be used for the purposes of implementation of the invention (for absolute or relative pressure sensors), is the one described in WO 2010/134043, the teachings of which are considered as being incorporated herein. Also in such an embodiment, consequently, the presence of a circuit on a corresponding support and/or corresponding spacer element is not strictly necessary. In a further example of embodiment, the sensing element 6 may comprise at least one electrode provided on one side of the body part 5", i.e., the membrane 5a, preferably a side not exposed to the fluid or facing the cavity C. At least one second electrode may be provided on a corresponding side of the body 5', in particular a side facing the cavity C.

As in previous embodiments, also in this case elastic contacts 10 may be used, which extend between portions of the terminals 11 inside the space 4, and corresponding conductive pads or paths provided on the circuit 7, in particular on the top face of the body part 5'.

In the case exemplified in FIGS. 24-28, the deformable body 16 defines, not only the compensation elements 20 and 21, but also the supporting element 23 that comprises at least some of the sealing characteristics described previously with reference to the element 17. The element 23 provides a support and/or a seal of an axial type, between the upper face of the body 2 and the body part 5" that forms the membrane 5a, specifically at an area of the part 5" that surrounds the end of the cavity C (or in a position corresponding to an area of fixing or gluing between the part 5' and the part 5"). From FIGS. 24 and 25 it may be appreciated how, in an embodiment of this type, the membrane 5a is set between the cavity C or the sensor body 5', 5" and the external compensation element 21.

The compensation element 21, in embodiments of this type, constitutes a sort of disk, the lower surface of which preferentially rests completely on the upper face of the body 2. Preferentially, moreover, the diameter of the element 21 is larger than the diameter of the internal compensation element 20.

Figure 25:
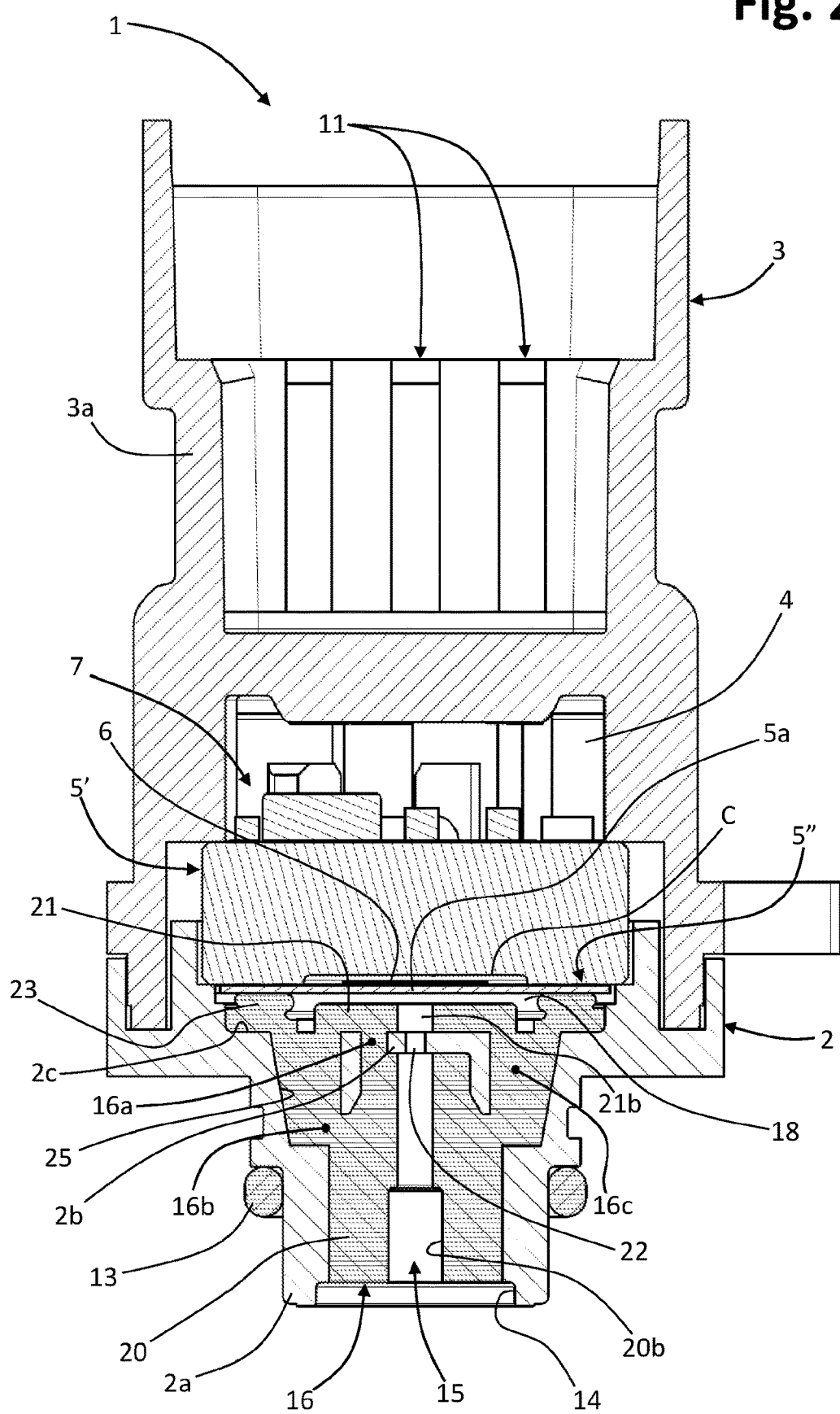
Figure 26:
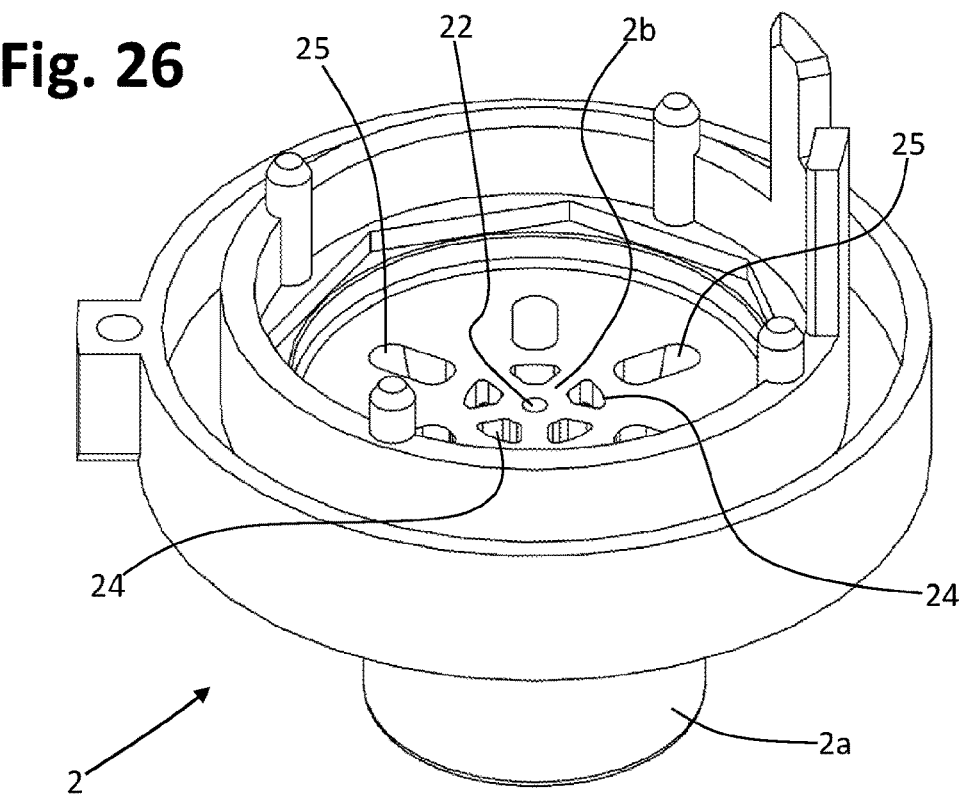
FIG. 26 is a schematic view of a supporting body of the device of FIGS. 23-25.

From the aforesaid figures, and in particular from FIG. 25, it may likewise be noted how—according to an aspect that is in itself inventive—the lower supporting and/or sealing element 23, preferably overmoulded on the supporting body 2, extends in this case—with respect to the upper face of the supporting body 2—up to a height greater than the height of the compensation element 21, which is also preferably overmoulded on the supporting body 2. Thus, the collection chamber 18 is in any case delimited, within which the element 21 is located in a position generally facing and at a distance from the membrane 5a.

According to another aspect that is in itself independently inventive, the lower supporting and/or sealing element 23 operates at least in part as compensation element or compressible element. In particular, the element 23 is designed to undergo deformation or compression at least in part for compensating any possible expansion during freezing of the fluid contained in the collection chamber 18, preferably compensating any expansion and/or undergoing compression or deformation in a direction substantially radial or orthogonal to the axis of the device 1, and/or of the sensor body 5', 5", and/or of the duct 14, 22.

Also in solutions of this type, which are also independently inventive, there may be implemented characteristics already described with reference to the previous examples. For instance, also in this case, the duct 14 preferentially has a transverse wall 2a, substantially at the upper face of the body 2, provided with a corresponding central axial passage 22 for the fluid, as is clearly visible in FIG. 26, and one or more peripheral passages 24, for the connection and/or fixing portions 16a between the compensation elements 20 and 21. There are then also provided the passages 25, in part transverse or radial and in part axial, which are to be occupied by the connection portions 16b, 16c between the element 20 and the sealing element 17. Obviously, also in this case it is possible to form in a single piece—in particular via overmoulding—one or more of the compensation elements 20, 21 and at least one from among the element 23, the element 13, and possibly the element 13.

The example of FIGS. 24-28 preferably refers to the case where the two bodies 2 and 3 block one another and/or block the sensor body 5', 5" in a predefined position, where in this case the element 23 operates prevalently as sealing element and/or radial compensation element. However, considering that preferably the bodies 2, 3 are obtained via moulding of thermoplastic material (and are hence subject to variable dimensional tolerances due to the possible different shrinkage of material), in the case where blocking of the sensor body 5', 5" between the bodies 2, 3 does not occur (for example, as a result of an unfavourable combination of the dimensional tolerances), then the supporting element 23 intervenes, which in any case elastically supports and pushes the sensor body 5', 5" in the direction designed to guarantee a good electrical connection between the electrical contacts 11, 10.

According to a possible variant, a configuration is provided in which the aforesaid blocking action between the two bodies 2 and 3 is not envisaged (for example, to prevent the risk of excessive compression on the sensor body in the case of unfavourable dimensional tolerances of the bodies 2, 3), envisaging beforehand a supporting and/or thrust function of the sensor body via the element 23, also allowing a predefined relative compression thereof for the purposes of axial seal of the element 23 itself.

For the purposes of the aforesaid supporting and/or sealing functions, the element 23 is preferably overmoulded at least in part on a corresponding portion of the body 2 that is designed to guarantee an appropriate support in an axial direction, such as the step designated by 2c in FIG. 25.

Figure 28:
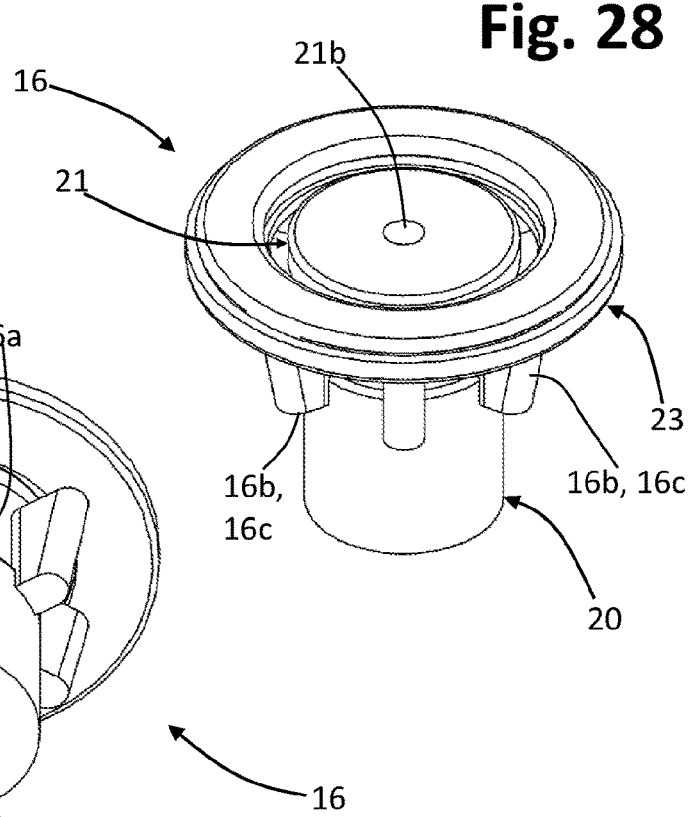
FIGS. 27 and 28 are schematic perspective views of an elastically deformable body of the device of FIGS. 23-25.
Figure 27:
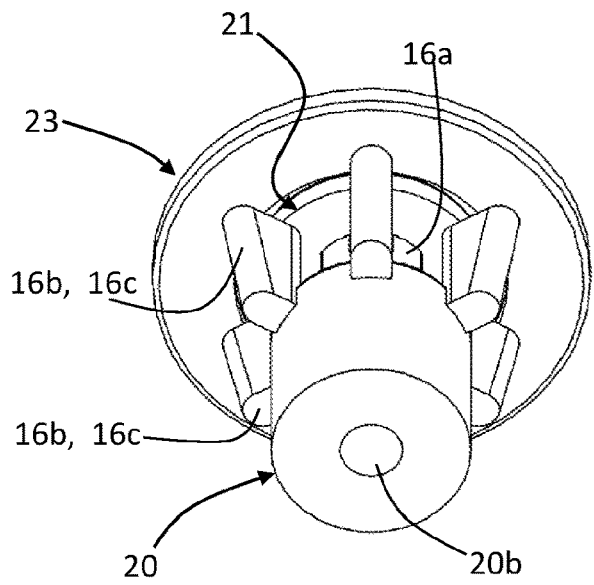

Visible in isolation in FIGS. 27 and 28 is the deformable body 16 of FIGS. 23-26. Also in this case, the compensation elements 20 and 21 of the body 16 may be clearly identified, as well as the element 23, which here has a generally annular configuration and is connected to the element 20 via the portions 16b, 16c. Also partially visible are the connection portions 16a between the elements 20 and 21.

Figure 23:
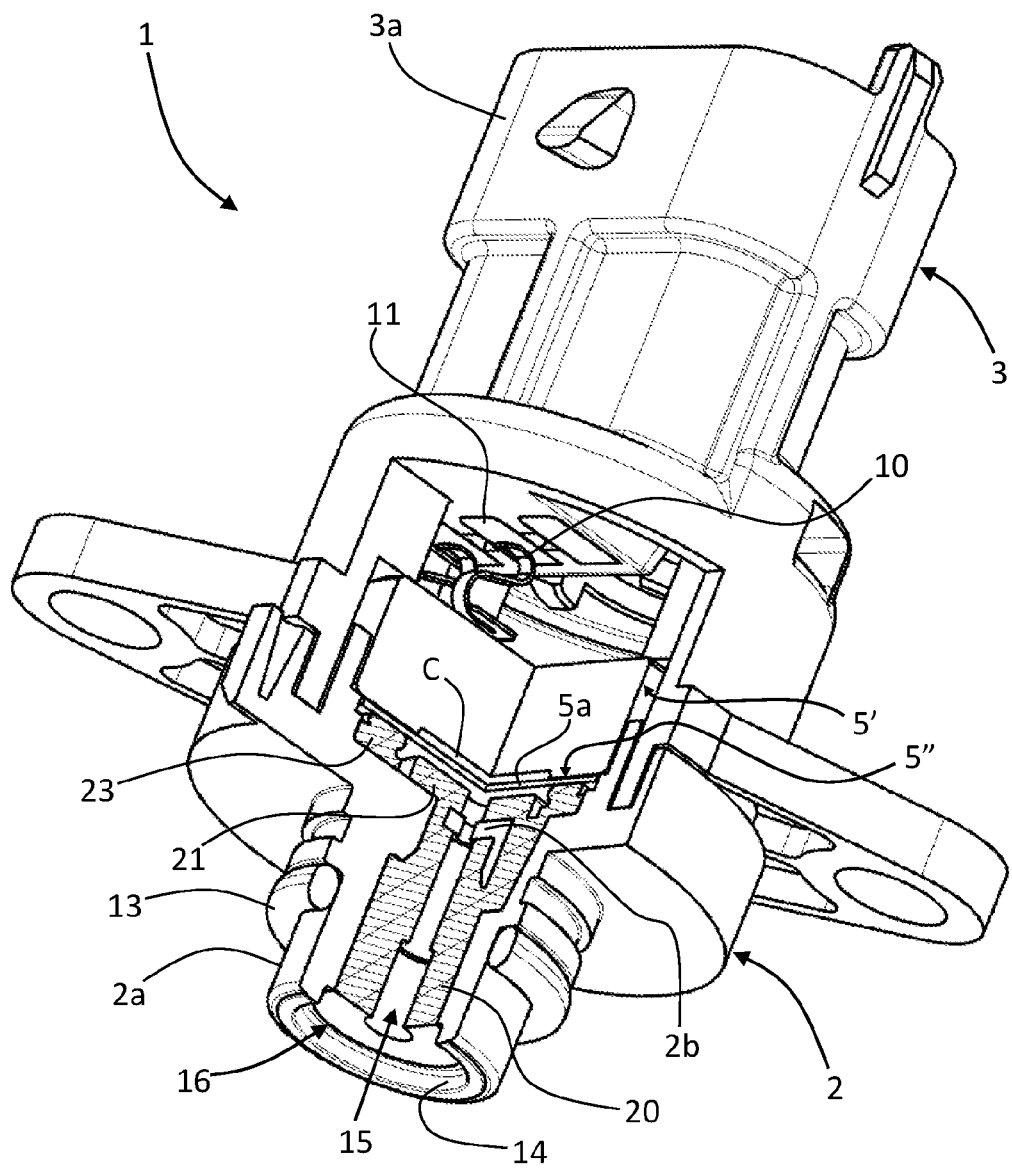
FIGS. 23, 24, and 25 are views similar to those of FIGS. 2, 3, and 4, respectively, regarding a device according to a further embodiment of the invention.
Figure 24:
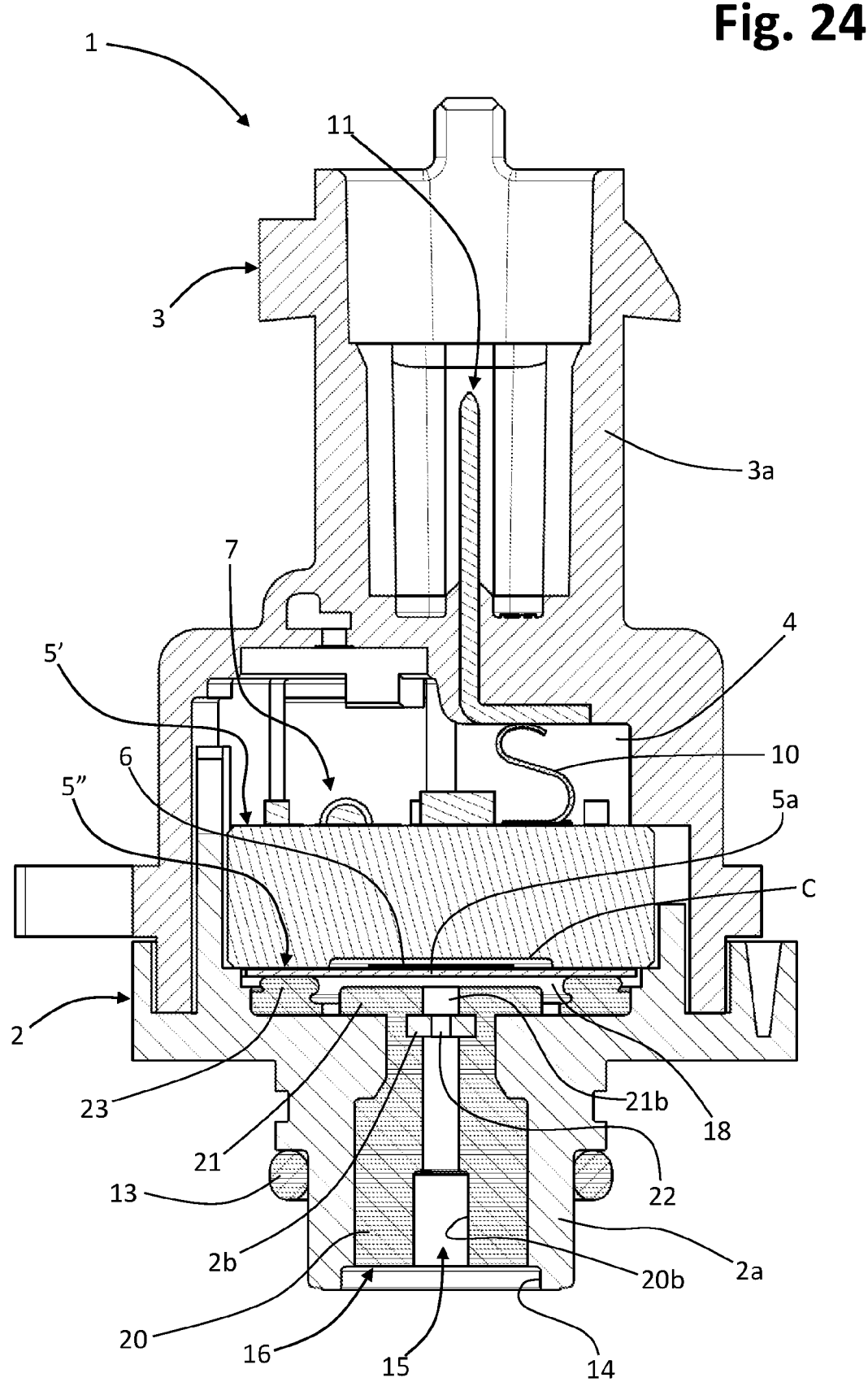
Figure 29:
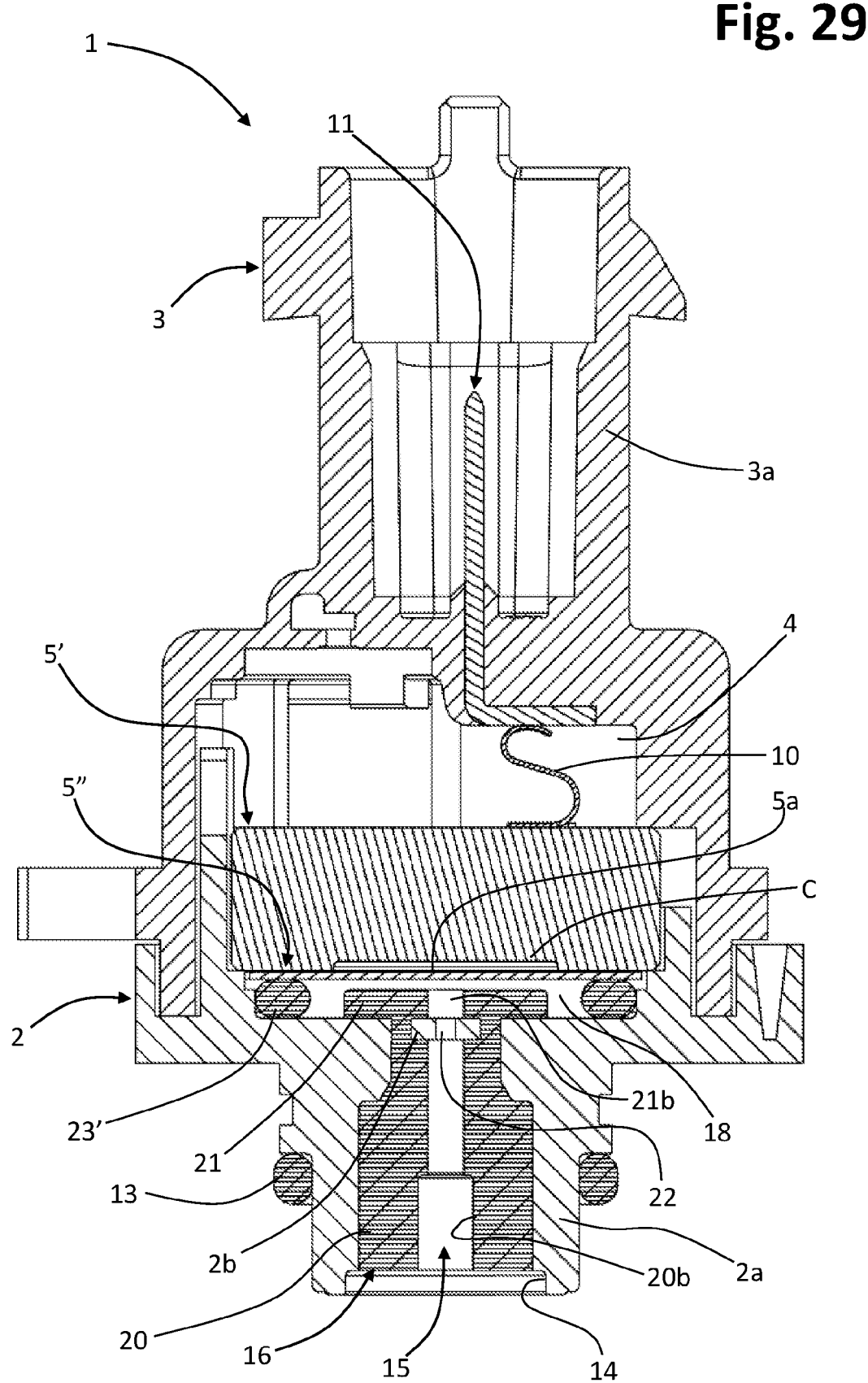
FIG. 29 is a view similar to that of FIG. 3, regarding a variant embodiment of the device of FIGS. 23-25.

FIG. 29 illustrates a variant embodiment of the device of FIGS. 23-25, whereby the device 1 comprises a deformable body 16 with two compensation elements 20 and 21 joined together, to form a single body. In this embodiment, there is in any case provided a lower supporting and/or sealing element that is not configured as overmoulded part and is not fixed with respect to the body 16, but is constituted by an annular element 23' set between a peripheral portion of the membrane 5a, or else radially external to the area occupied by the cavity C of the sensor body 5'; 5", and the top face of the supporting body 2.

To the variant embodiment of FIG. 29 there may be applied characteristics already described with reference to the embodiment of FIGS. 24-28, also in this case there being envisaged at least one compensation element 20, 21 overmoulded on a part 2 of the casing body of the device 1. At least one further lower supporting and/or sealing element 23' is preferably present, configured as part separate from at the least one compensation element, for example mounted or overmoulded on the body 2, in particular made of a material different from that of the at least one compensation element.

In embodiments of the type illustrated in FIGS. 23-28 and 29 (and in FIG. 42, described hereinafter), it is preferable for the compensation element to present one or more of the following characteristics:

the upper side of the element 21 is substantially parallel to the body part 5";

the lower side of the element 21 rests on or is fixed to an upper surface of the supporting body 2 that faces the body part 5";

a peripheral side of the element 21 faces a lower supporting element 23 and/or an axial sealing element 3', in particular in a radial direction with respect to the axis of the device 1;

the element 21 has at least one hole or passage 21b, with axis substantially orthogonal to the lower surface of the body part 5".

Practical tests conducted by the present applicant have made it possible to ascertain that, according to an aspect that is in itself independently inventive, for the purposes of production of at least part of the elements overmoulded on a part of the device 1 and/or on the supporting body 2 (whether they are configured as single elements or as elements defined at least in part by a single elastically deformable body), it is particularly advantageous to use materials having a bulk modulus comprised between 0.1 MPa and 1 GPa, preferably between 0.2 MPa and 100 MPa, very preferably between 0.5 MPa and 10 MPa, in particular between 1 MPa and 5 MPa.

According to a further independently inventive aspect, for the purposes of production of at least part of the elements overmoulded on a part of the device 1 and/or on the supporting body 2 (whether they are configured as single elements or as elements defined at least in part by a single elastically deformable body), it is particularly advantageous to use materials having a hardness comprised between 5 Shore A and 100 Shore A, preferably between 10 Shore A and 70 Shore A, very preferably between 15 Shore A and 30 Shore A.

Advantageously, two different materials may be used, which may possibly be overmoulded in different steps on a part of the device 1, such as a material having a hardness comprised between 5 Shore A and 50 Shore A, preferably between 10 Shore A and 40 Shore A, very preferably between 15 Shore A and 30 Shore A, and a material having a hardness comprised between 50 Shore A and 100 Shore A, preferably between 60 Shore A and 90 Shore A, very preferably between 65 Shore A and 80 Shore A.

Further practical tests conducted by the present applicant have made it possible to ascertain that, according to a further independently inventive aspect, for the purposes of production of elements overmoulded on a part of the device 1 and/or on the supporting body 2 (whether they are configured as single elements or as elements defined at least in part by a single elastically deformable body), it is preferable to use mouldable or injectable materials the molecules of which, in particular after the corresponding overmoulding, assume a structure or chain that is at least substantially helical and/or with spaces between the molecules and low intermolecular forces between the chains. The purpose of this is, in particular, to obtain a high compressibility of the material and/or of the overmoulded compensation element, preferably at very low temperatures, such as the temperatures at which there arise conditions of freezing of the liquid whose expansion is to be compensated. The aforesaid substantially helical structure is preferably obtained at least in part with siloxane bonds or bonds of the Si—O—Si type of the overmoulding material.

According to an aspect that is in itself independently inventive, it is particularly advantageous to obtain compressible elements 20, 21, via the use of a silicone material, such as for example a silicone elastomer or a liquid silicone rubber (LSR) or fluoro liquid silicone rubber (FLSR), preferably a bicomponent material or a bicomponent silicone, in particular of the type that can be overmoulded by injection.

Preferably, the material of the part of device 1 and/or of the supporting body 2 on which the aforesaid material is overmoulded is a polymer or a copolymer or a thermoplastic material, such as a polyamide (PA) or a polyphthalamide (PPA), as an alternative or in combination it being possible to use a metal and/or ceramic material.

FIGS. 30-36 are schematic illustrations of possible alternative embodiments of mouldable bodies that can be used for the purposes of implementation of the invention, which integrate one or more of the functional elements described (internal compensation element, external compensation element, internal sealing element, external sealing element, lower supporting element).

Figure 30:
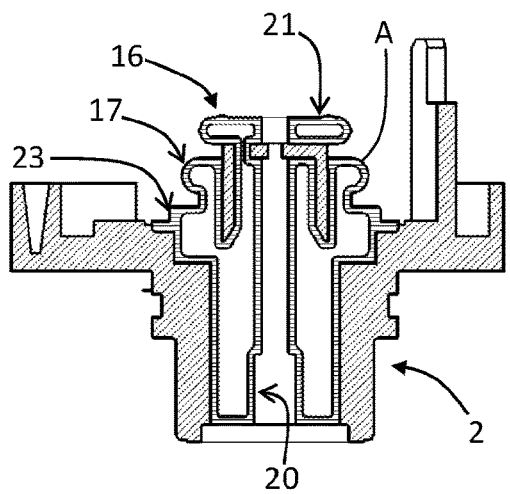

FIG. 30 illustrates the case where a body 16 is at least partially hollow, i.e., filled at least in part with air or with a gas, and can be obtained according to appropriate moulding techniques. In one embodiment, the overmoulding is carried out by inserting or injecting an amount of material A less than the volume of the impression for the shape to be obtained (this impression being defined in part by the mould and in part by a portion of a body 2 of the device 1), and subsequently or simultaneously by injecting air or gas or else by rotating the mould in such a way that the material is distributed over the surfaces of the aforesaid impression, substantially forming the external surface of the deformable body 16, then letting the material cool and/or solidify. The body 2 is then taken out of the mould with the hollow body 16 overmoulded thereon. According to the example of FIG. 30, the cavity of the body 16 extends into the internal compensation element 21, the external compensation element 20, the internal sealing element 17 and the supporting element 23.

Figure 31:
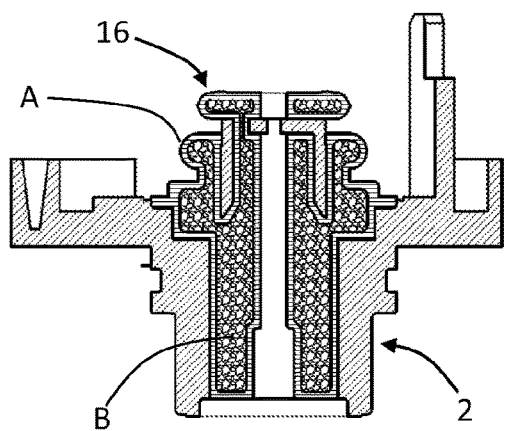

FIG. 31 regards a version similar to that of FIG. 30 but in which the body 16 is obtained with a first material A, in particular designed to provide an external surface of the body 16, preferably an elastic material or an elastomer, and with a second material B, in particular designed to fill the cavity inside the body 16 or provide the internal volume of the body 16, preferably a material of an expanded type, such as a material designed to create a foamed structure, i.e., with open or closed cells.

The body 16 according to FIG. 31 may be obtained at least in part according to the modalities described with reference to the example of FIG. 30, at least to form the external wall of the body 16 with the material A. For instance, overmoulding is carried out by injecting an amount of material A less than the volume of the impression of the shape to be obtained (impression defined in part by the mould and in part by the body 2), subsequently or simultaneously injecting the material B, preferably a bicomponent material mixed during injection and designed to expand so as to form the internal part of the body 16, which preferably has a foamed or cell structure. Next, the materials are left to cool and/or solidify, and the body 2 is then taken out of the mould, with the body 16 overmoulded thereon, provided on the outside with a full wall without cells and on the inside with a foamed or cell structure.

Figure 32:
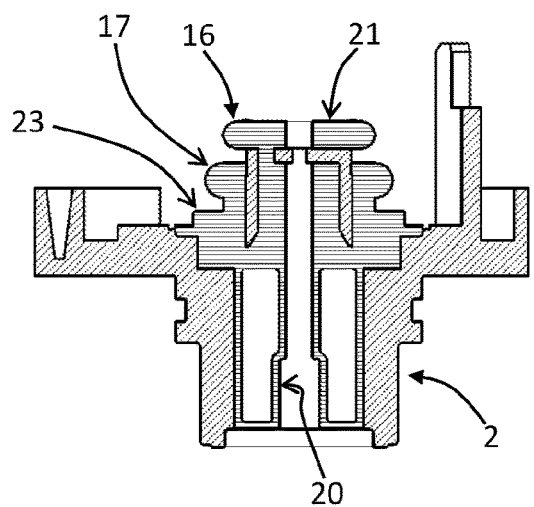

FIG. 32 is a version in part similar to that of FIG. 30, which is a schematic representation of the case of a body 16 that is in part hollow and in part full. In the example illustrated, a substantial portion of the compensation element 20 is hollow, whereas the compensation element 21, the internal sealing element 17, and the supporting element 23 are formed full. This solution may be obtained via overmoulding of just one material. Overmoulding can be obtained according to what is described in the process represented in FIG. 30, by injecting, however, a larger amount of material A, which can be distributed using the aforementioned blowing or spinning techniques, possibly allowing a part of the material to pour and/or settle by gravity into the areas in which the full parts 17, 21, 23 are to be obtained (for example, with the body 2 and the body 16 in the mould in a position rotated through 180° with respect to the position illustrated in FIG. 32).

Figure 33:
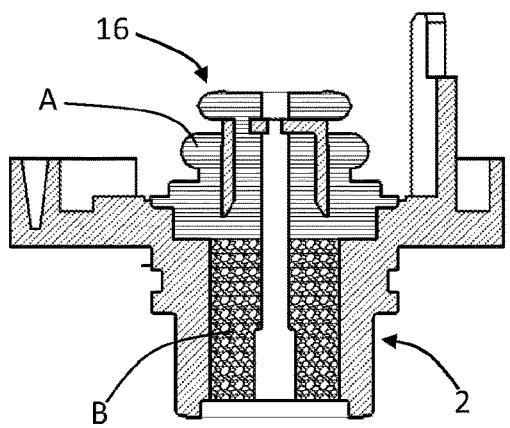

FIG. 33 is a schematic representation of the case of a body 16 in which a substantial portion of the internal compensation element is at least in part made of an expanded and/or cell-foam material B, whereas the remaining part is made of full material A. Consequently, in such a configuration, on the body 2 an overmoulding of two different materials is carried out simultaneously or in two distinct steps, for example, by injecting simultaneously or separately a full elastomeric or silicone material and a bicomponent and/or expanding material on at least part of the supporting body 2 (or some other part of the device 1) in order to obtain the body 16. In the case of execution in two distinct steps, appropriate parts of mould are provided, designed to form the various intermediate shapes of the body 16.

FIG. 34 is a schematic representation of the case of a deformable body 16 in which the compensation elements 20, 21 are made of a first material B, whereas the internal sealing element 17 and the supporting element 23 are made of a second material A overmoulded on the first material B, or vice versa. It will consequently be appreciated that the body 16 does not necessarily have to be made of just one material in a single moulding operation, but for its formation overmoulding of different materials may be envisaged.

FIG. 35 is a schematic representation of a variant similar to the one described with reference to FIG. 34, in which the internal compensation elements 20 and external compensation elements 21 are obtained with an expanded or cell-foam material B, whereas the internal sealing elements 17 and the supporting element 23 are obtained with a full material A.

Finally, FIG. 36 illustrates a version similar to that of FIG. 34, i.e., one which uses two full materials overmoulded, preferably at least in part on one another, to obtain the body 16, but where the overmoulded part that provides the internal sealing element 17 and the supporting element 23 also constitutes the external sealing element 13'.

From FIG. 36 it may be noted how, regardless of the type and/or number of materials used for obtaining the body 16, the external sealing element 13' can be joined via corresponding connection portions 16d to the supporting element 23 instead of to the compensation element 20.

In the case illustrated, for example, provided in the body 2 is at least one passage—radial or transverse with respect to the duct 14—that has a respective stretch 25b that extends downwards, for housing a corresponding connection portion 16*d*, as far as the hydraulic-connector portion 2*a* where the external sealing element 13' is formed. Obviously, types of passages and/or of connection of this sort between the sealing element 13' and the sealing and/or supporting element 23 may be implemented also in the embodiments described previously.

According to an aspect that is in itself inventive, at least part of an elastically deformable body, such as at least one from among a compressible compensation element, an internal sealing element and a lower supporting and/or sealing element is configured as overmoulded at least in part on the sensor body of the device according to the invention, preferably on a sensor body at least in part made of ceramic or metal material. The sensor body may possibly be at least in part moulded, preferably via an appropriate mould that enables injection and/or forming of an at least in part ceramic or metal material. Following upon or during the step of moulding of the sensor body there can be overmoulded thereon or co-moulded therewith at least in part the elastically deformable body that defines one or more from among at least one compensation element, one internal sealing element and one lower supporting and/or sealing element.

The fact that one or more of the aforesaid elements are overmoulded on the sensor body considerably facilitates production of the device, also in this case reducing the operations and apparatuses necessary for its assemblage and the corresponding times, as well as ensuring a high precision of positioning between the parts in question.

Preferably, the material of the overmoulded or co-moulded elements has characteristics such as to adhere or adapt better to the sensor body, in particular such as to penetrate into the possible surface micro-roughnesses or porosities of the sensor body during moulding, thus improving the corresponding seal, for example with respect to a seal obtained merely by compression of a sealing element produced separately and pressed elastically against the sensor body.

In one or more embodiments, just one of the aforesaid elements is overmoulded on the sensor body, whereas in other embodiments two or more of the aforesaid elements are overmoulded on the sensor body. Two or more of the aforesaid elements may also be made of a single piece, i.e., be joined together to form a single elastically deformable body. Very advantageously, one or more from among the internal sealing element, the supporting element, and the external sealing element may be overmoulded on the sensor body together with a compressible compensation element.

For this purpose, FIGS. 37-42 represent schematically some possible embodiments, according to which one or more elements selected from among a compensation element, a sealing element and a supporting element is/are overmoulded on a sensor body.

Figure 37:
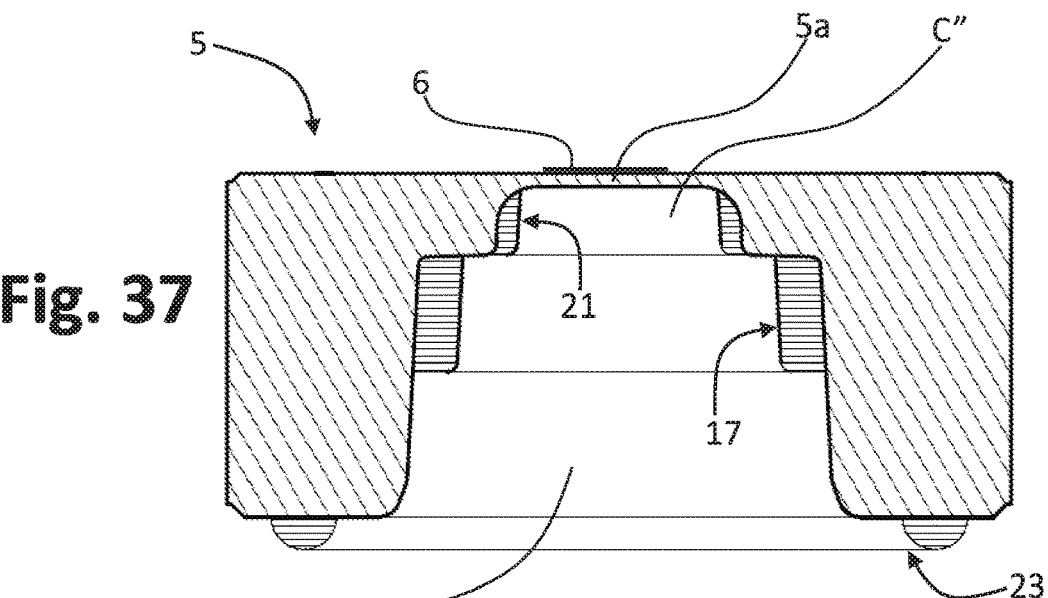
FIGS. 37, 38, and 39 are schematic sectional views of a sensor body of a pressure-sensor device according to respective further embodiments of the invention.

In the case of FIG. 37, a sensor body 5 is shown, preferably of a monolithic type, for example made of ceramic or metal material, the cavity of which is divided into a lower portion C', which is wider or of larger diameter, and an upper portion C", which is narrower or of smaller diameter, as in the case of the embodiments illustrated in FIGS. 16-20. In this embodiment, overmoulded on the body 5 are an external compensation element 21, an internal radial sealing element 17, and a lower supporting and/or sealing element 23, configured as parts distinct from one another, i.e., as distinct elastically deformable bodies. The elements 21 and 17 are both overmoulded in the cavity of the sensor body 5, in particular on its peripheral surface and here have an approximately tubular or annular shape. In the example, the elements 21 and 17 are located within the upper cavity portion C" and lower cavity portion C', respectively. The lower supporting and/or sealing element 23 is instead overmoulded on the body 5 on its plane lower surface, specifically in an area thereof that circumscribes the opening of the blind cavity C', C", and here has a substantially annular shape.

Figure 38:
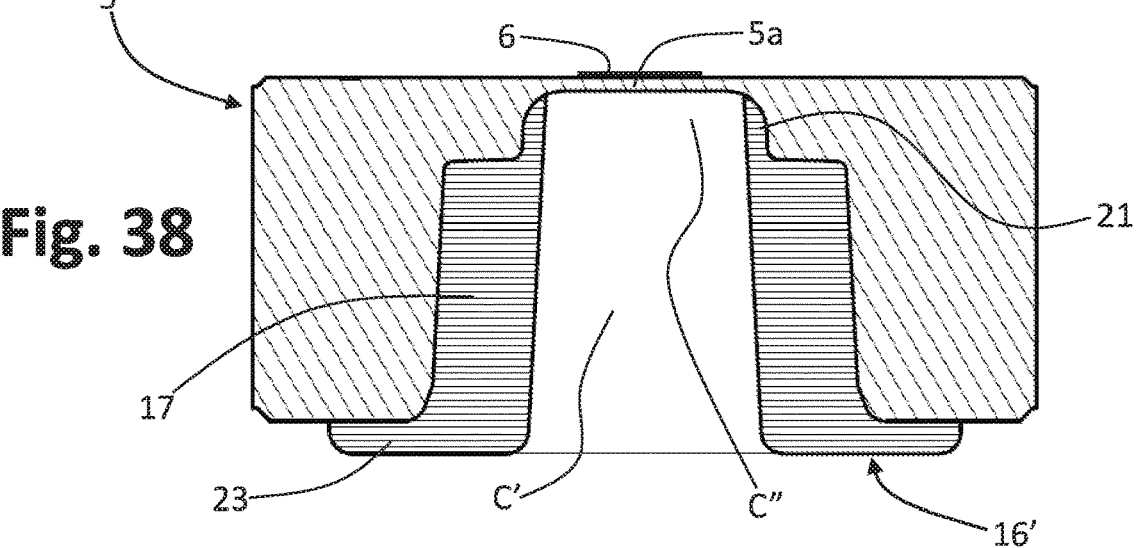

FIG. 38 illustrates the case of overmoulding on the sensor body 5 of a single deformable body 16', which defines an external compensation element 21, an internal sealing element 17 and a supporting element 23. Also in this case, the elements 21 and 17, which have an approximately tubular or annular shape, are located within the portions C" and C', respectively, of the blind cavity of the sensor body 5, whereas the element 23, here substantially shaped like an annular washer, extends over the plane lower surface of the body 5.

Figure 39:
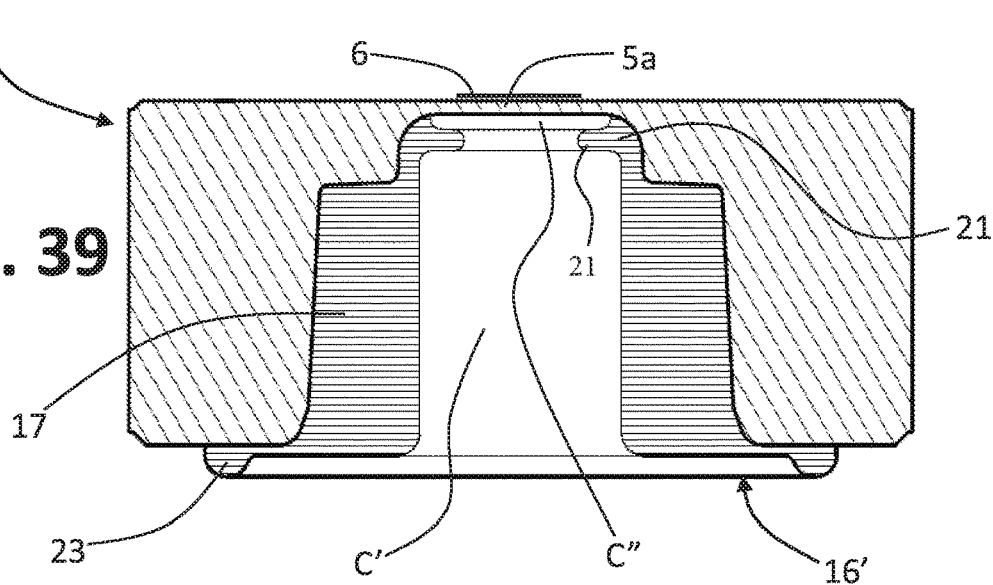

FIG. 39 illustrates a variant according to which the deformable body 16' overmoulded on the body 5 defines one or more functional elements having parts in relief or recessed parts. In particular, in the example illustrated, the external compensation element 21 has an approximately tubular or annular shape with an intermediate narrowing 21' so as to present a larger area facing the membrane 5*a* of the body 5; and the supporting element 23 has a generally flattened shape, with a lower annular projection in order to enable a better elastic resting surface for the top face of the corresponding supporting body of the device 1.

Figure 40:
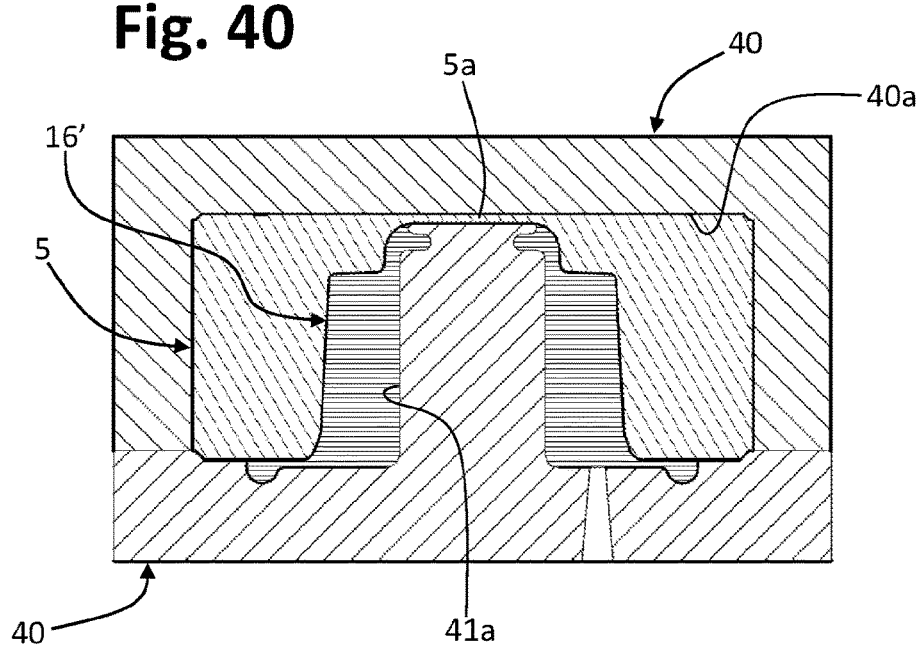
FIG. 40 is a schematic cross-sectional view of a moulding apparatus that can be used for producing a sensor body according to FIG. 39.

FIG. 40 is a schematic illustration of a possible moulding apparatus that can be used for obtaining the deformable body 16' of FIG. 39. Also in this case, as may be noted, a part of mould 40 is provided, defining a corresponding impression 40*a* for positioning the sensor body 5 previously formed apart or directly in the mould, and a second part of mould 41, the impression 41*a* of which is shaped so as to define at least part of the body 16', such as its profile not in contact with surfaces of the body 5. In the example of FIG. 40, the very elasticity of the body 16' renders possible the deformation of the undercut relief that constitutes the intermediate narrowing 21' of the compensation element 21, in order to enable extraction of the part of mould 41 (it being possible, however, to envisage other movable parts or sliders in the mould, designed to enable extraction, in particular in the case of more complex shapes of the body 16').

Figure 41:
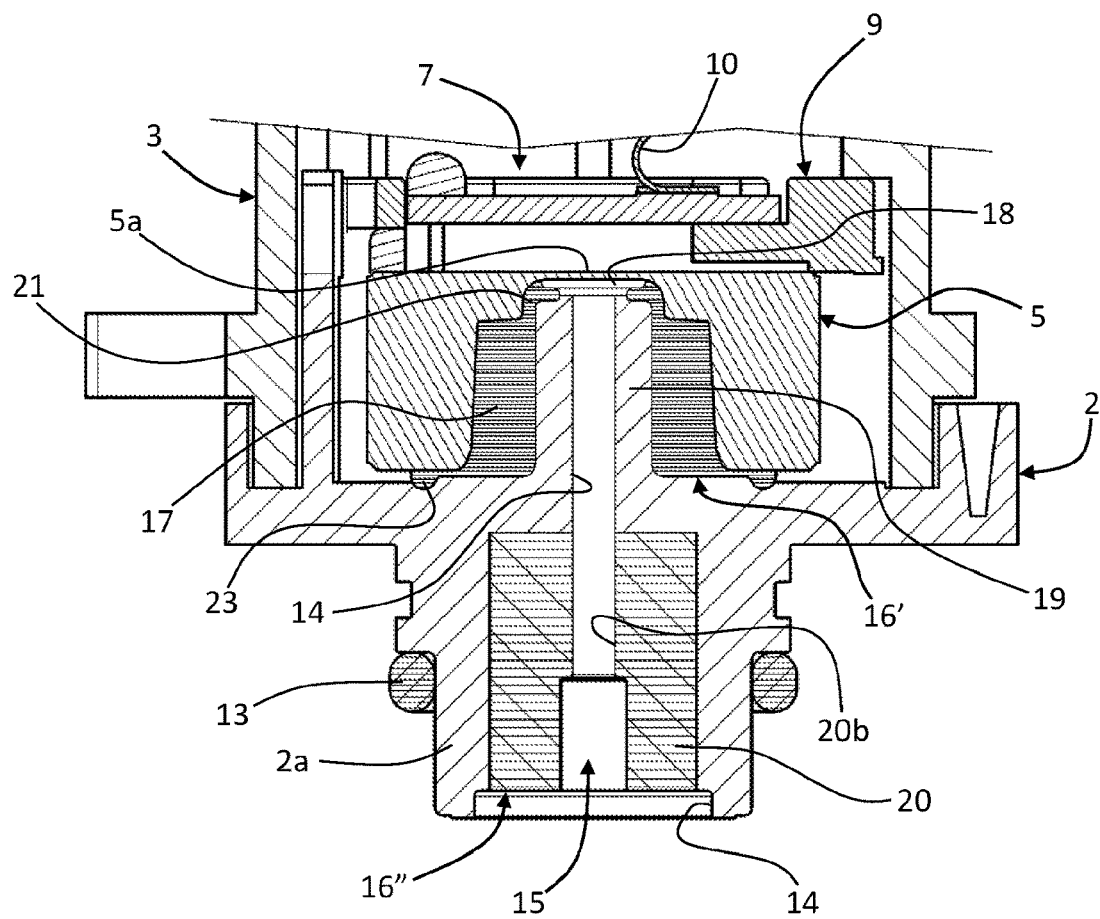
FIG. 41 is a partial and schematic cross-sectional view of a pressure-sensor device according to a further embodiment, which uses a sensor body according to FIG. 39.

FIG. 41 illustrates the assembled condition of a sensor body 5, with the deformable body 16' overmoulded thereon of the type illustrated in FIG. 39. In the example, the body 5 is fitted on the projecting portion 19 of the supporting body 2, which in this case does not comprise overmoulded parts and does not need internal or surface passages for housing connection portions of the deformable body. As may be noted, in the assembled condition, the outer profile of the body 16' is in the proximity or in contact with corresponding surfaces of the body 2 in order to perform the necessary functions of compensation (element 21), radial seal (element 17) and axial seal and/or elastic support (element 23).

Moreover visible in the example illustrated is a second elastically deformable body, designated by 16", which provides an internal compensation element 20 inserted in or overmoulded on a respective portion of the duct 14 of the body 2. In this case, another stretch of the duct 14—which traverses an intermediate portion of the body 2 and its projecting portion 19—forms a substantial part of the passageway 15. In this case, it is not necessary for the duct 14 to have the transverse wall 2*b*. According to a variant (not represented), the compensation element 21 could be overmoulded on the supporting body 2 instead of on the sensor body 5. There would hence be obtained a configuration where at least one of the compensation elements 20, 21 is overmoulded on the supporting body 2 and at least one of the sealing element 17 and the supporting element 23 is overmoulded on the sensor body 5. Of course, the external sealing element 13 of FIG. 41 may be replaced by a sealing element of the type previously designated by 13', formed in a single body with the element 20, in particular via overmoulding on the body 2.

According to a characteristic that is in itself independently inventive, which may apply, for example, to the embodiment of FIG. 41 and/or to the aforesaid variant not represented, the device according to the invention comprises elastically deformable elements, such as at least two from among an internal compensation element 20, an external compensation element 21, an internal sealing element 17, a lower element 23 and an external sealing element 13' overmoulded separately or jointly on the sensor body 5 and on the supporting body 2 or on another part of the device 1.

Figure 42:
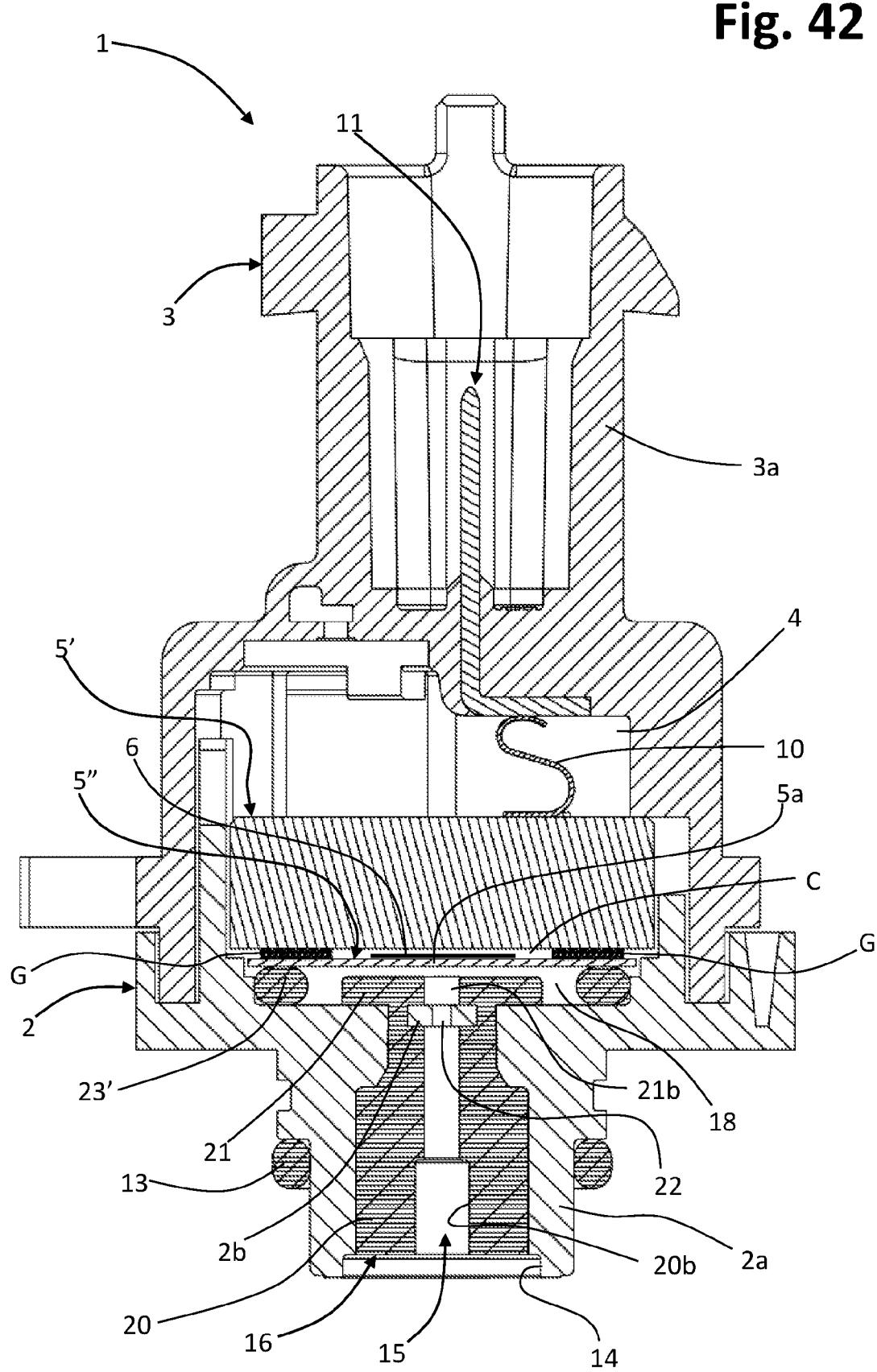
FIG. 42 is a partial and schematic cross-sectional view similar to that of FIG. 29, regarding a variant embodiment of the device of FIGS. 23-25 or FIG. 29.

FIG. 42 refers to an embodiment similar to the one already described previously in relation to FIGS. 23-29, whereby the cavity C of a sensor body formed in two parts is determined by the thickness of a layer of gluing material G, used for fixing the part 5" defining the membrane 5a to the part 5', which in this case has a substantially plane lower face. Preferentially, the gluing material G has a glass filler that, during the gluing step carried out hot, melts to fix the part 5" and the part 5' together, keeping the former at a certain distance from the latter. In this way, the layer G forms a sort of substantially cylindrical peripheral wall of the cavity C, determining the height of the latter. In the case exemplified, an elastically deformable body 16 is obtained, which forms two compensation elements 20 and 21. A supporting and/or lower sealing element 23' is then provided, configured as distinct part mounted on the body 2 or overmoulded thereon. The embodiment is hence similar to that of FIG. 29, but obviously a sensor body 5', 5" of the type shown in FIG. 42 can be used in the device illustrated in FIGS. 23-29.

In the versions appearing in FIGS. 23-29, the two casing parts 2 and 3 may be configured for blocking the sensor body 5 in position. In the case where this blocking does not occur, for example by an unfavourable combination of the dimensional tolerances, the element 23' intervenes, which in any case supports and pushes the sensor body 5 towards the elastic contacts 10, 11. The embodiment of FIG. 42 regards a casing 2, 3 that envisages, in any case, the aforesaid elastic support by the element 23', for example, to prevent the risk of any excessive compression on the sensor body 5. As will appear evident to the person skilled in the art, various characteristics described with reference to FIGS. 23-28 and 29 may be applied also to the case of the device of FIG. 42, and vice versa.

Figure 43:
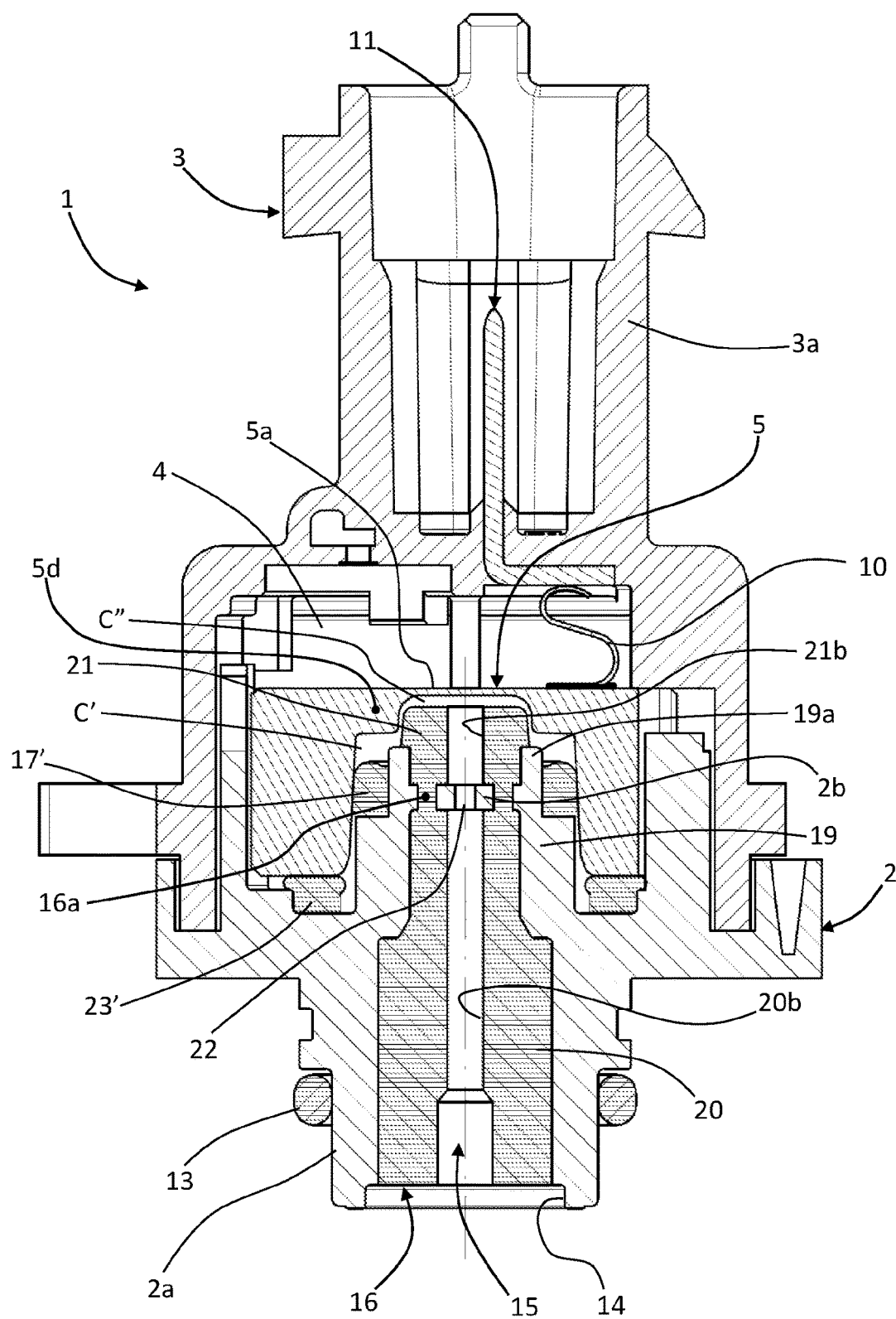
FIG. 43 is a view similar to that of FIG. 17, regarding a variant embodiment of the device of FIGS. 16-20.

FIG. 43 illustrates a preferred embodiment of a device 1 according to the present invention, of a conception similar to that of the device of FIGS. 16-20, but in which only the compensation elements 20 and 21 are overmoulded on the body 2, in particular to form a single elastically deformable body 16. The sealing element 17', and the supporting element 23' are instead configured as parts independent of the compensation elements 20 and 21 and mounted on the body 2. Of course, also the external sealing element 13 of FIG. 43 may be replaced by a sealing element of the type previously designated by 13', formed in a single body with the element 20, in particular via overmoulding on the body 2.

Figure 44:
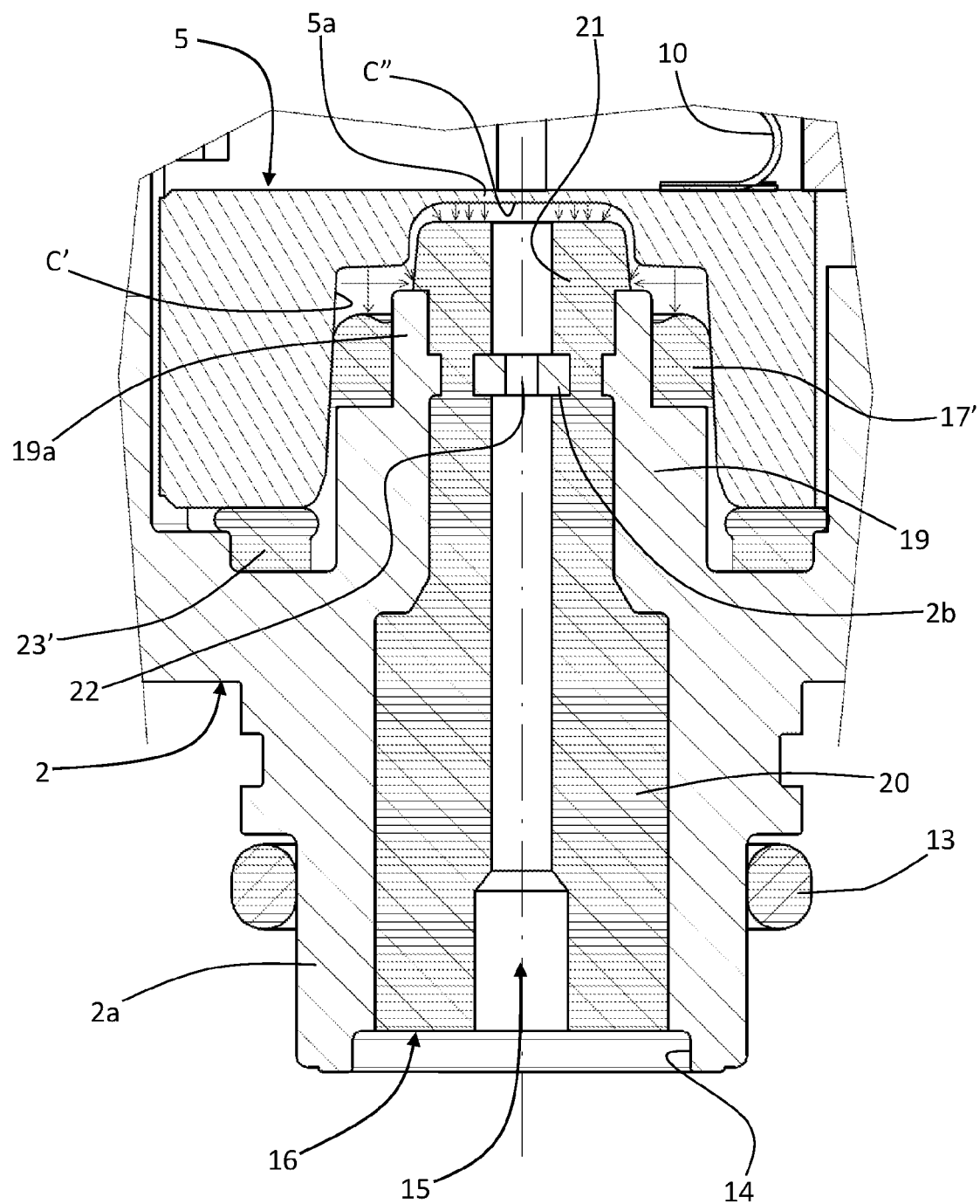
FIG. 44 is a detail of FIG. 43.

As will appear evident to the person skilled in the art, various characteristics described with reference to FIGS. 16-20 may apply also to the case of the device of FIG. 43. With reference also to FIG. 44, and as already mentioned with reference to FIGS. 16-20, the part of the external compensation element 21 located on the outside of the corresponding housing 19a extends at least in part into the lower cavity portion C'. This enables compensation also of freezing or expansion of the fluid contained in a part of the aforesaid lower portion C', in the area delimited also by the sealing element 17', where the fluid brings about compression and/or deformation in a substantially radial direction of part of the compensation element 21. Preferably, the sealing element 17' operates at least in part also as compensation element. The axial expansion of the frozen fluid can be countered in one direction, upwards as viewed in FIG. 44, by the intermediate wall 5d of larger thickness of the sensor body 5, whereas it can be compensated in the opposite direction, downwards as viewed in FIG. 43, by the sealing element 17. In FIG. 44, the small arrows appearing within the cavity C', C" of the sensor body 5 represent schematically lines of force of the thrust of the frozen liquid between the sensor body 5, the compensation element 21, and the sealing element 17.

Figure 45:
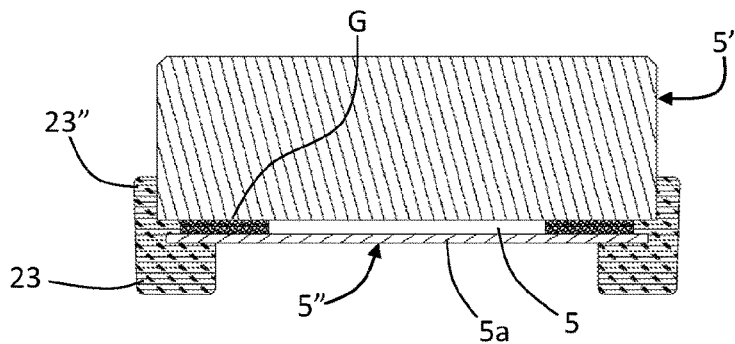
FIG. 45 is a partial and schematic cross-sectional exploded view of some components of a sensor device according to a further embodiment of the invention.
Figure 45:
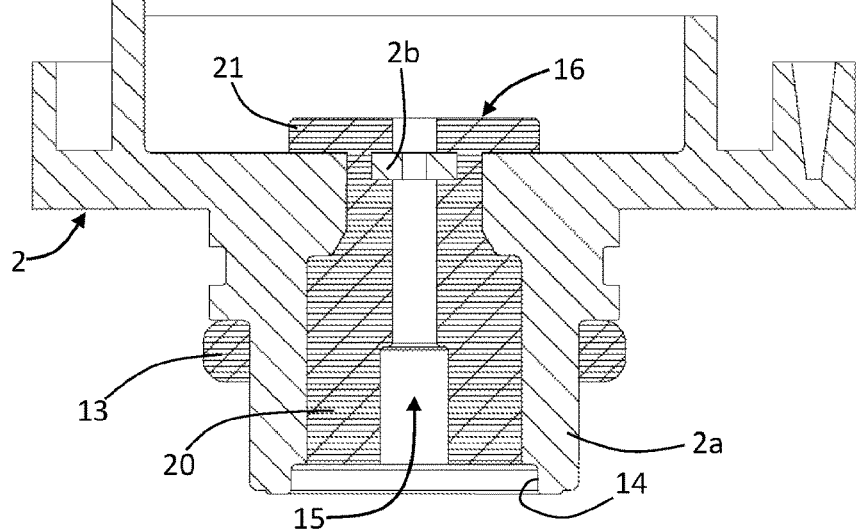
Figure 46:
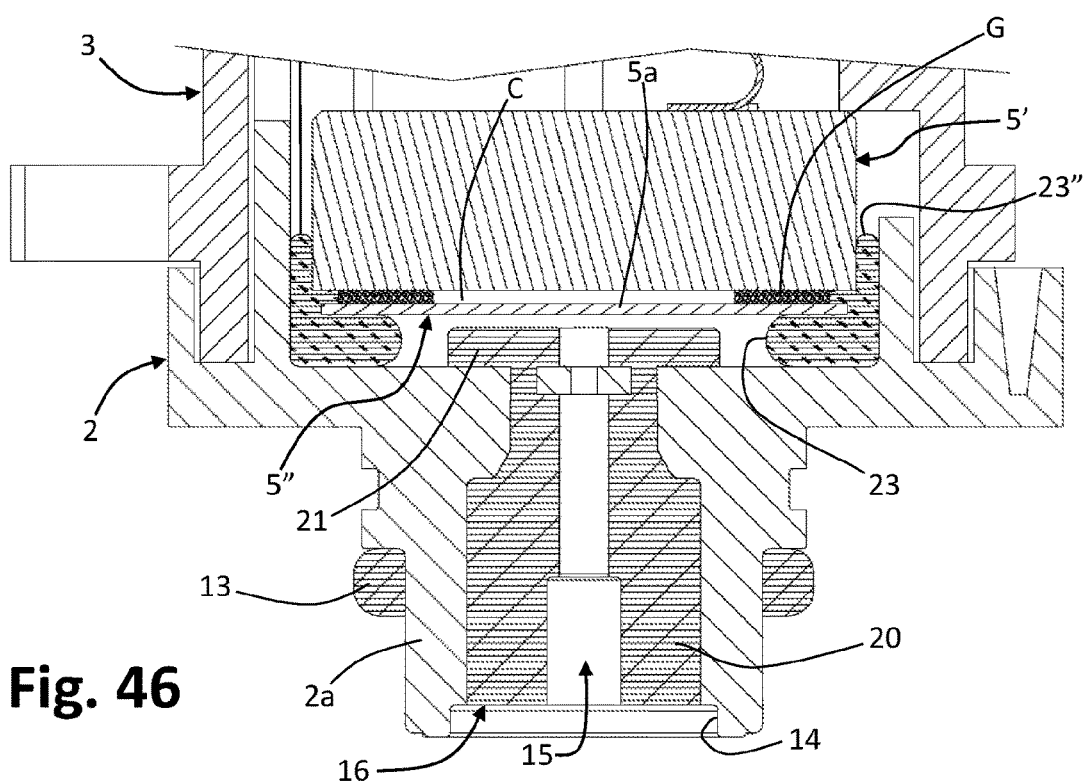
FIG. 46 is a partial and schematic cross-sectional view of a device that uses the components of FIG. 45.

Illustrated in FIGS. 45-46 is a further embodiment, according to which the device has a sensor body that includes at least two body parts 5', 5", which are rendered fixed with respect to one another and obtained between which is a cavity C. The sensor body may be of the type illustrated with reference to FIGS. 23-29, or else of the type illustrated in FIG. 42, for example with a sensing system of a piezoresistive or capacitive type. According to an aspect that is in itself independently inventive, applied to or overmoulded on the sensor body 5', 5" are at least one of an element 23 that performs supporting and/or sealing and/or compensation functions and an element 23" that performs positioning and/or centring functions. The element 23 is preferentially overmoulded on the body part 5" or on the membrane 5a, and the element 23" is preferentially overmoulded on the outer profile or perimeter of the sensor body 5', 5". In a preferred version, the elements 23 and 23" are made of a single piece, in particular overmoulded on the sensor body, to form an elastically deformable body therewith.

The element 23" overmoulded on the outer profile of the sensor body has a substantially annular or tubular shape, in particular to ensure positioning and/or centring (and radial seal) with respect to a perimetral wall 2d of the supporting body 2, preferably a wall 2d of the body 2 having a substantially circular or cylindrical shape.

According to an aspect that is in itself independently inventive, provision of an element 23" on the outer perimeter of the sensor body enables an optimal radial seal that is not affected by variations in the position and/or axial compression of the sensor body; i.e., it is not affected by dimensional tolerances or variations of the items belonging to the casing of the device, which could determine non-precise axial positioning of the sensor body. From FIGS. 45 and 46 it may be noted how part of the overmoulding material also penetrates into the peripheral gap between the body parts 5', 5" and the layer of adhesive G, thus improving fixing of at least one of the elements 23 and 23' to the sensor body 5', 5", or fixing of the single piece that defines them.

In the embodiment of FIGS. 45-46, at least one compensation element is preferentially associated to the body part 2, in particular overmoulded thereon. In the case exemplified, there is hence provided a further elastically deformable body 16 that defines two compensation elements 20 and 21.

According to an aspect that is in itself independently inventive, that may apply at least to the embodiments illustrated in FIGS. 41 and 45-46, both the sensor body 5 or 5', 5" and the casing 2, 3 comprise respective overmoulded elastically deformable bodies.

Figure 47:
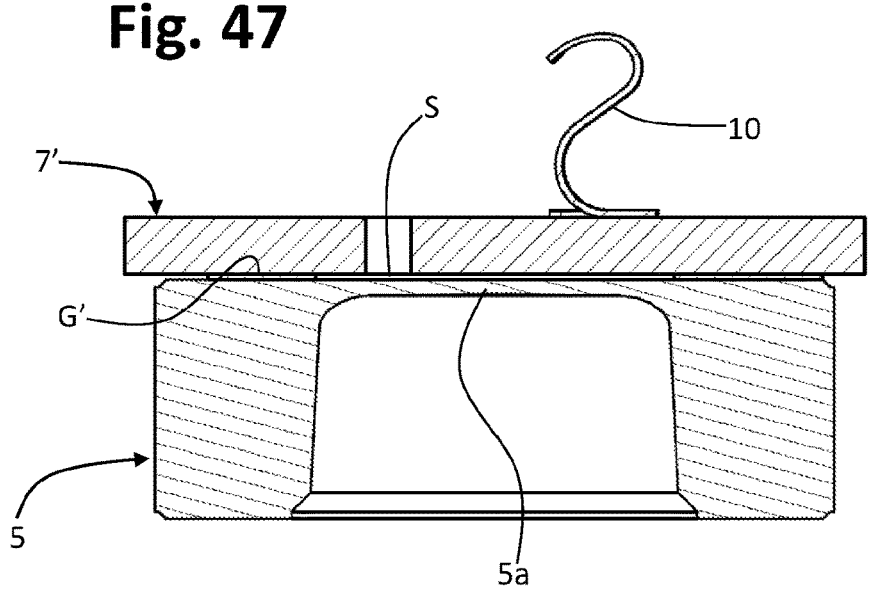
FIG. 47 is a partial and schematic cross-sectional view of some components of a sensor device according to a further embodiment of the invention.
Figure 48:
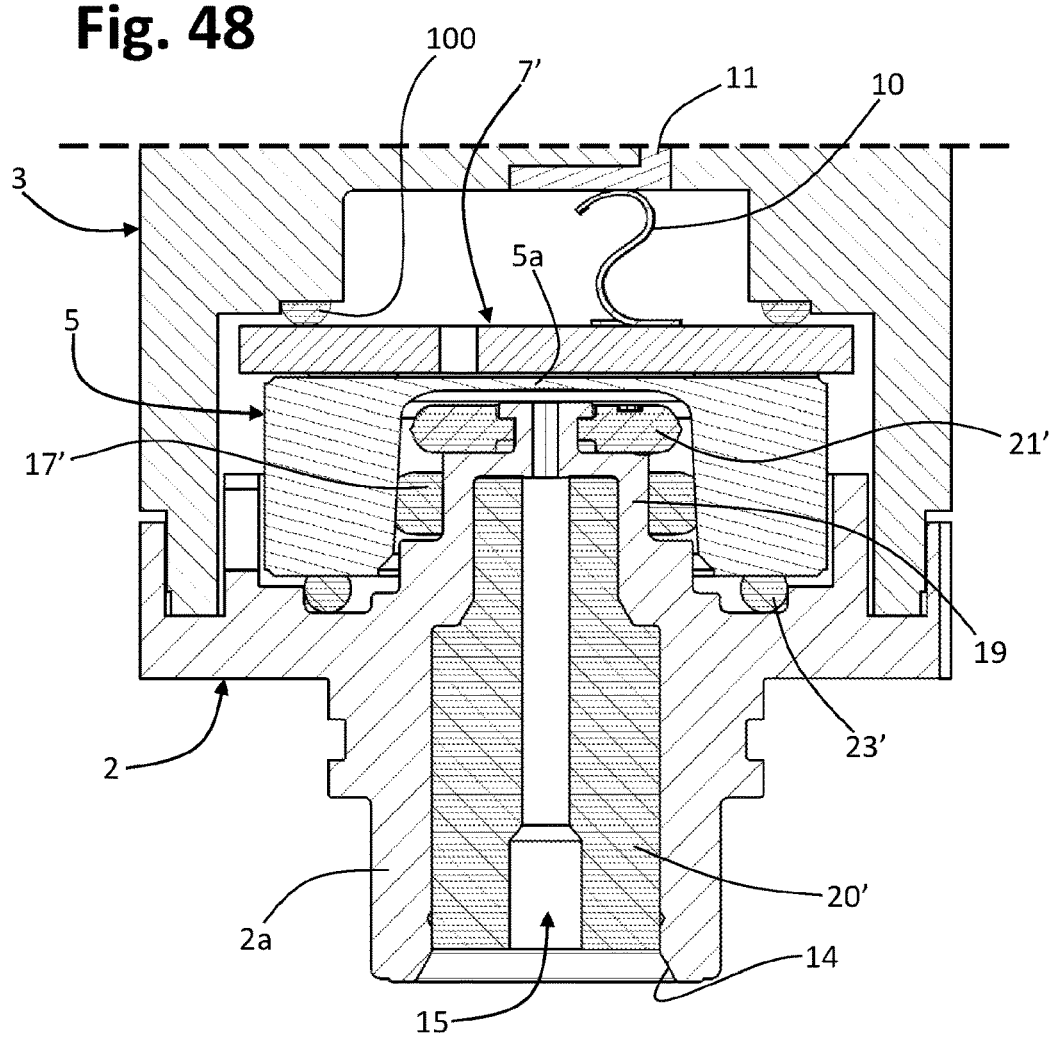
FIG. 48 is a partial and schematic cross-sectional view of a device that uses the components of FIG. 47.

FIGS. 47-48 refer to a further embodiment, in which a preferably monolithic sensor body 5 is provided, to which a circuit support 7' is rendered fixed, for example via gluing. The circuit support 7' is rendered fixed in a peripheral area of the upper face of the sensor body 5, in a position such that it is raised with respect to the membrane 5a, in order to define a space S in which the membrane itself can bend upwards. The height of the space S is preferably defined by the thickness of the gluing material G'. In addition or as an alternative, a purposely designed recess may be provided in the lower face of the circuit support 7'. For such an implementation, it is also possible to use a sensor body 5 of the type illustrated in FIGS. 16-18, 37-41, and 43-44.

FIG. 48 moreover illustrates a further characteristic in itself inventive, whereby overmoulded on the closing body 3 is an elastically deformable body that defines a sealing and/or supporting element 100. In the example, the element 100, which has a generally annular configuration, co-operates with the circuit support 7', it being possible, in addition or as an alternative, for it to co-operate with the sensor body 5 in order to guarantee positioning, and/or sealing, and/or upper elastic support of the ensemble formed by the sensor body 5 and by the circuit support 7'. An element of the type designated by 100 may of course be used also in other embodiments described herein.

In the case of FIG. 48 two compensation elements 20' and 21' are moreover provided, which are mounted on the body 2 or overmoulded thereon and are here configured as distinct elements. In this embodiment, the external compensation element 21' is mounted or overmoulded in a region corresponding to an upper tubular projection of the body 2 (not indicated), which forms a terminal stretch of the duct 14 or of the passageway 15. There are then also provided in this case an internal sealing element 17' and a supporting element 23', configured as distinct elements. It will be appreciated, however, that characteristics described in various previous embodiments in relation to one or more of the elements or bodies 13, 13', 16, 16', 17, 17', 20, 21, 23, 23' may apply also to the case of the embodiment of FIGS. 47-48.

Previously solutions of elastically deformable bodies 16, 16' have been exemplified that include an internal compensation element 20, an external compensation element 21, an internal sealing element 17, a supporting element 23, and possibly an external sealing element 13'. As has already been mentioned, however, the possible combinations of embodiment are innumerable, including provision of an elastically deformable body that comprises just one compensation element (such as the body 16" of FIG. 41), with possibly joined thereto one or more of the other functional elements referred to (for example, an external sealing element 13'), or once again provision in a single body of an internal sealing element, a supporting element, and possibly an external sealing element, separately from a compensation element.

The apparatuses of FIGS. 7-9, 21-22 and 40, have been exemplified in combination with the embodiments of FIGS. 1-6, 16-20, and 39, respectively, but it is clear that apparatuses of the same type may be used for producing various other embodiments described herein. Furthermore, the apparatuses referred to have been described principally in combination with processes of overmoulding in a strict sense, but as has been said, the invention may be implemented also using co-moulding processes, employing appropriate techniques and apparatuses, for example of the type described or of some other type of a conception in itself clear to the person skilled in the art.

Emerging clearly from the foregoing description are the characteristics and advantages of the present invention, principally represented by the ease of production of the sensor device, this being faster, more economically advantageous, and precise than in the case of devices according to the prior art. The type of embodiment proposed likewise enables an increase in the certainty of positioning of one or more functional elements of the device (internal compensation element, external compensation element, internal sealing element, lower supporting element, external sealing element, centring element, top supporting element) also during the service life of the device.

It is clear that numerous variations to the devices described by way of example are possible for the person skilled in the branch, without thereby departing from the scope of the invention. As already mentioned, for the purposes of production of the aforesaid further variants, one or more of the characteristics described previously with reference to different embodiments may be combined in any adequate way.

As has been mentioned, what has been described with reference to overmoulding regarding the body part 2 may apply to other parts of the housing or supporting structure of the device 1 or its inserts, such as the spacer 9 and/or the support of the circuit 7.

The invention may be applied also to the case of pressure sensors of a capacitive type or, more in general, ones that comprise a deformation-sensing system that has one part (such as one electrode) associated to the membrane and another part (such as another electrode) associated to a rigid portion of the sensor body. The invention has been described with particular reference to pressure sensors, but may find application also in the case of other types of sensor devices, in particular of the type in which the measurement of a quantity of interest is based upon the degree of elastic deformation of a portion of a sensor body to which a sensing system is associated.

The invention claimed is:

1. A pressure-sensor device having:
   a component sensitive to pressure, comprising a sensor body, with an elastically deformable membrane part, and at least one detection element for detecting a deformation of the membrane part;
   a structure for housing or supporting the pressure-sensitive component, having at least one passageway for a fluid the pressure of which is to be detected, the housing or supporting structure comprising a supporting body with respect to which the sensor body is positioned in such a way that its membrane part is exposed to the fluid coming out of the passageway, the supporting body having a hydraulic-connection portion and a duct that extends from the hydraulic-connection portion;
   at least one elastically deformable body, made with one or more elastically deformable or compressible materials, comprising at least one compressible compensation element, configured for compensating any possible variations in volume of the fluid;
   wherein the at least one elastically deformable body is overmoulded to the housing or supporting structure;

and wherein the duct has an intermediate transverse wall and comprises, downstream of the transverse wall, a housing portion of the supporting body, partially housed within which is said at least one compressible compensation element that extends in part on the outside of the duct or of the supporting body.

2. The device according to claim 1, wherein the sensor body has a blind cavity with a bottom surface that belongs to the membrane part, and a peripheral surface with at least one intermediate step, to define a lower cavity portion below the intermediate step, which is wider, and an upper cavity portion above the intermediate step, which is less wide, at least part of said at least one compressible compensation element extending within the upper cavity portion above the intermediate step.

3. The device according to claim 1, wherein the elastically deformable body also defines at least one from among:
  an internal sealing element, set between the supporting body and the sensor body, within a cavity of the sensor body, designed to provide a radial seal between the supporting body and the sensor body, the internal sealing element having an outer diameter or perimetric surface greater than an outer diameter or perimetric surface of the at least one compressible compensation element;
  a supporting element, set between the supporting body and the sensor body, on the outside of a cavity of the sensor body, designed to provide an elastic support and/or an axial seal between the supporting body and the sensor body, the supporting element having an outer diameter or perimetric surface greater than an outer diameter or perimetric surface of the at least one compressible compensation element;
  an external sealing element, set on the outside of the supporting body and having an outer diameter or perimetric surface greater than an outer diameter or perimetric surface of the at least one compressible compensation element.

4. The device according to claim 3, wherein the supporting element
  is set between an upper face of the supporting body and a lower face of the sensor body.

5. The device according to claim 3, wherein the supporting body has at least one passage that extends from the duct in a direction at least in part transverse with respect to the duct itself, the passage or each passage being occupied by a respective connecting portion of one said elastically deformable body overmoulded to the housing or supporting structure, wherein said connecting portion connects said at least one compressible compensation element to the at least one from among the internal sealing element, the supporting element and the external sealing element.

6. The device according to claim 1, wherein the intermediate transverse wall is provided with at least one first through opening, which is designed to delimit a respective part of the passageway, and at least one second through opening, which is designed to house at least one respective portion of one said elastically deformable body overmoulded to the housing or supporting structure.

7. The device according to claim 1, wherein the intermediate transverse wall has a first through opening and at least one second through opening, the second through opening or each through opening being occupied by a respective portion of one said elastically deformable body overmoulded to the housing or supporting structure, said respective portion connecting together said at least one compressible compensation element to a further compressible compensation element.

8. The device according to claim 1, wherein the elastically deformable body defines:
  a first compressible compensation element, which extends downstream of the intermediate transverse wall, is in a position generally close to the membrane part of the sensor body and extends at least in part on the outside of the duct or of the supporting body; and
  a second compressible compensation element, which extends upstream of the intermediate transverse wall, at least in part within the duct or the supporting body.

9. A pressure-sensor device having:
  a component sensitive to pressure, comprising a sensor body with a cavity, an elastically deformable membrane part that closes the cavity at an end thereof, and at least one detection element for detecting a deformation of the membrane part;
  a structure for housing or supporting the pressure-sensitive component, having a passageway for a fluid the pressure of which is to be detected, the housing or supporting structure comprising a supporting body with respect to which the sensor body is mounted in such a way that its membrane part is exposed to fluid coming out of the passageway, the supporting body having a hydraulic-connection portion and a duct that extends from the hydraulic-connection portion;
  at least one elastically deformable body, formed with one or more elastically deformable or compressible materials and extending at least in part on the outside of the duct or of the supporting body;
  wherein the at least one elastically deformable body defines at least one compressible compensation element, configured for compensating any possible variations in volume of the fluid, which is in a position generally facing or close to the membrane part of the sensor body and extends at least in part on the outside of the duct of the supporting body;
  wherein at least a portion of the membrane part of the sensor body extends in an intermediate position between the cavity thereof and the at least one compressible compensation element;
  wherein the device moreover comprises a sealing and/or supporting element, which is set between the supporting body and the sensor body, to define with them a chamber for collecting the fluid, and which extends, with respect to an upper face of the supporting body, to a greater height than the at least one compressible compensation element;
  and wherein the at least one compressible compensation element has an upper surface which is set at a distance from the membrane part of the sensor body, the at least one compressible compensation element being positioned in an area circumscribed by the sealing and/or supporting element, the sealing and/or supporting element having an inner diameter or perimetric surface greater than an outer diameter or perimetric surface of the at least one compressible compensation element.

10. The device according to claim 9, wherein the at least one elastically deformable body defines the sealing and/or supporting element and the at least one compressible compensation element in a single piece.

11. The device according to claim 9, wherein the at least one elastically deformable body is overmoulded to the housing or supporting structure.

12. A sensor device having:
a component sensitive to pressure, comprising a sensor body, with an elastically deformable membrane part, and at least one detection element for detecting a deformation of the membrane part;
a structure for housing or supporting the component sensitive to pressure; and
at least one elastically deformable body to provide at least one from among a sealing function, an elastic supporting function or a function of compensation of any possible variations in volume of a fluid the pressure of which has to be detected,
wherein the elastically deformable body is overmoulded at least in part to at least one of the housing or supporting structure or the sensor body and comprises at least one from among:
a material having a bulk modulus comprised between 0.1 MPa and 1 GPa;
a material having a hardness comprised between 5 Shore A and 100 Shore A;
two different materials;
materials the molecules of which assume a structure or chain that is at least in part helical;
a silicone elastomer or a liquid silicone rubber;
a polymer or a copolymer or a thermoplastic material;
a material having characteristics such as to bind structurally to and/or penetrate the material of the housing or supporting structure and/or the sensor body, during the corresponding overmoulding;
an external shell layer made of solid material, which is flexible or elastic or compressible, and an internal cavity filled with air or gas;
an external shell layer made of solid material and an internal cavity filled with a more compressible material;
a body having a solid and compressible first portion and at least one second portion defining a closed cavity;
a coating layer defining a cavity filled with expanded or foamed material;
a completely solid body made of two different materials, one of which is compressible for purposes of compensation and the other is elastic for purposes of sealing and/or elastic support;
a body including two different materials, one of which is an expanded or foamed compressible material and the other one is an elastic solid material.

13. A pressure-sensor device having:
a component sensitive to pressure, comprising a sensor body, with an elastically deformable membrane part, and at least one detection element for detecting a deformation of the membrane part;
a structure for housing or supporting the pressure-sensitive component, having at least one passageway for a fluid the pressure of which is to be detected, the housing or supporting structure comprising a supporting body with respect to which the sensor body is positioned in such a way that its membrane part is exposed to the fluid coming out of the passageway, the supporting body having a hydraulic-connection portion and a duct that extends from the hydraulic-connection portion;
at least one elastically deformable body, made with one or more elastically deformable or compressible materials, comprising at least one compressible compensation element, configured for compensating any possible variations in volume of the fluid;
wherein the at least one elastically deformable body is overmoulded to the housing or supporting structure;
and wherein the elastically deformable body also defines at least one of the following:
a sealing element, set between the supporting body and the sensor body, designed to provide a seal between the supporting body and the sensor body;
a supporting element, set between the supporting body and the sensor body, on the outside of a cavity of the sensor body, designed to provide an elastic support between the supporting body and the sensor body.

14. A pressure-sensor device having:
a component sensitive to pressure, comprising a sensor body, with an elastically deformable membrane part, a cavity with a surface that belongs to the membrane part, and at least one detection element for detecting a deformation of the membrane part;
a structure for housing or supporting the pressure-sensitive component, having at least one passageway for a fluid the pressure of which is to be detected, the housing or supporting structure comprising a supporting body with respect to which the sensor body is positioned in such a way that its membrane part is exposed to the fluid coming out of the passageway, the supporting body having a hydraulic-connection portion and a duct that extends from the hydraulic-connection portion;
at least one elastically deformable body, made with one or more elastically deformable or compressible materials;
wherein the at least one elastically deformable body is overmoulded to the sensor body and defines at least one of the following:
a compressible compensation element which extends at least in part within the cavity of the sensor body, at least a part of the elastically deformable body forming the compressible compensation element being overmoulded to a peripheral surface of the cavity;
an inner sealing element, which extends at least in part between the supporting body and the sensor body inside the cavity of the sensor body, the inner sealing element being designed to provide a radial seal between the supporting body and the sensor body, at least a part of the elastically deformable body forming the inner sealing element being overmoulded to a peripheral surface of the cavity;
an outer sealing element, which extends at least in part between the supporting body and the sensor body outside the cavity of the sensor body, the outer sealing element being designed to provide a seal between the supporting body and the sensor body, at least a part of the elastically deformable body forming the outer sealing element being overmoulded to an outer surface of the sensor body;
a supporting element, which extends at least in part between the supporting body and the sensor body, on the outside the cavity of the sensor body, the supporting element being designed to provide an elastic support and/or an axial seal between the supporting body and the sensor body, at least a part of the elastically deformable body forming the supporting element being overmoulded to an end face the sensor body;
a compressible compensation element which extends outside the cavity of the sensor body, at least a part of the elastically deformable body forming the compressible compensation element being overmoulded to an outer surface of the sensor body.

15. The device according to claim 14, wherein the elastically deformable body defines in a single piece the compressible compensation element and at least one further element selected from among the inner sealing element, the outer sealing element, the supporting element.

* * * * *